United States Patent
Kamoshida et al.

(12)
(10) Patent No.: US 6,473,865 B1
(45) Date of Patent: Oct. 29, 2002

(54) APPARATUS COMPRISING CLOCK CONTROL CIRCUIT, METHOD OF CONTROLLING CLOCK SIGNAL AND DEVICE USING INTERNAL CLOCK SIGNAL SYNCHRONIZED TO EXTERNAL CLOCK SIGNAL

(75) Inventors: Masahiro Kamoshida; Haruki Toda, both of Yokohama; Tsuneaki Fuse, Tokyo; Yukihito Oowaki, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/272,171

(22) Filed: Mar. 18, 1999

(30) Foreign Application Priority Data

Mar. 18, 1998 (JP) .......................... 10-069060

(51) Int. Cl.[7] .............................. G06F 1/12
(52) U.S. Cl. ...................................... 713/401
(58) Field of Search ................. 713/400, 401, 713/500, 503, 600; 327/261, 269, 276, 278, 291

(56) References Cited

U.S. PATENT DOCUMENTS 5,361,277 A * 11/1994 Grover ........................ 375/107
5,376,849 A * 12/1994 Dickol et al. ................ 327/278
5,783,959 A * 7/1998 Yokoyama ................... 327/292
5,864,564 A * 1/1999 Levitt et al. ................ 371/22.3
5,867,432 A * 2/1999 Toda ........................... 365/194
5,986,949 A * 11/1999 Toda ........................... 365/194

* cited by examiner

Primary Examiner—Thomas M. Heckler
(74) Attorney, Agent, or Firm—Foley & Lardner

(57) ABSTRACT

Each delay unit is divided into two delay unit groups, the preceding stage side and the succeeding stage side. To the delay unit group in the preceding stage side, power supply voltage is supplied via a power supply terminal, and to each delay unit of the delay unit group in the succeeding stage side, power supply voltage is supplied from the power supply terminal via a power supply control switch. A forward-pulse detecting circuit detects that forward pulse was propagated to a stage between the N-th stage and a stage a predetermined number of stages before the N-th, and outputs the detected result to the power supply control switch. With this operation, when forward pulse is propagated to the (N+1)th stage, power supply voltage is supplied also to the delay unit group in the succeeding stage side. As electric power is not supplied to the delay unit group in the succeeding stage side when forward pulse is not propagated to the (N+1)th stage, wasteful consumption of electric power is prevented.

33 Claims, 45 Drawing Sheets

92 CLOCKED INVERTER
93 INVERTER
94 INVERTER
95 CLOCKED INVERTER

APPARATUS COMPRISING CLOCK CONTROL CIRCUIT, METHOD OF CONTROLLING CLOCK SIGNAL AND DEVICE USING INTERNAL CLOCK SIGNAL SYNCHRONIZED TO EXTERNAL CLOCK SIGNAL

BACKGROUND OF THE INVENTION

1. Field of the Invention

The present invention relates to an apparatus comprising a clock control circuit suitable for synchronous control in a wide frequency band, a method of controlling clock signals and a device using an internal clock signal synchronized to an external clock signal.

2. Related Art Statement

Recently, a computer system sometimes adopts a clock synchronous type memory, such as a synchronous DRAM, in order to fulfill the requirements for faster processing. A synchronous type memory is designed to use a clock, which is synchronized to a clock signal controlling a memory circuit, also within the memory.

When a delay occurs between a clock signal used within the memory (hereinafter referred to as an internal clock signal) and an external clock signal, such as a clock signal to control the memory circuit, and particularly when the operating speed is high, malfunction is apt to occur in a circuit even when the delay time is small.

Accordingly, a clock control circuit is provided in a semiconductor integrated circuit to synchronize an internal clock signal to an external clock signal.

FIG. 1 is a circuit diagram showing a related art on such a clock control circuit. FIG. 2 is a waveform diagram illustrating the theory. The circuit in FIG. 1 adopts an STBD (Synchronous Traced Backwards Delay) as a clock control circuit.

In FIG. 1, an external clock signal CK, shown in FIG. 2, is inputted to an input terminal 1. The period of the external clock signal CK is supposed to be τ. This external clock signal CK is taken in through a receiver 2. The receiver 2 outputs an amplified clock signal CLK after waveform shaping of the external clock signal. When a delay time at the receiver 2 is D1, the clock signal CLK outputted from the receiver 2 becomes as shown in FIG. 2. A clock control circuit 20 is designed to generate a signal delayed by two periods of the external clock signal thereto.

In order to delay the clock signal CLK by (2τ−D1), the clock control circuit 20, first, generates a pulse FCL, which rises after the time A from the rising timing of the clock signal CLK outputted from the receiver 2 as shown in FIG. 2. The time from the rising of this pulse FCL to the next rising of the clock signal CLK is, as shown in FIG. 2, the time Δ(=τ−A). The clock control circuit 20 measures a time (τ−A), and generates a next pulse RCL after the time 2(τ−A) from the rising of the pulse FCL (see the pulse RCL in FIG. 2).

As shown in FIG. 2, the time from the rising of the pulse RCL to the rising of the next clock signal CLK is τ−Δ=τ−(τ−A)=A. Now, the time from the rising of the pulse RCL to the rising of the external clock signal CK to be inputted next is supposed to be D2. When D2 is a time as shown in FIG. 2, an internal clock CK' (FIG. 2) is generated synchronizing to the external clock CK by being delayed by 2 periods to it.

As shown in FIG. 2 D2 is satisfactory so long as it is a value between D1 and A and has a relation of (D2+D1)=A.

That is, when the time D2 is a delay time in an outputting stage, it means that an internal clock signal synchronized to the external clock signal can be generated by providing a delay circuit, which operates with the delay time A, the sum of the delay time D1 due to the receiver 2 and the delay time D2 in the outputting stage, and providing another delay circuit having a delay time of the time 2(τ−A).

Next, the operation of a circuit according to a related art will be described with reference to a block diagram shown in FIG. 1, waveform diagrams in FIGS. 7 and 8, and explanatory views shown in FIGS. 9 to 12. Particularly, the operation characteristics of an STBD to store the propagation condition of forward pulse and to control the propagation of rearward pulse corresponding to the stored data is described in detail.

The external clock signal CK having a period τ as shown in FIG. 7 is inputted to a receiver 2 via an input terminal 1, and CLK shown in FIG. 7 is outputted from the receiver 2. When a delay of the receiver 2 is D1, CLK is delayed by D1 to CK. When no clock control circuit is used, this delay D1 becomes, as it is, skew of the external clock signal and the internal clock signal. The more the external clock signal becomes high frequency and τ becomes smaller, the more the effect of this skew becomes great. The output signal CLK of the receiver 2 is inputted to an inverter 10, a control pulse generating circuit 9 and a delay monitor 3. At the control pulse generating circuit 9, the control pulse P as shown in FIG. 7 is generated. In a clock control circuit using an STBD, it is required to initialize all forward-pulse delay circuits before forward pulse FCL is inputted to the first delay unit. By reason of this, a control pulse P having a width narrower than the delay time A of a delay monitor 3 is generated, and control is carried out using this control pulse P. The output signal FCL of the delay monitor 3 is delayed by A to CLK and inputted to a first forward-pulse delay circuit 5-1 of a forward-pulse delay line 5.

The N-th forward-pulse delay circuit forming a forward-pulse delay line outputs a logical value, which is similar to the output of the (N−1)th forward-pulse delay circuit, to the (N+1)th forward-pulse delay circuit when the control pulse P is "L" and outputs "L" to initialize a forward-pulse delay line 5 when P is "H".

Output signals of forward-pulse delay circuits are also inputted to state-holding circuits. One of output signals of rearward-pulse delay circuits is also inputted to state-holding circuits. State-holding circuits have two states to take corresponding to signals inputted. The state-holding circuit takes the set state when P is "L" and forward pulse is propagated by the corresponding forward-pulse delay circuit. When P is "H" and rearward pulse is propagated by the corresponding rearward-pulse delay circuit, the state-holding circuit takes the reset state.

An output signal of the state-holding circuit is inputted to a rearward-pulse delay circuit. When the state-holding circuit to which the rearward-pulse delay circuit is connected is in the set state, the N-th rearward-pulse delay circuit inputs a logical value, which is similar to the output of the (N+1)th rearward-pulse delay circuit, to the (N−1)th rearward-pulse delay circuit. When the state-holding circuit connected to the rearward-pulse delay circuit is in the reset state, it outputs a logical value similar to the output of the receiver.

Next, the operation from the input of the forward pulse FCL to a forward-pulse delay line to the output of the output signal RCL from a rearward-pulse delay line is described in detail with reference to FIGS. 8 and 9 to 12. Each of FIGS.

9 to 12 shows the state of t0 to t3 in FIG. 8. Suppose that the delay time of a delay circuit is Δdu clock period is 10Δdu, the pulse width is 5Δdu, the width A' of the control pulse P is 2Δdu, the delay time A of the delay monitor is 3Δdu. The set state is expressed with S and the reset state is expressed with R. The numerals marked on delay lines express the output of a delay circuit; "1" (="H") and "0" (="L") (Δdu expresses a delay time per stage of delay circuits).

Now, suppose that, in the initial state at time to, all state-holding circuits are in the reset state R. At this time, as an external clock signal has not been inputted, the output state of all forward-pulse delay circuits and rearward-pulse delay circuits is at "L" (FIG. 9).

When the forward pulse FCL is inputted to forward-pulse delay circuits, the forward pulse is then propagated by the forward-pulse delay line until the control pulse becomes "H". As shown in FIG. 10, at time t1, when the forward pulse F1 has been propagated up to the 7th stage and the propagation is stopped due to P's becoming "H" and then, the state-holding circuits in the first stage up to the 7th stage turn to the set state S, and the state-holding circuits in the 8th stage up to the last stage remain in the reset state R. At this time, CLK (="H") is inputted to the rearward-pulse delay circuit in the 7th stage to the last state, and the rising of rearward pulse is formed. On the other hand, as P is "H" the output of forward-pulse delay circuits becomes "L" and then the forward pulse F1 disappears after that.

At time t2, as P remains at "H" the rising of rearward pulse R1 is propagated to the preceding stage, changing state-holding circuits to the double-stage (=A'/Δdu) reset state R (FIG. 11). This is for the purpose of generating rearward pulse from the stage where forward pulse is stopped even when forward pulse is not propagated up to the 7th stage because the period τ is shortened due to jitter.

Finally, when the input signal CLK for rearward-pulse delay lines becomes "L" at time t3, in the stages of state-holding circuits in the reset state, namely, in and after the 6th stage, the output of rearward-pulse delay circuits changes to "L" and the falling of rearward pulse is formed (FIG. 12).

Attention is required to a fact that the pulse width of rearward pulse becomes narrow by the number of stages of state-holding circuits which have been reset as an anti-jitter measure. After this, by repeating the operation in FIGS. 9 to 12, a signal RCL being delayed by τ−A from the rising of the output signal CLK of a receiver can be outputted.

The output signal RCL of rearward-pulse delay lines is inputted to an output buffer 8 and outputted as an internal clock signal CK' after being delayed by D2 to the rearward pulse RCL.

The delay time Δ total of the internal clock signal CK' to the external clock signal CK is:

Δtotal=D1+A+2(τ−A)+D2

When the delay time of the receiver 2 and the output buffer 8 is known and A=D1+D2, the following equation holds good:

$$\Delta total = D1 + A + 2(\tau - A) + D2$$
$$= D1 + (D1 + D2) + 2(\tau - (D1 + D2)) + D2$$
$$= 2(D1 + D2) + 2\tau - 2(D1 + D2)$$
$$= 2\tau$$

As Δ total becomes 2τ, consequently, the external clock signal and the internal clock signal are synchronized.

FIG. 13 shows the state of the state-holding circuit 6 when propagation of forward pulse was stopped by the control pulse P In this figure, S represents the set state and R represents the reset state respectively.

As shown in FIG. 13, as the state-holding circuits 6-(N+1) to 6-L after the N-th stage, where forward pulse FCL was propagated, are in the reset state, to rearward-pulse delay circuits corresponding to these state-holding circuits 7-(N+1) to 7-L are ready to have the clock signal CLK inputted, and electric power is consumed.

In consequence, the circuit in FIG. 1 has a problem that, electric power even in stages where forward pulse FCL is not propagated.

As application is widened when the operating frequency band of a clock control circuit is wide, and as the operation tests on clock control circuits are carried out in a low-frequency band, it is required to widen the respondent operating frequency band in low frequency. When an external clock signal becomes low frequency, its period τ becomes longer and forward pulse is propagated in a relatively large number of stages. Accordingly, in order to widen the operating frequency band in low frequency, the number of stages of delay lines should be increased so that forward pulse does not reach the end of a delay line.

Actually, however, as the operation is mainly done in high frequency, more electric power is consumed in the part where forward pulse is not propagated during the operation in high frequency than in stages where forward pulse was propagated.

Thus, aforesaid clock control circuit according to a related art has a problem that, during the operation in high frequency, electric power is mostly consumed by delay units in stages where forward pulse is not propagated than by delay units in stages where forward pulse was propagated.

OBJECT AND SUMMARY OF THE INVENTION

An object of the present invention is to provide an apparatus comprising a clock control circuit, which is able to reduce electric power consumption during the operation time in high frequency, a method of controlling clock signals and a device using an internal clock signal synchronized to an external clock signal.

A clock control circuit according to the present invention comprises a forward-pulse delay line which is configured by cascading a plurality of stages of forward-pulse delay circuits to delay inputted signals by propagating said inputted signals with a predetermined delay time, and delays forward pulse by propagating said forward pulse, a rearward-pulse delay line which is configured by cascading a plurality of stages of rearward-pulse delay circuits to delay inputted signals by propagating said inputted signals with a predetermined delay time, and delays rearward pulse by propagating said rearward pulse, a control device to propagate said rearward pulse by said rearward-pulse delay lines in a number of stages corresponding to the number of stages where said forward pulse was propagated by said forward-pulse delay lines, a forward-pulse detecting device to detect whether said forward pulse was propagated or not in one or a plurality of predetermined stages, and an electric power consumption control device to control electric power consumption of at least rearward-pulse delay circuits out of said forward-pulse delay circuits, said rearward-pulse delay circuits and said control device, corresponding to the detected result of said forward-pulse detecting device.

A method of controlling clock signals according to the present invention comprises a procedure to detect stages, where said forward pulse was propagated, in order to control electric power consumption of state-holding circuits, which output state signals to propagate rearward pulse by said rearward-pulse delay circuits in a number of stages corresponding to the number of stages of forward pulse which was propagated by forward-pulse delay circuits to delay inputted signals by propagating them with a predetermined delay time, rearward-pulse delay circuits to delay inputted signals by propagating said inputted signals with a predetermined delay time and said forward-pulse delay circuits, and a procedure to control electric power consumption of at least said rearward-pulse delay circuits out of said forward-pulse delay circuits. rearward-pulse delay circuits and state-holding circuits corresponding to this detected result.

Other features and advantages of the present invention will become apparent enough from the following description.

DETAILED DESCRIPTION OF THE PREFERRED EMBODIMENTS

Figure 1:
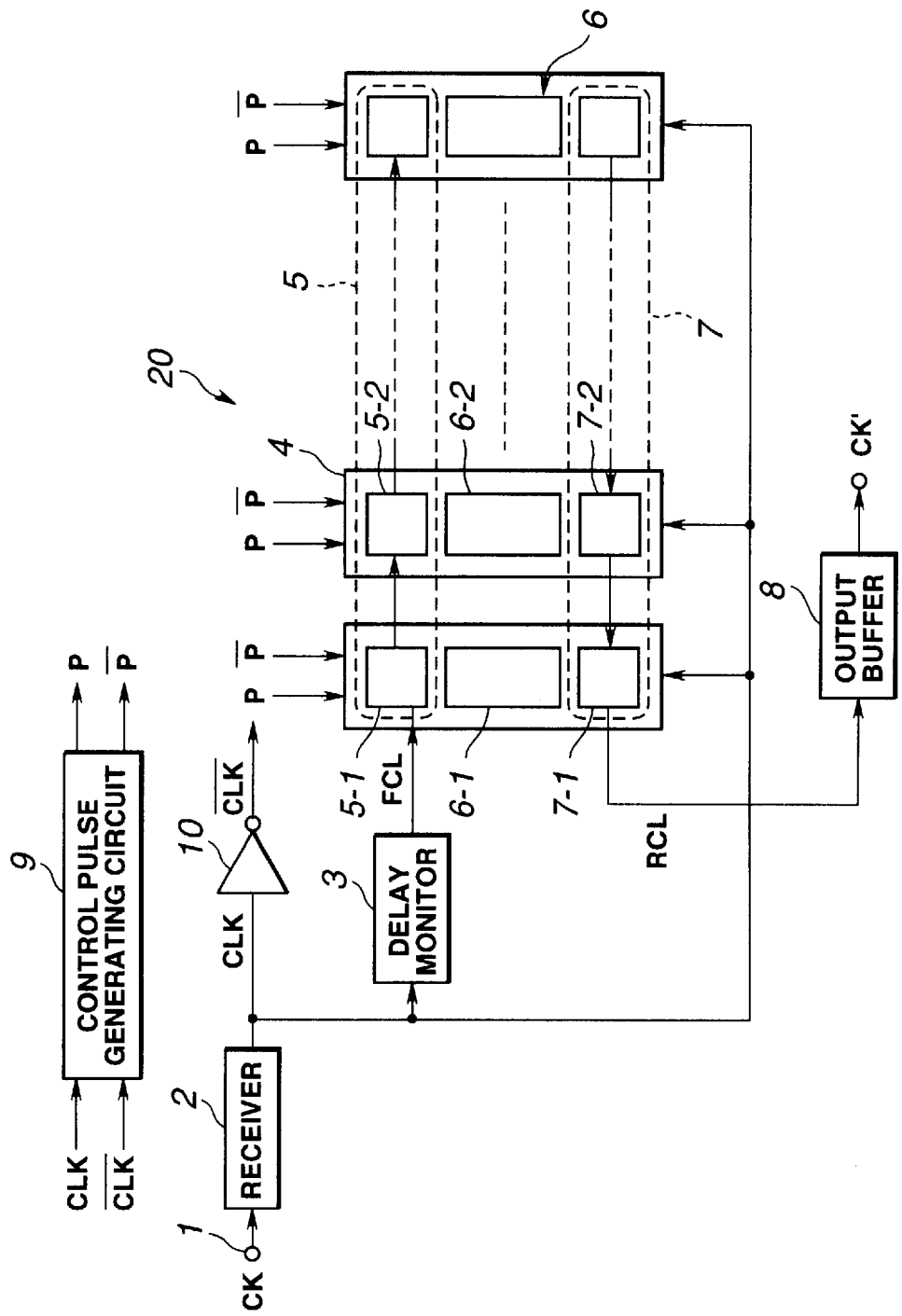
FIG. 1 is a circuit diagram showing a related art on a clock control circuit.
Figure 2:
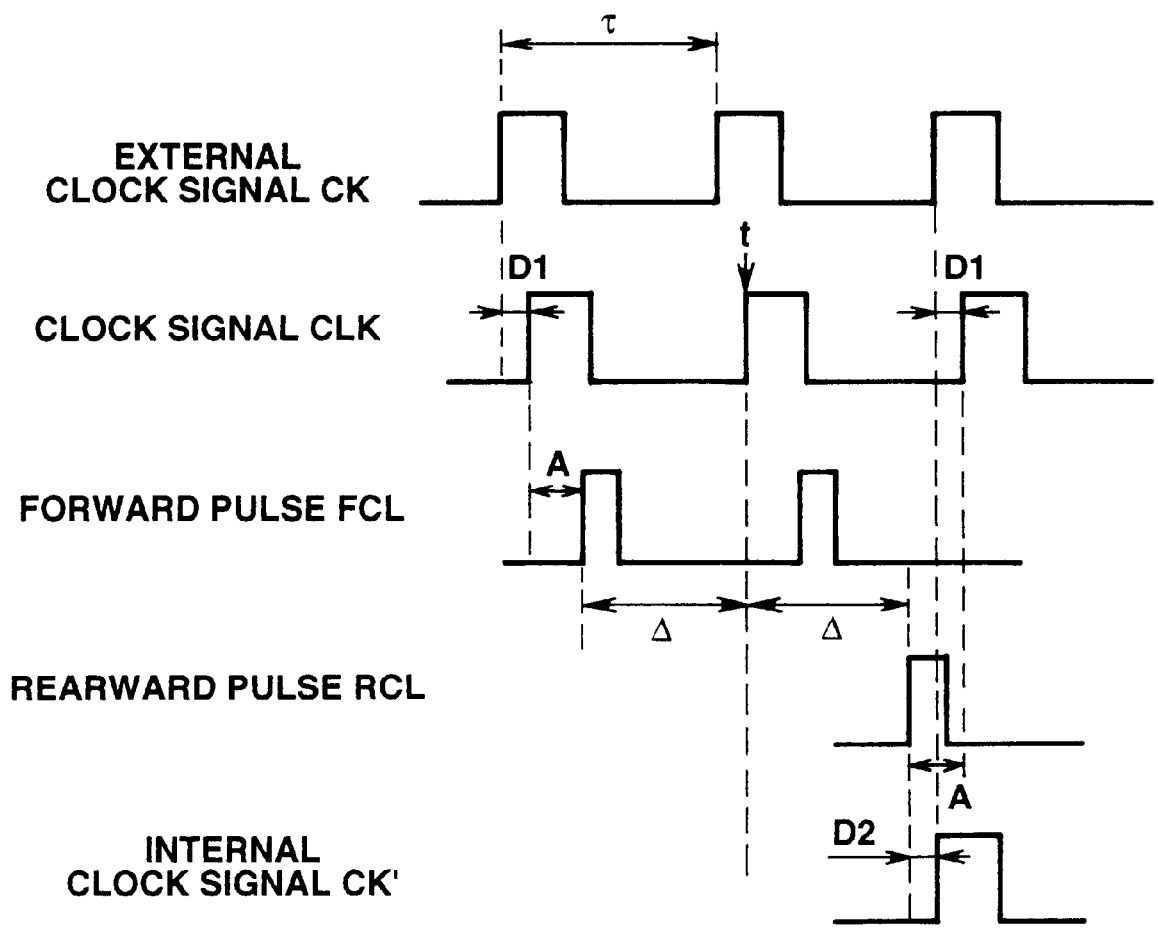
FIG. 2 is a waveform diagram illustrating a theory of an STBD.
Figure 14:
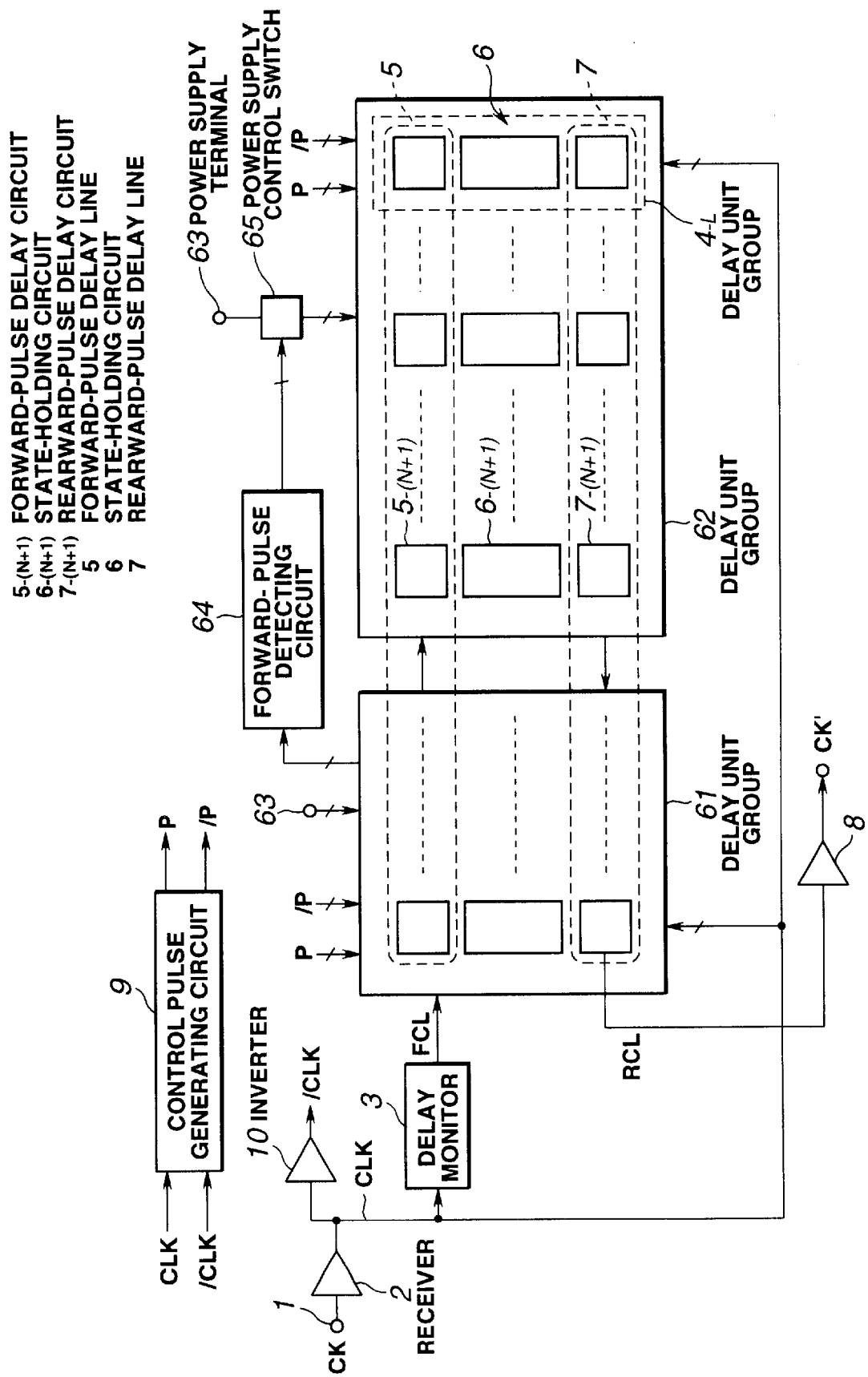
FIG. 14 is a block diagram showing a clock control circuit according to an embodiment he present invention.
Figure 15:
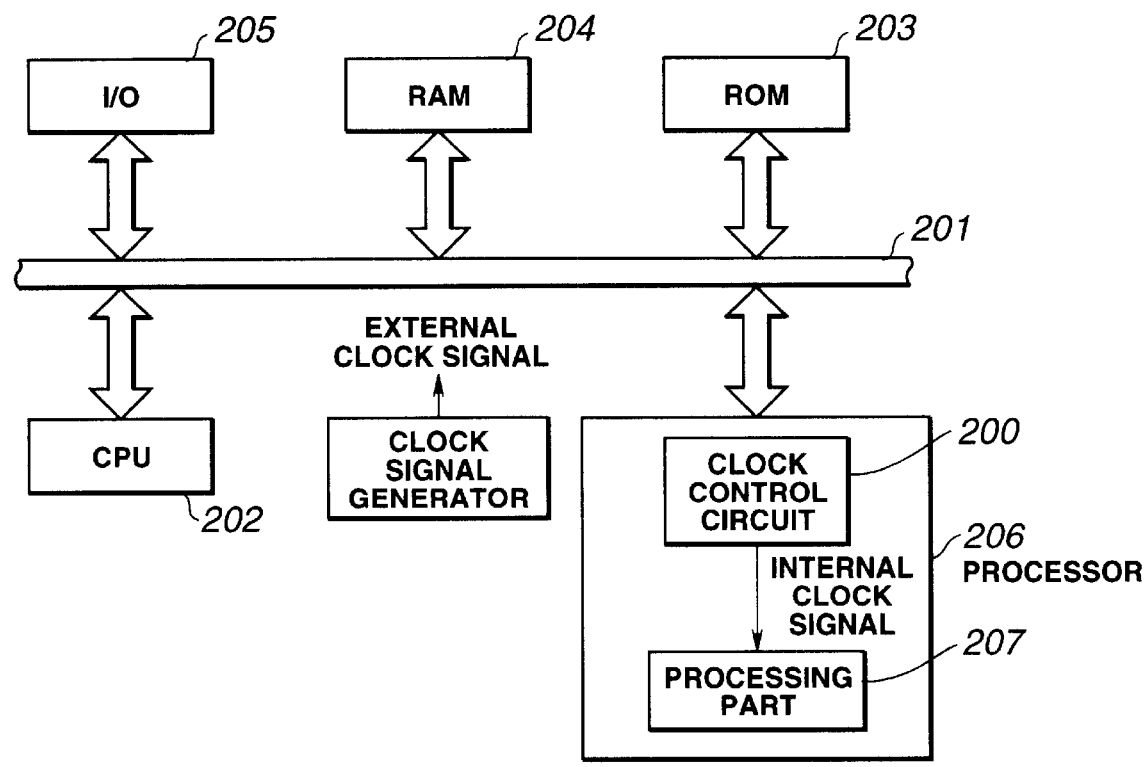
FIG. 15 is a block diagram showing a computer system wherein the clock control circuit shown in FIGS. 14, 18, 24, 25, 30, 31, 35, 36, 37, 38, 39, 40, 41, 44, 45, 46, 47, 48, 49, 50, 53, and 54 is applied.

The embodiments of the present invention will now be described in detail hereinafter with reference to the accompanying drawings. FIG. 14 is a circuit diagram showing an embodiment of a clock control circuit according to the present invention. In FIG. 14, the same elements as those in FIG. 1 are given the same reference numerals. FIG. 15 is a block diagram showing a computer system wherein a clock control circuit in FIG. 14 is applied.

FIG. 15 shows an ordinary computer system. That is, a CPU202 connected to a bus 201 operates and executes instructions according to the program. A ROM203 stores mainly programs and a RAM204 stores data. An I/O205 sends and receives data to and from the exterior.

An apparatus 206 wherein an internal clock signal synchronized to an external clock signal is used (hereinafter referred to as processor) is provided with a processing part 207 to carry out predetermined processing of data and a clock control circuit 200 in accordance with the embodiment. A clock generator 208 generates clock signals (external clock signal) to be used in the computer system. The clock control circuit 200 is designed to generate an internal clock signal synchronized to the external clock signal and to supply it to the processing part 207.

This embodiment is applicable not only to a computer system as shown in FIG. 15 but also to all apparatus using an internal clock signal synchronized to an external clock signal.

In the embodiment as shown in FIG. 14, two delay unit groups 61 and 62, which are configured with a plurality of delay units, are provided and power supply is designed to be controlled in each of the delay unit groups 61 and 62. For delay units, a unit having the same configuration as that of the delay unit 4 according to a related art may be adopted, or, one with other configuration may also be adopted.

To the input terminal 1, the external clock signal CK is inputted. Suppose that the period of the external clock signal is τ. This external clock signal CK is supplied to the receiver 2. The receiver 2 performs waveform shaping on the external clock signal and outputs an amplified clock signal CLK. The delay time at the receiver 2 is supposed to be D1. The clock signal CLK from the receiver 2 is supplied to the inverter 10, the delay monitor 3 and a plurality of delay units 61, 62.

The inverter 10 inverts the clock signal CLK and outputs a clock signal /CLK. The delay monitor 3 is designed to delay the clock signal CLK by the time A and to generate forward pulse FCL. The output of the delay monitor 3 is supplied to the first delay unit 4-1 of a delay unit group 61.

The clock signals CLK and /CLK are also supplied to the control pulse generating circuit 9. The control pulse generating circuit 9 rises at the rising of the clock signal CLK, generates the control pulse P having a pulse width of A and its inverted signal /P, and supply them to the delay units of the delay unit group 61, 62. The value of A' is set so as to satisfy A>A'.

The delay unit comprises forward-pulse delay circuits, state-holding circuits and rearward-pulse delay circuits. By using a plurality of stages of delay units, forward-pulse delay circuits in the first stage up to the last stage are cascaded, and rearward-pulse delay circuits in the first stage up to the last stage are also cascaded to configure a forward-pulse delay line 5 and a rearward-pulse delay line 7 respectively.

Figure 3:
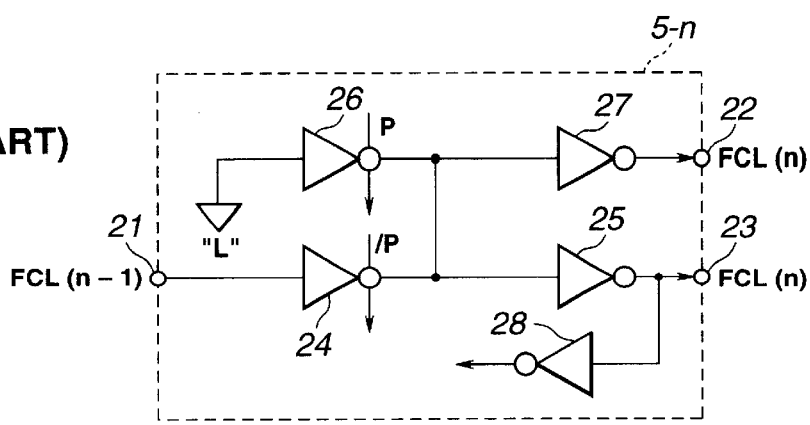
FIG 3 is a circuit diagram showing a forward-pulse delay circuit shown FIG. 1.
Figure 4:
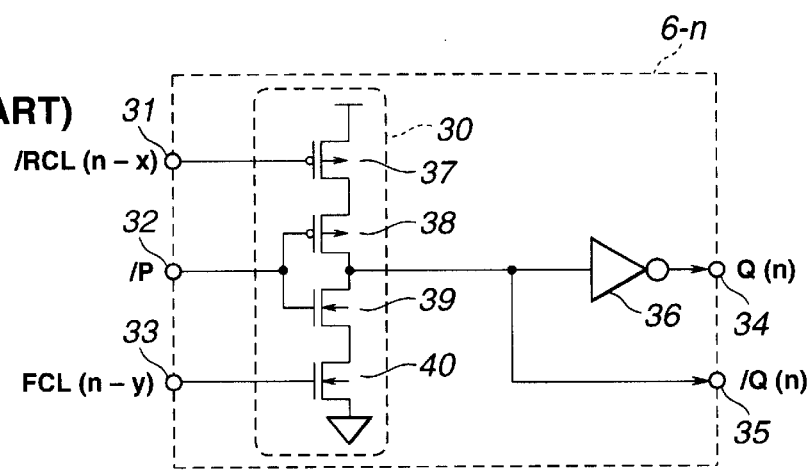
FIG. 4 is a circuit diagram showing a state-holding circuit shown in FIG. 1.
Figure 5:
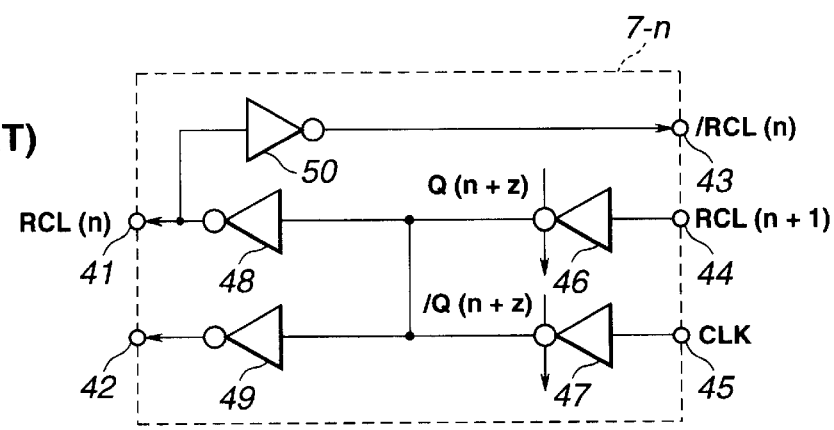
FIG. 5 is a circuit diagram showing a rearward-pulse delay circuit. shown in FIG. 1.

As stated above, for the delay unit, the delay unit 4, whose forward-pulse delay circuits, state-holding circuits and rearward-pulse delay circuits are shown in FIGS. 3 to 5, may be used, or a unit having other configuration may be used so long as they have equal functions.

The forward-pulse delay circuits 5-1, 5-2, . . . , 5-L of each delay unit are designed to output the output at "L" while the control pulse P is "H" so as to initialize the forward-pulse delay line 5. While the control pulse P is "L" they are designed to propagate the output of forward-pulse delay circuits in the preceding stage to forward-pulse delay circuits in the succeeding stage.

State-holding circuits 6-1, 6-2, . . . , 6-L of each delay unit are designed, in a stage where forward pulse is propagated while the control pulse P was "L" to turn the state signal Q to "H" so as to turn the stage to the set state, and to turn the state signal Q to "L" in the stage where rearward pulse is propagated while the control pulse P was "H" so as to turn the stage to the reset state. The state-holding circuits 6-1, 6-2, . . . , 6-L are designed to determine corresponding to the control pulse /P to output either the state signal Q corresponding to forward pulse or the state signal Q corresponding to rearward pulse.

The rearward-pulse delay circuits 7-1, 7-2, . . . , 7-L of each of the delay units are designed, in a stage where the state signal Q at "L" (the reset state) has been inputted, to output the clock signal CLK from the receiver 2, and in a stage where the state signal at "H" (the set state) has been inputted, to propagate the output of rearward-pulse delay circuits in the succeeding stage by rearward-pulse delay circuits in the preceding stage.

Also in this embodiment, it is designed so that the forward-pulse delay line 5 delays inputted forward pulse by the time (τ–A), and the rearward-pulse delay line 7 propagates rearward pulse for the time (τ–A) from the stop of propagation of forward pulse and outputs it from the first rearward-pulse delay circuit 7-1. The rearward pulse RCL from the rearward-pulse delay line 7 is supplied to the output buffer 8. The output buffer 8 is designed to delay the inputted rearward pulse RCL by the delay time D2 and to output it as an internal clock signal CK'.

In this embodiment, the delay unit group 61 is formed with the delay units 4-1 to 4-N in stages from the 1st to the N-th, and the delay unit group 62 is formed with the delay units 4-(N+1) to 4-L in stages from the (N+1)th to the L-th. It is designed so that power supply voltage to each delay unit is controlled in each of these delay unit groups 61 and 62.

To each delay unit of the delay unit group 61, power supply voltage is supplied via a power supply terminal 63. Meanwhile, to each delay unit of the delay unit group 62, power supply voltage is supplied from the power supply terminal 63 via a power supply control switch 65.

In this embodiment, a forward-pulse detecting circuit 64 is provided so as to detect that forward pulse was propagated up to a predetermined stage. The forward-pulse detecting circuit 64 is connected either to a delay unit in a predetermined stage of the delay unit group, for example, a forward-pulse delay circuit comprised in a delay unit in one of the stages from the N-th stage to a stage several stages in advance of the N-th or to a state-holding circuit. The forward-pulse detecting circuit 64 is designed to detect whether forward pulse was propagated to the stage where it is connected and to supply a control signal CTL to the power supply control switch 65.

The power supply control switch 65 is designed to supply power supply voltage from the power supply terminal 63 to each delay unit of the delay unit group 62 when propagation of forward pulse up to a predetermined stage is indicated by the inputted control signal CTL, and not to supply power supply voltage to the delay unit group 62 in other cases.

Figure 16:
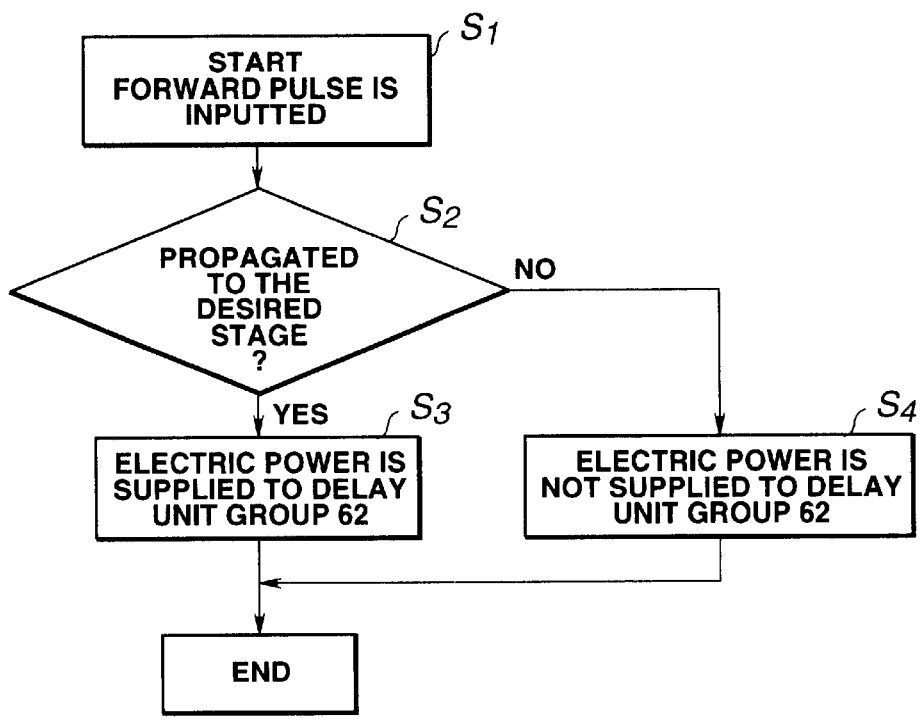
FIG. 16 is a flow chart showing a method of controlling clock signals according to an embodiment of the present invention.

Now, the operation of the embodiment configured in such a manner is described with reference to FIGS. 16. FIG. 16 is a flow chart illustrating the operation of the embodiment as shown in FIG. 14.

Figure 7:
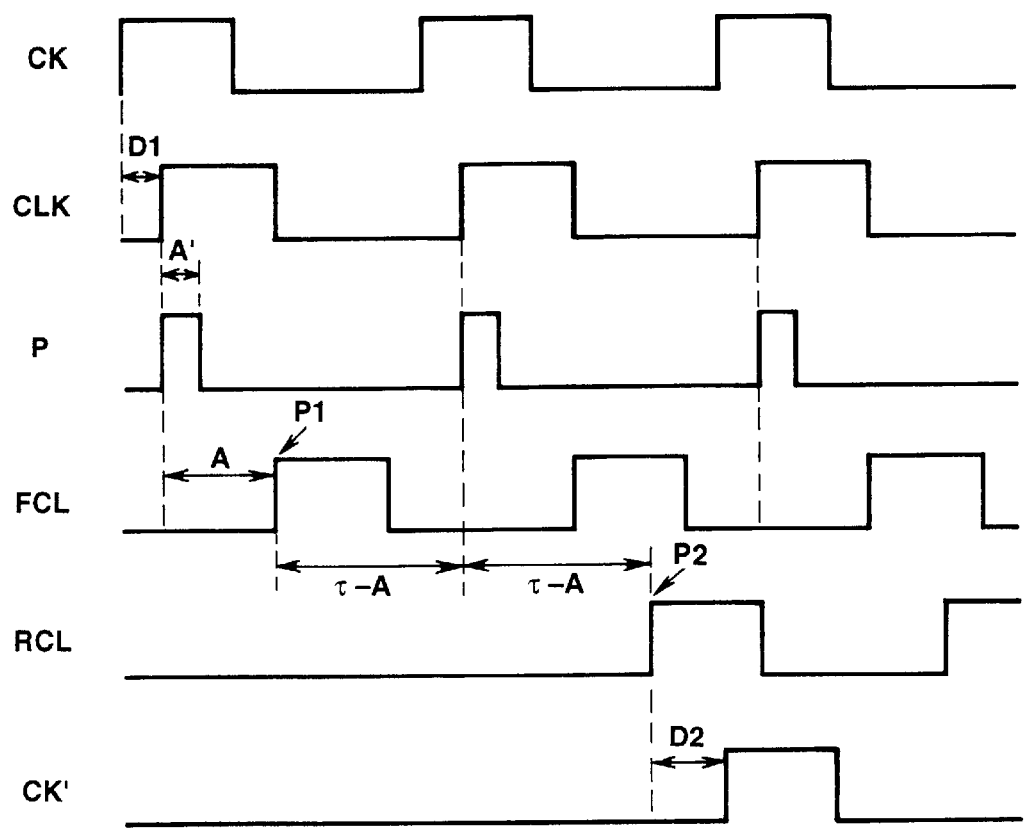
FIG. 7 an explanatory view illustrating the operation of a related art.
Figure 8:
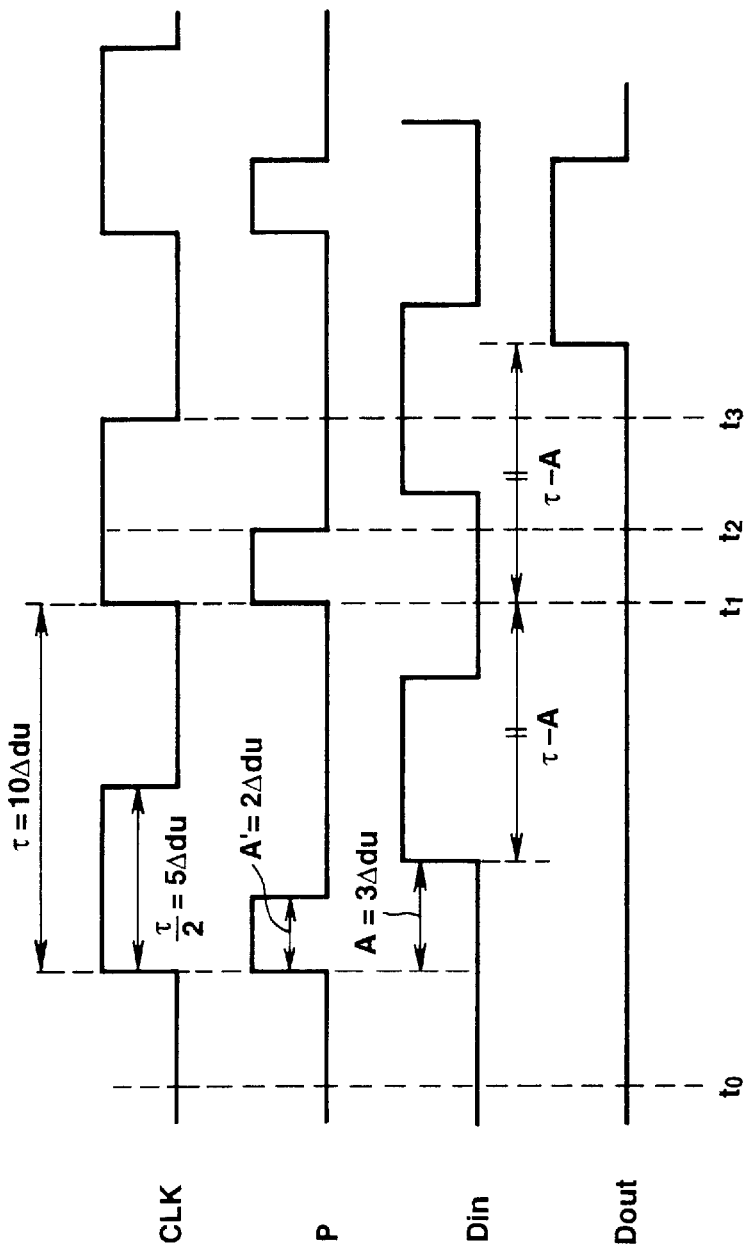
FIG. 8 is an explanatory view illustrating the operation of a related art.
Figure 9:
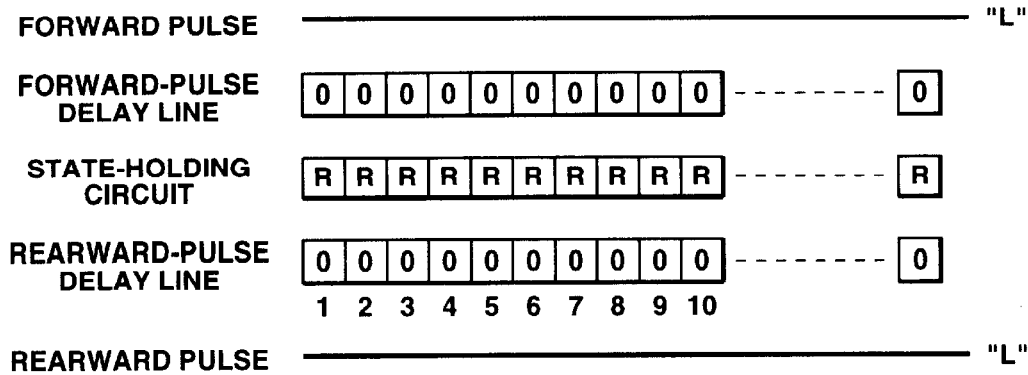
FIGS. 9 to 11 are explanatory views illustrating the operation of a related art.
Figure 10:
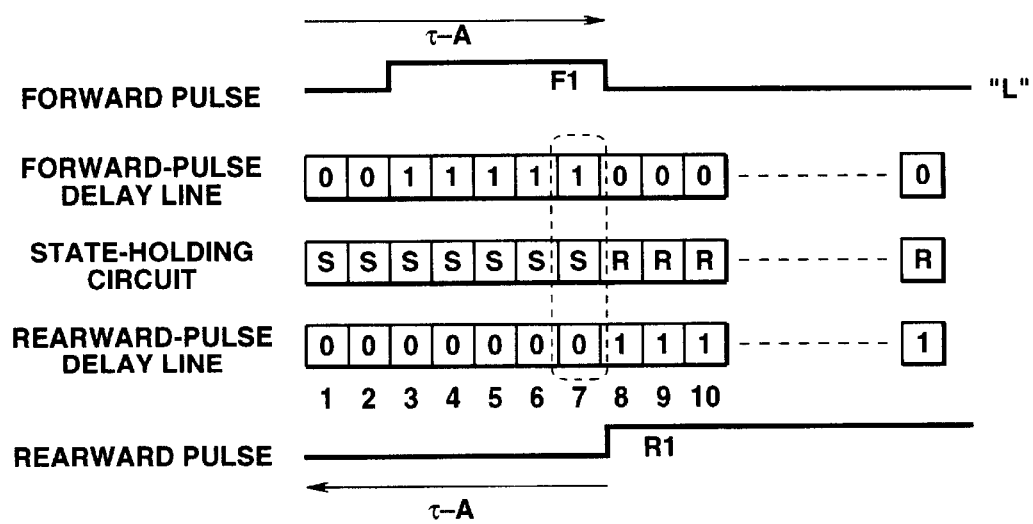
Figure 11:
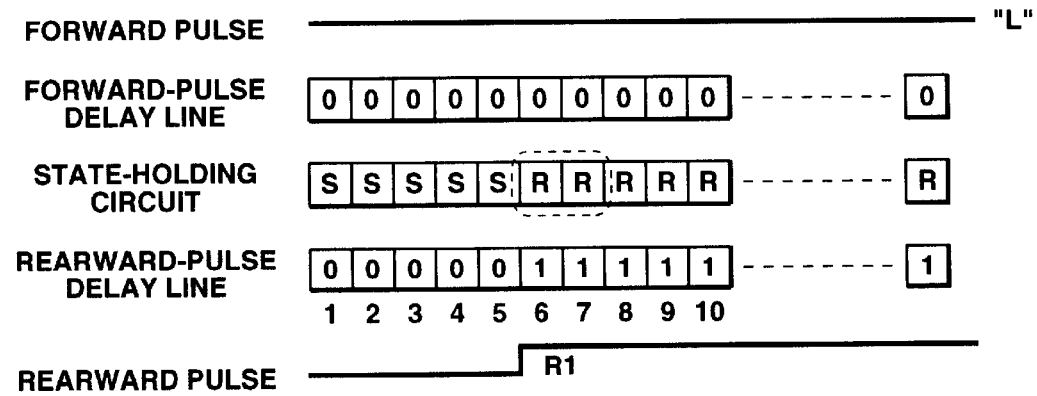

The delay times of the receiver 2, the delay monitor 3 and the output buffer 8 are D1, A and D2 respectively. The operation to generate an internal clock signal CK', which is synchronized to an external clock signal CK, is similar to that in a related art. Namely, to the input terminal 1, the external clock signal CK as shown in FIG. 7 is inputted. This external clock signal CK is taken in by the receiver 2, and, as shown in FIG. 7, after the delay time D1, supplied to the delay monitor 3 and the inverter 10 as a clock signal CLK.

The inverter 10 outputs a clock signal /CLK, an inverted signal of the clock signal CLK. These clock signals CLK and /CLK are supplied to the control pulse generating circuit 9, and a control pulse P (see FIG. 7), which is synchronized to the clock signal CLK and has a pulse width A', is generated.

On the other hand, the delay monitor 3 delays the clock signal CLK by the time A and supplies a forward pulse FCL, as shown in FIG. 7, to the 1st forward-pulse delay circuit 5-1 (step S1 in FIG. 16).

Now, suppose that the delay unit 6 is in the initial state and all the delay units 6 have been initialized. That is, the forward-pulse delay circuits 5-1, 5-2, . . . and the rearward-pulse delay circuits 7-1, 7-2, . . . are outputting the output at "L" and the state-holding circuits 6-1, 6-2, . . . are outputting the state signal Q at "L" showing the reset state.

In this state, when the control pulse P becomes "L" the forward-pulse delay line 5 begins to propagate forward pulse FCL. By the forward pulse FCL's being propagated, a state-holding circuit in a stage where the pulse is propagated turns to the set state. When the time ($\tau$−A) elapses since the input of the forward pulse FCL to the forward-pulse delay line 81, the control pulse P becomes "H", and propagation of the forward pulse FCL is stopped.

If the forward pulse FCL has been propagated up to the m-th stage, the first state-holding circuits in the first stage up to the m-th stage turn to the set state, and state-holding circuits in and after the (m+1)th stages turn to the reset state. As the clock signal CLK is "H" at this timing, rearward-pulse delay circuits in and after the (m+1)th stages output rearward pulse at "H". This rearward pulse is supplied to the m-th rearward-pulse delay circuit 5-m. As the state-holding part which controls rearward-pulse delay circuits in stages before the m-th stage are in the set state, after this, rearward pulse is propagated by the rearward-pulse delay line 7 sequentially to the preceding stage side. State-holding circuits in a number of stage corresponding to the time A' from the generation of rearward pulse are turned back to the reset state by the propagation of rearward pulse.

In such a manner, the first rearward-pulse delay circuit 7-1 outputs the rearward pulse RCL after the time ($\tau$−A) since the generation of rearward pulse. The rearward pulse RCL is delayed by the time D2 by the output buffer 8 and outputted as the internal clock signal CK'.

By setting the delay time A of the delay monitor 3 so as to be A=D1+D2, an internal clock signal CK', which is delayed by $2\tau$ and synchronized to the external clock signal CK, is generated.

In this embodiment, power supply voltage from the terminal 63 is first supplied only to each delay unit of the delay unit group 61. Now, suppose that frequency of an external clock signal CK is relatively high and the value of $\tau$ is relatively small. In this case, forward pulse is propagated in a relatively small number of stages, and the forward-pulse detecting circuit 64 does not detect that forward pulse reached a predetermined stage (step S2 in FIG. 16). In consequence, the power supply control switch 65 does not supply power supply voltage from the terminal 63 to each delay unit of the delay unit group 62 (step S4). Accordingly, in this case, electric power is not consumed by each delay unit of the delay unit group 62.

Now, suppose that frequency of the external clock signal CK is low and the value of $\tau$ is relatively large. When forward pulse is propagated to a delay unit in a stage a predetermined number of stages in advance of the delay unit 4-N in the last stage of the delay unit group 61, the forward-pulse detecting circuit 64, in step S2 in FIG. 16, detects that forward pulse reached this stage and outputs the control signal CTL to the power supply control switch 65. With this operation, power supply voltage is supplied from the terminal 63 to each delay unit of the delay unit group 62 via the power supply control switch 65 (step S3 in FIG. 16). Thus, in this case, forward pulse is able to be propagated by each delay unit in the delay unit group 62. With this operation, electric power consumption is controlled, besides, an internal clock signal CK' synchronized to an external clock signal CK can be securely generated.

As described above, in this embodiment, delay units are divided into two groups, one group in the stages up to the N-th stage and the other in and after the (N+1)th stage, namely, into the delay unit groups 61 and 62 respectively. As electric power supply is controlled in each of these delay unit groups 61 and 62, wasteful consumption of electric power is prevented at each delay unit of the delay unit group 62 during the operation in high frequency.

Figure 17A:
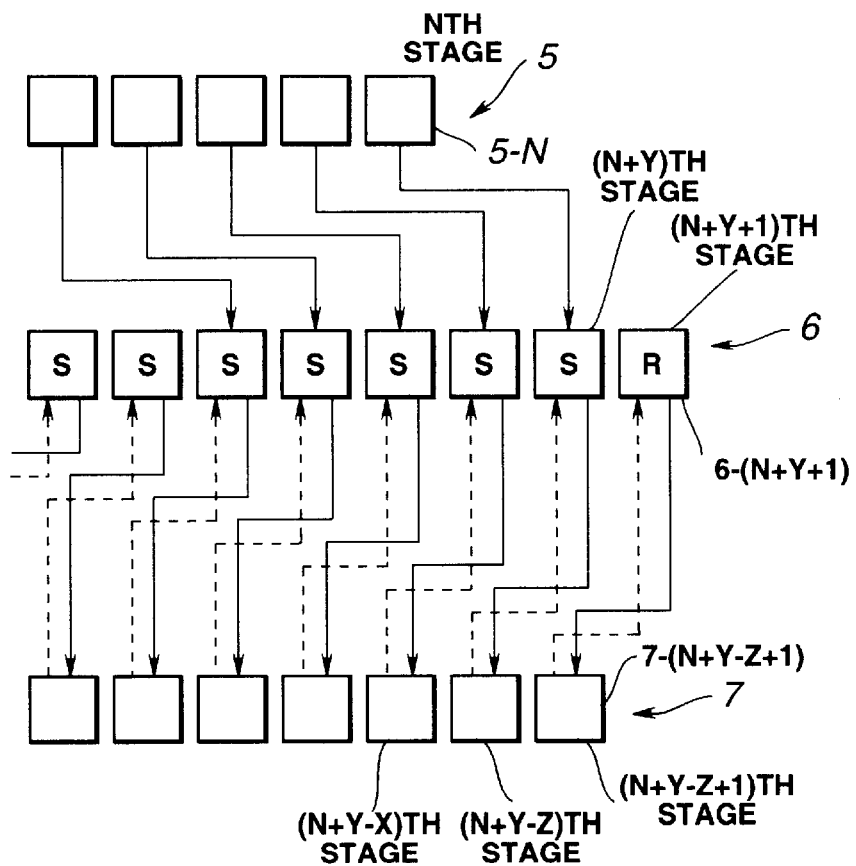
FIGS. 17A and 17B are explanatory views illustrating the embodiment shown in FIG. 14.
Figure 17B:
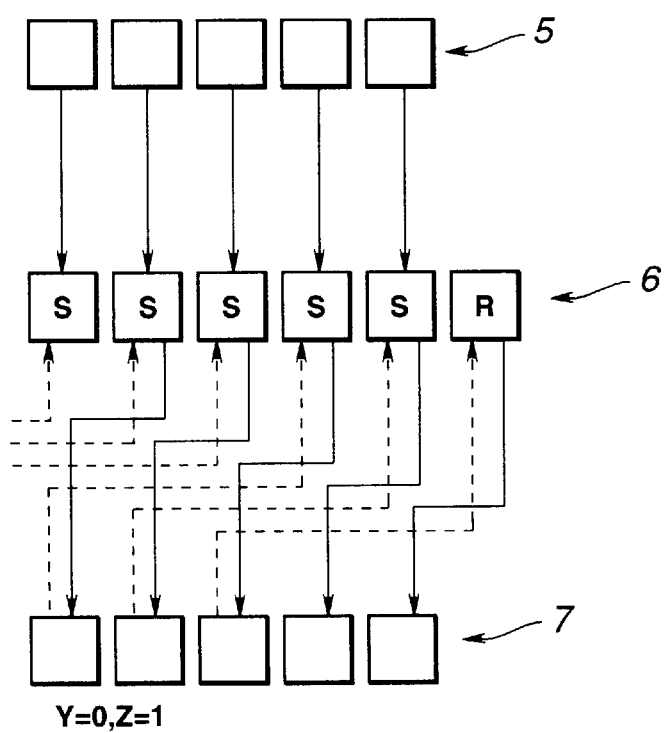

In the aforesaid description, forward-pulse delay circuits are described as being connected to state-holding circuits in the same stage. Actually, however, forward-pulse delay circuits, state-holding circuits and rearward-pulse delay circuits are connected to different stages. FIGS. 17A and 17B show this case.

As shown in FIG. 17A, a forward-pulse delay circuit is supposed to be connected to a state-holding circuit in a stage Y stages after. In this case, when forward pulse is propagated to the N-th forward-pulse delay circuit 5-N, state-holding circuits are turned to the set state up to the (N+Y)th state-holding circuit 6-(N+Y).

As the output signal CLK of the receiver 2 is inputted from a rearward-pulse delay circuit, to which a state-holding circuit in the reset state is connected, to a rearward-pulse delay line so as to generate a rearward pulse, as shown in FIG. 17A, it is necessary to supply electric power also to the (N+Y+1)th state-holding circuit 6-(N+Y+1) at the beginning stage. On account of this, state-holding circuits in stages from the 1st up to the (N+Y+1)th are included in the delay unit group 61, and state-holding circuits in and after the (N+Y+2)th stage are included in the delay unit group 62.

Meanwhile, as shown in FIG. 17A, when the output of a state-holding circuit in a stage Z stages after is inputted to a rearward-pulse delay circuit, rearward-pulse delay circuits in the stages up to the (N+Y+1−Z)th stage, where the (N+Y+1)th state-holding circuit 6-(N+Y+1) in the delay unit group 61 is connected, are included in the delay unit group 61, and rearward-pulse delay circuits in and after the [(N+Y+1−Z)+1]th stage are included in the delay unit group 62.

In the description hereinafter, in order to simplify it, the description will be given on a state where Y=0 and Z=1 as shown in FIG. 17B. In this case, forward-pulse delay circuits 5-N in stages up to the N-th, state-holding circuits 6-(N+1) in stages up to the (N+1)th, and rearward-pulse delay circuits 7-N in stages up to the N-th, are included in the delay unit group 61, and forward-pulse delay circuits in and after the (N+1)th stage, state-holding circuits in and after the (N+2)th stage and rearward-pulse delay circuits in and after the (N+1)th stage are included in the delay unit group 62. Expansion is easily possible also in a case where Y≠0 and Z≠1.

FIGS. 3–5 show examples of the forward-pulse delay circuit 4, the state-holding circuit 5 and the rearward-pulse delay circuit 6. The configurations are described below.

FIG. 3 shows an example of the n-th forward-pulse delay circuit 5-n. To a terminal 21, the forward pulse FCL(n−1), which is the output of the (n−1)th forward-pulse delay circuit 5-(n−1), is inputted. The forward pulse FCL(n−1) is supplied to a clocked inverter 24, and the clocked inverter 24 is activated to conduct by the control pulse /P at "H" The symbol /P means an inverted signal of pulse P. The output of the clocked inverter 24 is outputted from a terminal 23 via an inverter 25 and also outputted from a terminal 22 via an inverter 27. The output of the terminal 23 is supplied as forward pulse FCL(n) to the input terminal 21 of the forward-pulse delay circuit 5-(n+1) in the next stage. The terminal 22 is connected to a terminal 33 of a state-holding circuit to be described later.

To a clocked inverter 26, electric potential at "L" is supplied. The clocked inverter 26 is designed to conduct at "H" of the control pulse P, and to output its output to the terminal 23 via the inverter 25 and also to the terminal 22 via the inverter 27. To an output terminal of the inverter 25, an inverter 28 for load adjusting is also connected.

FIG. 4 shows the n-th state-holding circuit 6-n. The state-holding circuit 6-n comprises a clocked inverter 30 and an inverter 36. The clocked inverter 30 comprises two pMOS transistors 37 and 38 and two nMOS transistors 39 and 40, and is controlled by a signal inputted via terminals 31 to 33. To the terminal 32, the control pulse /P is inputted. and to the terminal 33, the (n−y)th forward pulse FCL(n−y) in the (n−y)th stage is inputted. To the terminal 31, a signal /RCL(n−x), which is an inverted signal of rearward pulse in the (n−x)th stage, is inputted from the rearward-pulse delay line 7. The pMOS transistor 31 and the nMOS transistor 40 may be controlled by /P and the pMOS transistor 38 may be controlled by /RCL and the nMOS transistor 39 may be controlled by FCL(n−y).

The clocked inverter 30 outputs a level corresponding to a rearward pulse in the (n−x)th stage by the control pulse /P's becoming "L" and outputs a level corresponding to a forward pulse in the (n−y)th stage by the control pulse /P's becoming "H". The output of the clocked inverter 30 is supplied to a terminal 34 via the inverter 36 and also to a terminal 35 as it is. The output of the terminals 34 and 35 is supplied to the rearward-pulse delay line 7 as a state signal Q and its inverted signal /Q respectively. The state-holding part records a state using the value of electric charge stored in the gate capacity of the inverter 36.

FIG. 5 shows the n-th rearward-pulse delay circuit 7-n. To a terminal 44, a rearward pulse RCL(n+1) from the rearward-pulse delay circuit 7-(n+1) in the succeeding stage is inputted, and to a terminal 45, the clock signal CLK from the receiver 2 is inputted. Signals inputted to the terminals 44 and 45 are supplied to clocked inverters 46 and 47 respectively.

The clocked inverter 46 conducts by becoming "H" of the state signal Q(n+z) at the (n+z)th state-holding circuit 6-(n+z) becomes "H" and the clocked inverter 47 conducts by becoming "H" of /Q(n+z), the inverted signal of the state signal, from the (n+z)th state-holding circuit 6-(n+z). An output terminal of the clocked inverter 46 is connected to a terminal 41 via an inverter 48 and also to a terminal 42 via an inverter 49. An output terminal of the clocked inverter 47 is connected to a terminal 42 via the inverter 49 and also to the terminal 41 via the inverter 48. An output terminal of the inverter 48 is connected to a terminal 43 via the inverter 50. The terminal 41 is connected to the terminal 44 of the rearward-pulse delay circuit 7-(n−1) in the preceding stage. The inverter 49 is for load adjusting. To the input terminals 44 and 45 of the rearward-pulse delay circuits in the last stage, the clock signal CLK from the receiver 2 is supplied.

In FIGS. 3–5, x is an anti-jitter measure, and y, z are to subtract a delay time which arises between the timing when the time (τ−A) elapsed since the start of propagation of forward pulse and the time when the propagation of forward pulse stops and propagation of rearward pulse starts. Note that n is an integer larger than 0 and x, y, z are integers.

Figure 6:
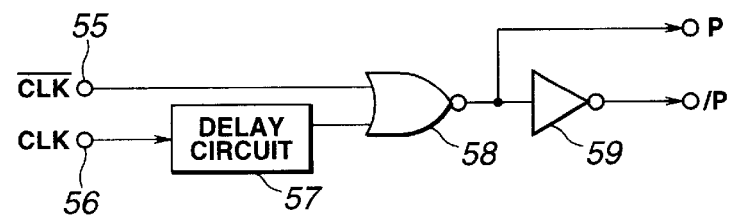
FIG. 6 is a circuit diagram showing a control pulse generating circuit 9 shown in FIG. 1.

Control pulses P and /P to be supplied to the delay unit 4 are generated by the control pulse generating circuit 9 shown in FIG. 6. The control pulse generating circuit 9 has input terminals 56 and 55 to which the clock signal CLK and its inverted signal /CLK are inputted respectively (not shown in the figure).

The clock signal CLK is supplied to a delay circuit 57. The delay circuit 57 delays the clock signal CLK by a delay time A', which is shorter than the delay time A of the delay monitor 3, and gives it to an NOR circuit 58. To the NOR circuit 58, the clock signal /CLK has also been given from the terminal 55, and the NOR circuit 58 outputs a control pulse P which becomes "H" only when both of two-input are at "L". The control pulse P is inverted by an inverter 59 to give a control pulse /P.

Figure 18:
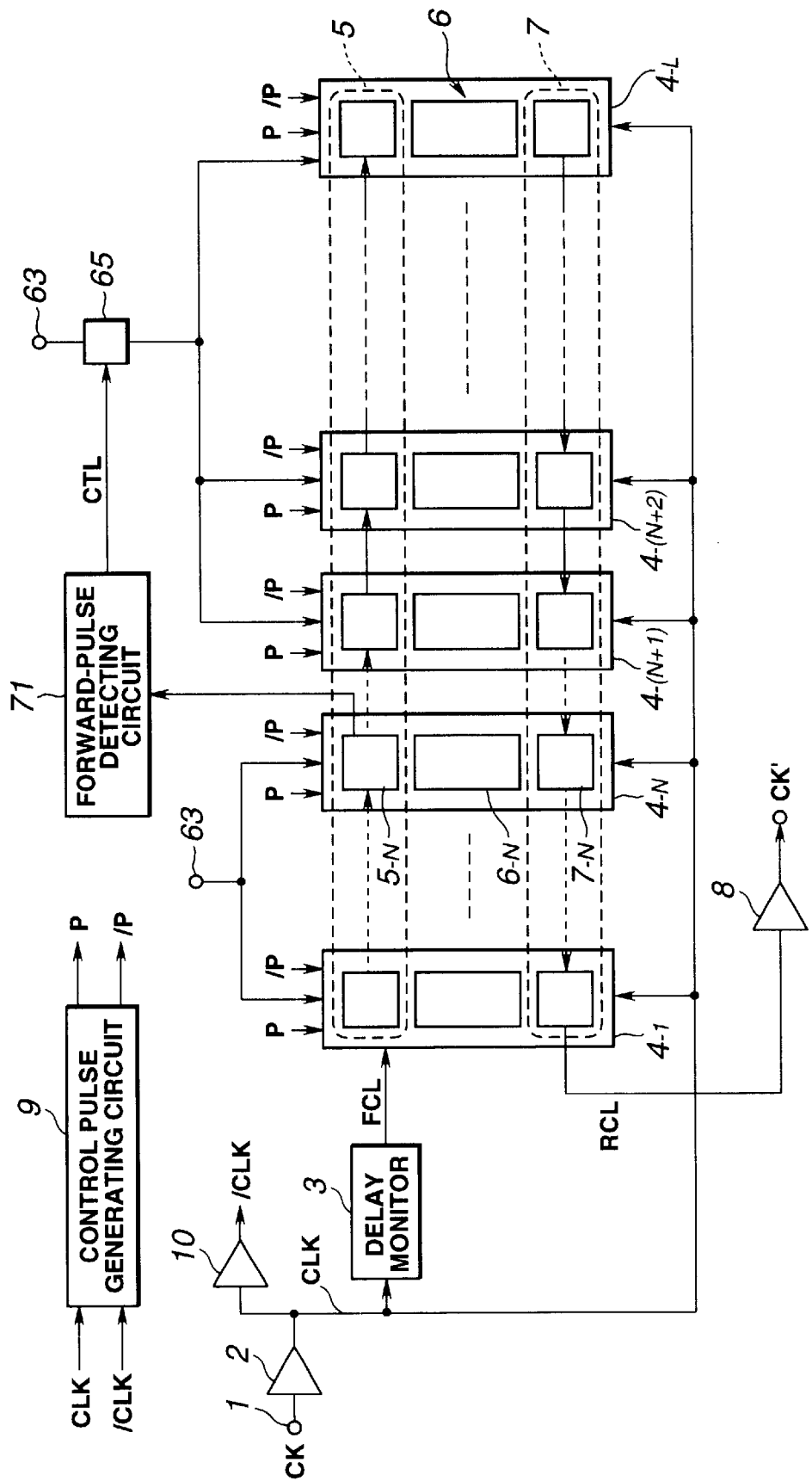
FIG. 18 is a block diagram showing another embodiment of the present invention.

FIG. 18 is a block diagram showing another embodiment of the present invention. In FIG. 18, the same elements as those in FIG. 14 are given the same reference numerals and description about them is omitted.

This embodiment adopts a forward-pulse detecting circuit 71 in place of the forward-pulse detecting circuit 64. As an output terminal of the N-th forward-pulse delay circuit 5-N is connected to the forward-pulse detecting circuit 71, the forward-pulse detecting circuit 71 is designed to continue supplying electric power to the forward-pulse delay circuit 5 and the rearward-pulse delay circuit 7 in and after the (N+1)th stage and the state-holding circuit 6 in and after the (N+2)th stage once forward pulse is propagated up to the N-th stage. In this embodiment, too, power supply voltage is unconditionally supplied to forward-pulse delay circuits and rearward-pulse delay circuits in stages from the 1st to the N-th and to state-holding circuits in stages form the 1st to the (N+1)th via the terminal 63.

In order to simplify description and figures, hereinafter, mutual difference may be ignored in respect of corresponding stages among forward-pulse delay circuits, state-holding circuits and rearward-pulse delay circuits, and a number of stages of delay units may be represented by the number of stages of forward-pulse delay circuits.

The outline of the forward-pulse detecting circuit 71 will be described with reference to FIGS. 18, 19, and 20.

Figure 19:
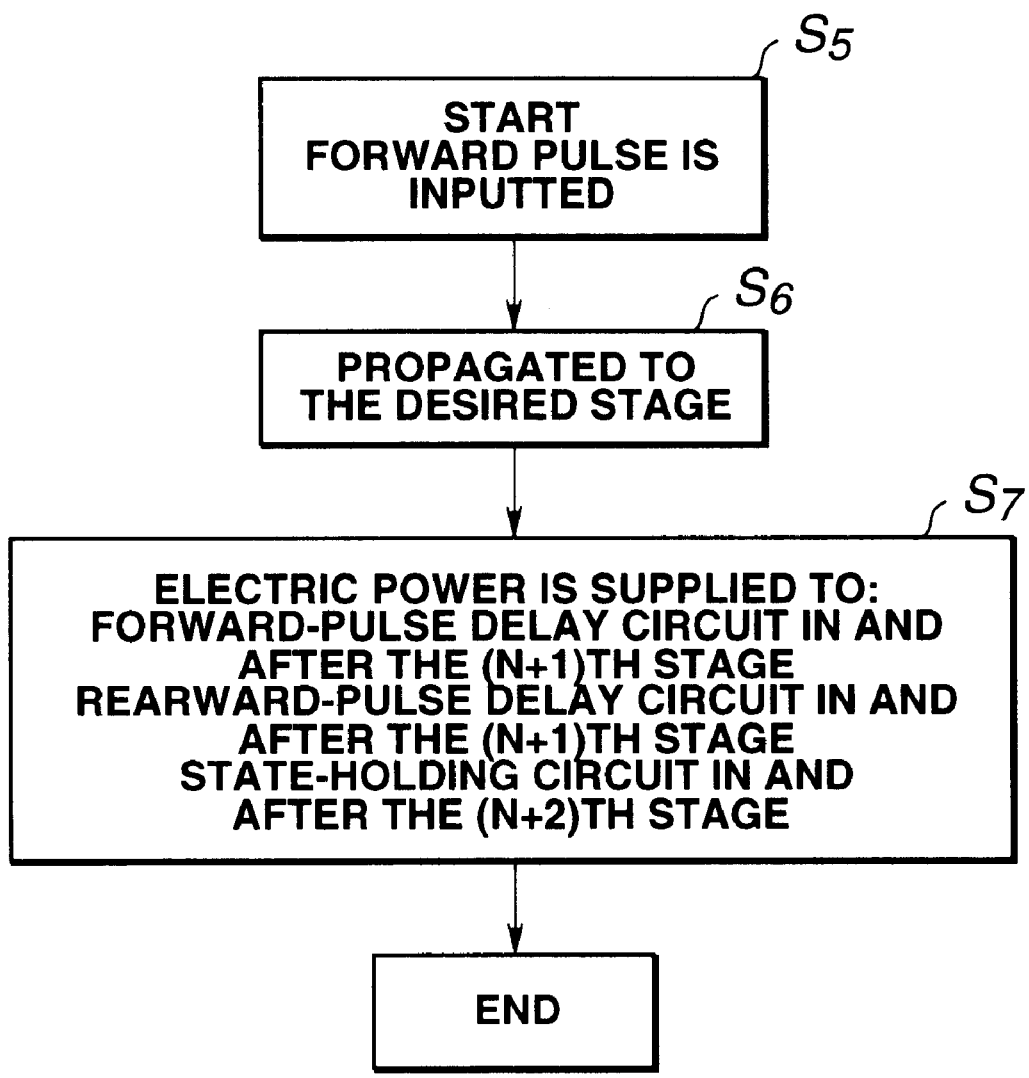
FIG. 19 is a flow chart illustrating the operation of the embodiment in FIG. 18.
Figure 20:
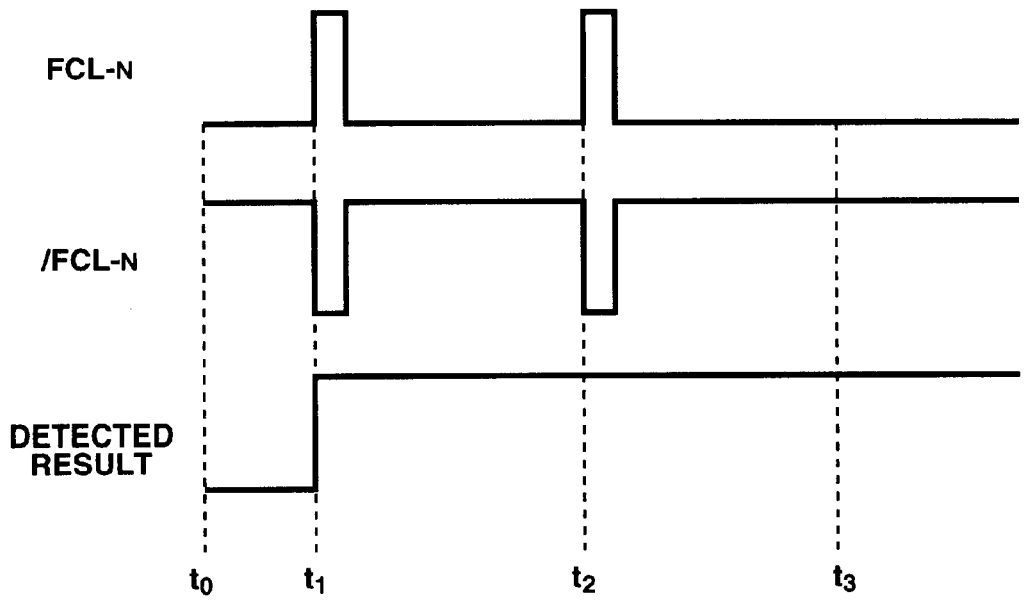
FIG. 20 is a waveform diagram illustrating the operation of the embodiment in FIG. 18.

FIG. 19 is a flow chart illustrating the operation and FIG. 20 is a timing chart illustrating the same. FIG. 20 shows the output FCL-N of the N-th forward-pulse delay circuit 5-N, its inverted signal /FCLn and the control signal CTL from the forward-pulse detecting circuit 71.

Figure 12:
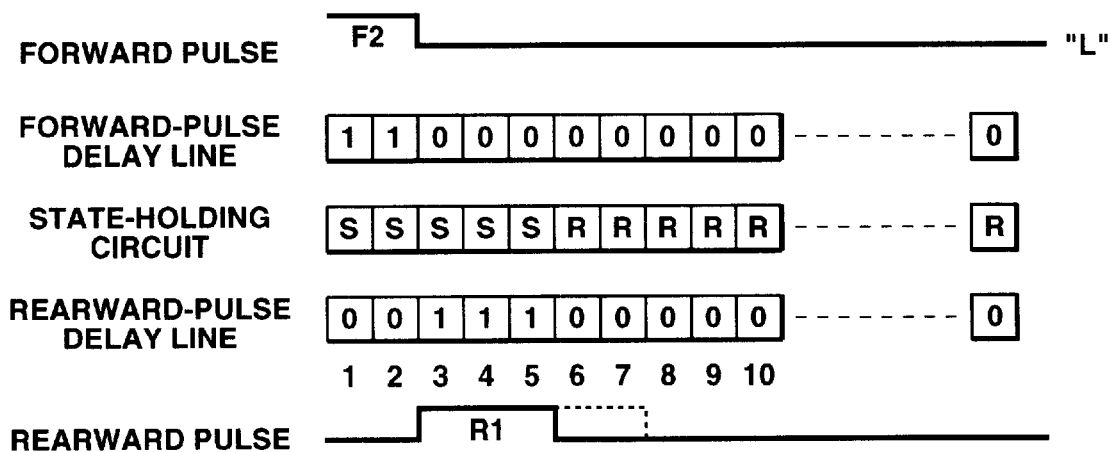
FIG. 12 is an explanatory view illustrating the operation of a related art.
Figure 13:
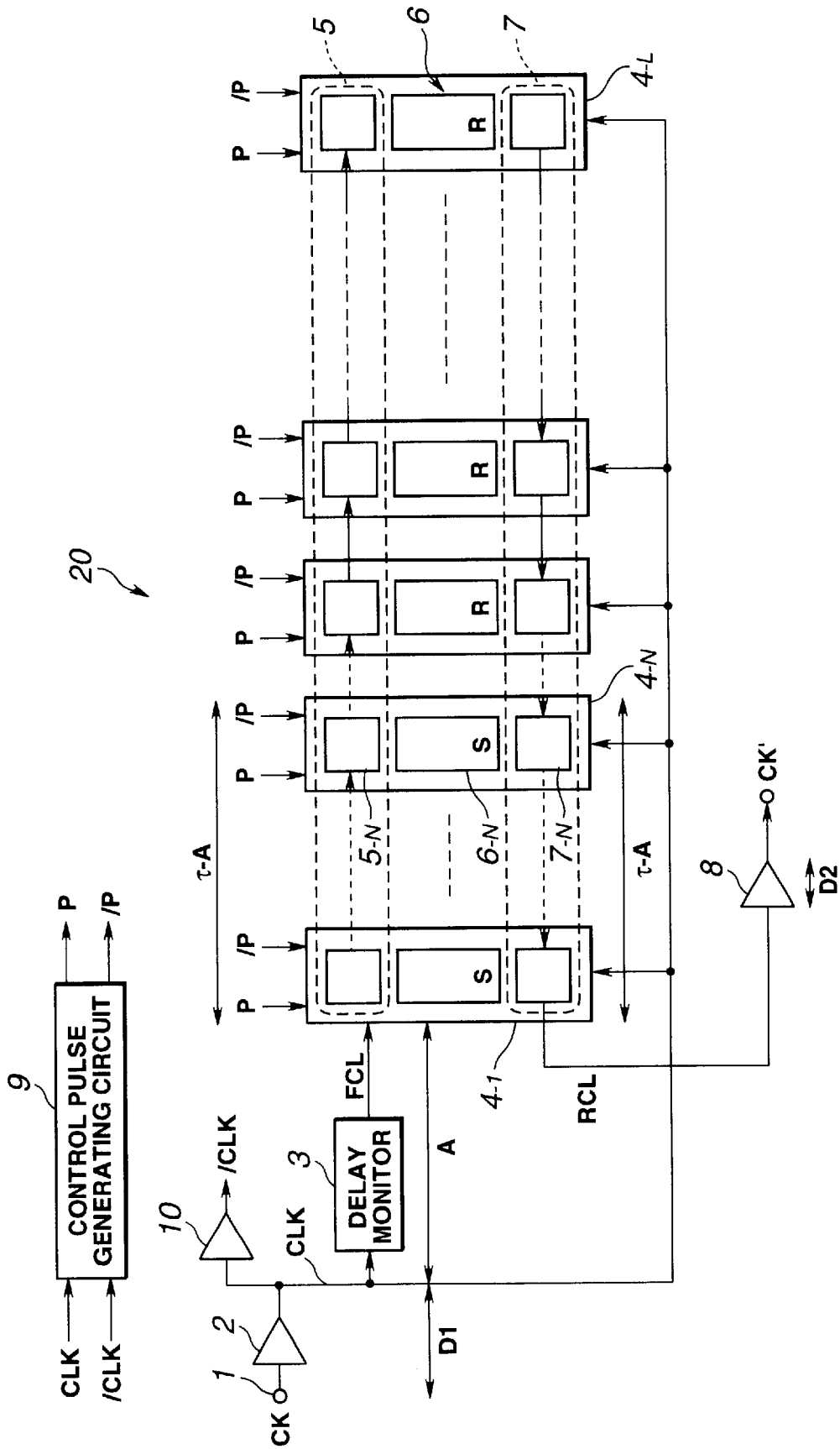
FIG. 13 is a block diagram showing the operation according to a related art.

The forward-pulse detecting circuit 71 is supposed to be initialized corresponding to a pulse signal (not shown) which is generated when the power supply is turned on and the output CTL is supposed to turn to "L" as shown in FIG. 12. At the time when the pulse signal is inputted, forward pulse has not been generated and /FCL, which is the output of the N-th forward-pulse delay circuit 5-N, is at "H". CTL is maintained at "L" unless forward pulse is propagated to the N-th stage, and the power supply control switch 65 is inputted with "L" to be turned off at "L" of CTL. When CLT is at "L", the power supply control switch 65 is set to off, to the forward-pulse delay circuits 5-(N+1) to 5-L, the rearward-pulse delay circuits 7-(N+1) to 7-L in and after the (N+1)th stage, and to the state-holding circuits 6-(N+2) to 6-L in and after the (N+2)th stage, electric power is not supplied. As a result, no electric power is consumed by these circuits.

Now, suppose that forward pulse is propagated up to the N-th forward-pulse delay circuit 5-N (step S6 in FIG. 19). In this case, the forward pulse FCL-N turns to "H" as shown by timing t1 in FIG. 20. At this time, as shown by timing t1 in FIG. 20, the pulse /FCL-N, which is the inverted signal of the pulse FCL-N, turns to "L". When /FCL-N turns to "L", the output CTL of the forward-pulse detecting circuit changes from "L" to "H". The power supply control switch 65, which is controlled by the control signal CTL of the forward-pulse detecting circuit 71, is turned on when the control signal CTL is "H", and electric power is supplied to the forward-pulse delay circuits 5-(N+1) to 5-L and the rearward-pulse delay circuits 7-(N+1) to 7-L in and after the (N+1)th stage and to the state-holding circuits 6-(N+2) to 6-L in and after the (N+2)th stage (step S7 in FIG. 19). Once information that the pulse was propagated to the N-th stage is saved, CTL maintains "H" even when forward pulse is inputted again to the N-th stage at timing t2 or even when forward pulse stops being inputted to the N-th stage at timing t3.

In this manner, when forward pulse is propagated to the N-th forward-pulse delay circuit 5-N, as forward-pulse delay circuits and rearward-pulse delay circuits in and after the (N+1)th stage and state-holding circuits in and after the (N+2)th stage start operating, they work as a clock control circuit having L stages of delay lines.

Thus, in this embodiment, by using the forward-pulse detecting circuit 71, electric power is not supplied to forward-pulse delay circuits and rearward-pulse delay circuits in and after the (N+1)th stage and state-holding circuits in and after the (N+2)th stage so long as forward pulse is not propagated to the N-th forward-pulse delay circuit 5-N. When a clock control circuit is operated in high frequency, as the number of stages where forward pulse is propagated becomes smaller compared to the number of all stages, N can be smaller so as to reduce electric power consumption more than by the circuit according to a related art. When forward pulse is propagated to a stage in and after the N-th stage, forward-pulse delay circuits and rearward-pulse delay circuits in and after the (N+1)th stage and state-holding circuits in and after the (N+2)th stage are connected to the power source, and they operate as a clock control circuit having L stages of delay lines.

Figure 21:
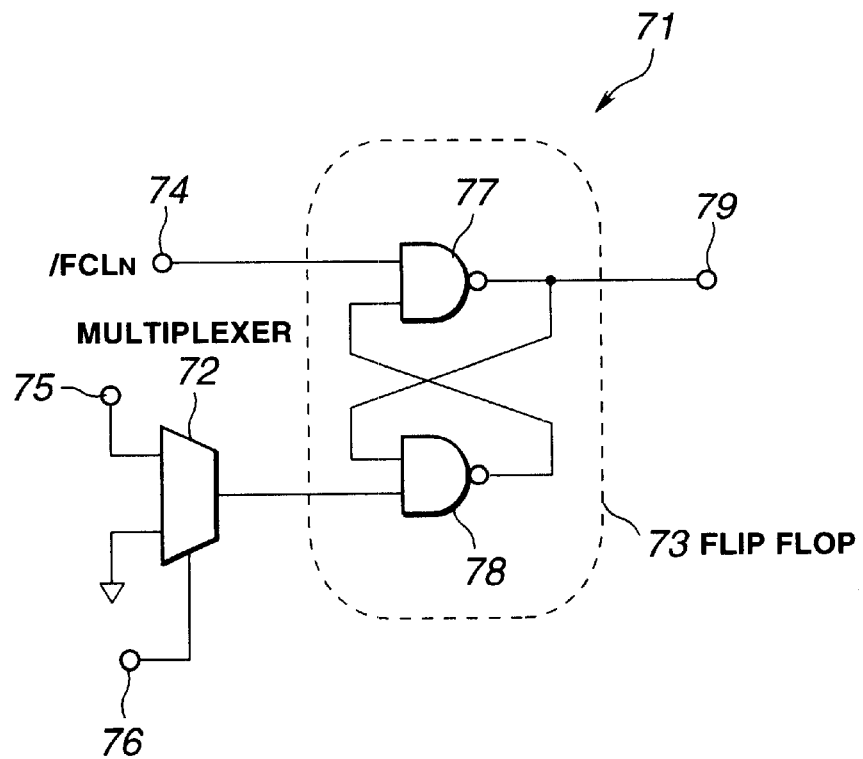
FIG. 21 is a circuit diagram showing concrete configuration of the forward-pulse detecting circuit 71 as shown in FIG. 18.

The configuration of the forward-pulse detecting circuit 71 and the power supply control switch are described below. FIG. 21 shows a circuit diagram illustrating an example of a specific configuration of the forward-pulse detecting circuit 71 in FIG. 18.

The forward-pulse detecting circuit 71 consists of a multiplexer 72 and a flip flop 73. To an input terminal 74, /FCL-N, which is an inverted signal of forward pulse, is inputted from the N-th forward-pulse delay circuit 5-N. This inverted signal /FCL-N is supplied to an input terminal of the multiplexer 72.

The multiplexer 72 is applied with power supply voltage via a terminal 75 and also connected to a ground. The multiplexer 72 is designed to have the flip flop 73 supplied with a signal at "H" or "L" corresponding to a pulse signal from a terminal 76. The flip flop 73 is configured with NAND circuits 77 and 78, turns to "H" when the forward pulse /FCL-N turns to "L" while "H" is being supplied from the multiplexer 72, and maintains "H" regardless of the forward pulse /FCL-N thereafter. The flip flop 73 is designed to be reset by being supplied with "L" from the multiplexer 72. The output of the flip flop 73 is outputted from an output terminal 79 as a control signal CTL of forward pulse.

Next, connecting of the forward-pulse detecting circuit 71 and the power supply control switch 65 to an STBD will be described with reference to FIG. 3. Now, suppose that, as a forward-pulse delay circuit, a circuit having the same configuration as that of the forward-pulse delay circuit 5-N, as shown in FIG. 3, is used. In this case the input terminal 74 of the forward-pulse detecting circuit 71 is connected to an output terminal of the inverter 28 which forms the N-th forward-pulse delay circuit 5-N. The output terminal 79 of the forward-pulse detecting circuit 71 is connected to an input terminal of the power supply control switch 65.

Figure 22:
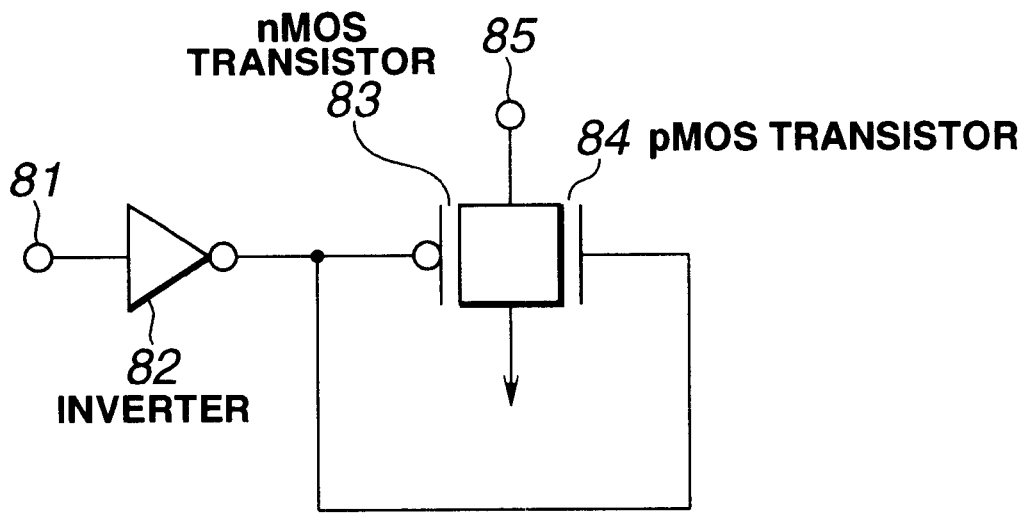
FIG. 22 is a circuit diagram showing an example of concrete configuration of the power supply control switch 65 in FIG. 18.
Figure 23:
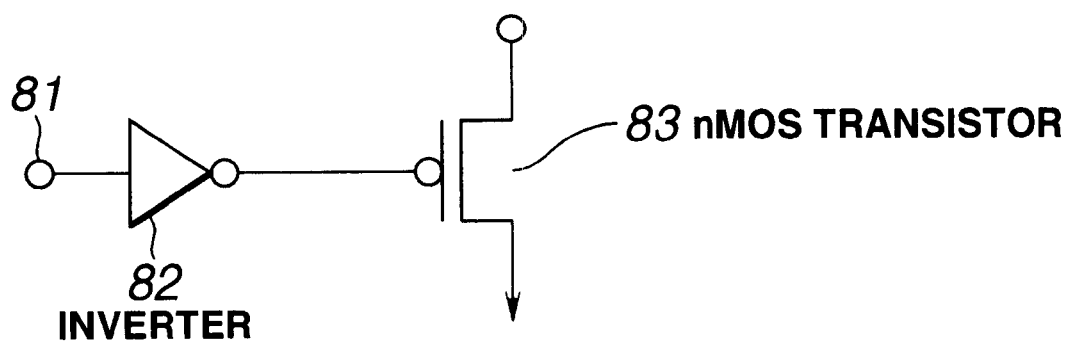
FIG. 23 is a circuit diagram showing an example of concrete configuration of the power supply control switch 65 in FIG. 18.

FIGS. 22 and 23 are circuit diagrams showing an example of the power supply control switch 65.

The power supply control switch as shown in FIG. 22 consists of an input terminal 81, an inverter 82, a path gate 86, an input terminal 85 and an output terminal 87. The path gate 86 is composed of a pMOS transistor 83 and an nMOS transistor 84. The power supply control switch as shown in FIG. 23 consists of the input terminal 81, the inverter 82, the pMOS transistor 83, the input terminal 85 and the output terminal 87.

The control signal CTL of forward pulse from the forward-pulse detecting circuit 71 is inputted to the terminal 81. This control signal CTL is inverted by the inverter 82 and supplied to the gate of the nMOS transistor 83. To the source of the nMOS transistor, power supply voltage is supplied via the terminal 85, and the drain is connected to forward-pulse delay circuits, rearward-pulse delay circuits in and after the (N+1)th stage and state-holding circuits in and after the (N+2)th stage.

Figure 24:
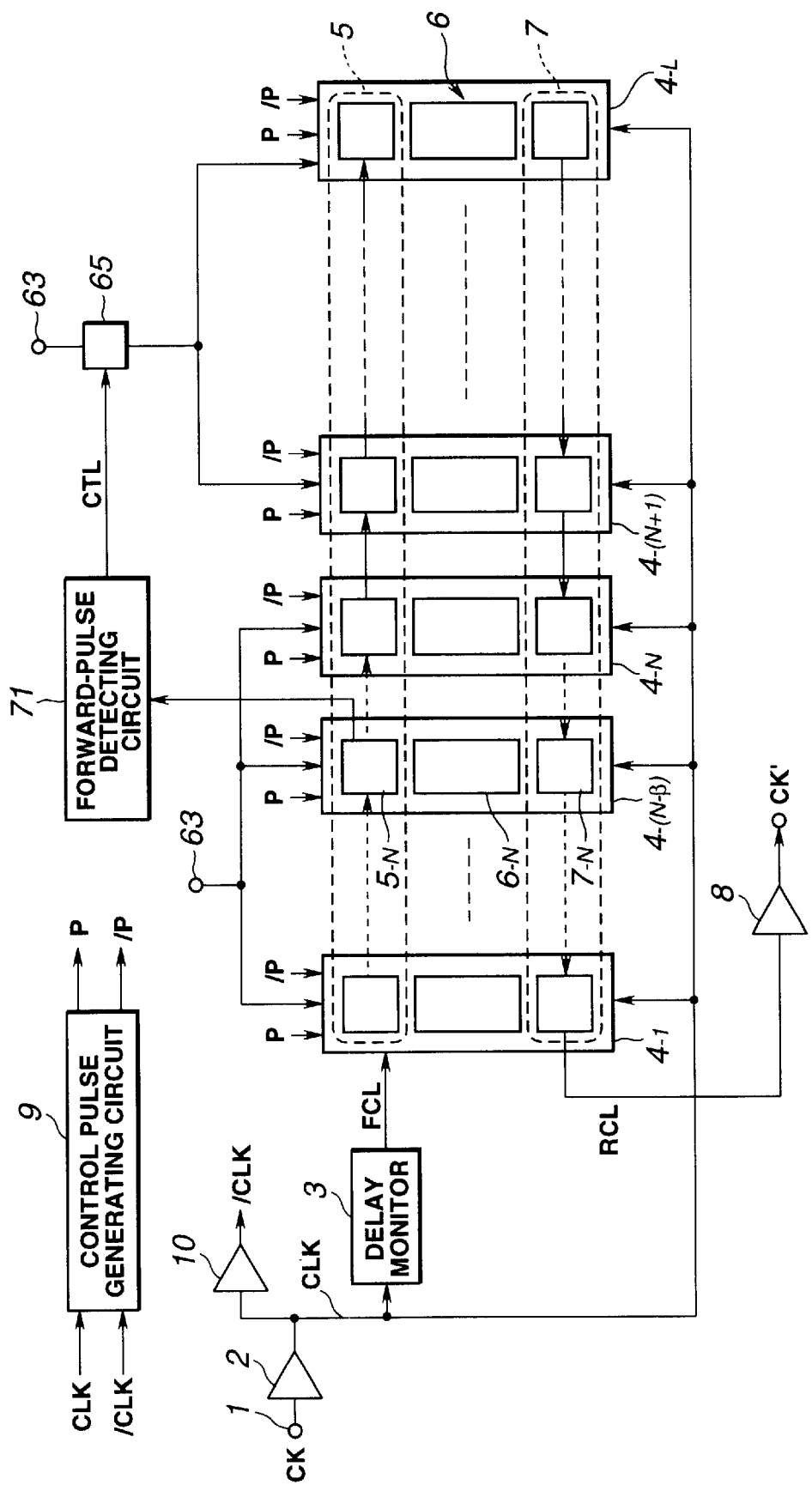
FIG. 24 is a block diagram showing another embodiment of the present invention.

FIG. 24 is a block diagram showing another embodiment of the present invention. In FIG. 24, the same elements as those in FIG. 18 are given the same reference numerals and description about them is omitted.

In this embodiment, too, power supply voltage is unconditionally supplied to forward-pulse delay circuits and rearward-pulse delay circuits in stages from the 1st to the N-th and state-holding circuits in stages from the 1st to the (N+1)th via the terminal 63. In this embodiment, an inverted signal of forward pulse, which is generated in the (N-β)th stage, namely, in a stage β stages before the N-th, is supplied to the forward-pulse detecting circuit 71.

If the power supply control switch 65, which is connected to a circuit comprising the forward-pulse delay circuits 5-(N+1) in and after the (N+1)th stage, is designed to be turned on when forward pulse is propagated to the N-th forward-pulse delay circuit 5-N, the circuit, which is connected to the power supply control switch 65, sometimes is not in a state where it operates stably at a time when the pulse is being propagated from the N-th stage to the (N+1)th stage. In this case, the clock control circuit does not operate reliably.

To cope with this, through controlling the power supply control switch 65 with the output of the (N-β)th forward-pulse delay circuit 5-(N-β) in a stage before the N-th, a circuit, which has been connected to the power supply control switch 65, is designed to operate stably when the pulse is inputted from the N-th stage to the (N+1)th stage. With this, the operation of the clock control circuit is more stabilized.

When a stress test in high frequency is given on such circuits as shown in FIG. 18 and FIG. 24, there are some circuits which are not supplied with electric power and do not operate. Circuits with no power supply nor operation may make a stress test unsuccessful. As a countermeasure to this, it is possible to bring a state where all delay units are supplied with electric power even when forward pulse is not propagated up to a desired stage by providing a new signal to control the forward-pulse detecting circuit 71 and using it.

Figure 25:
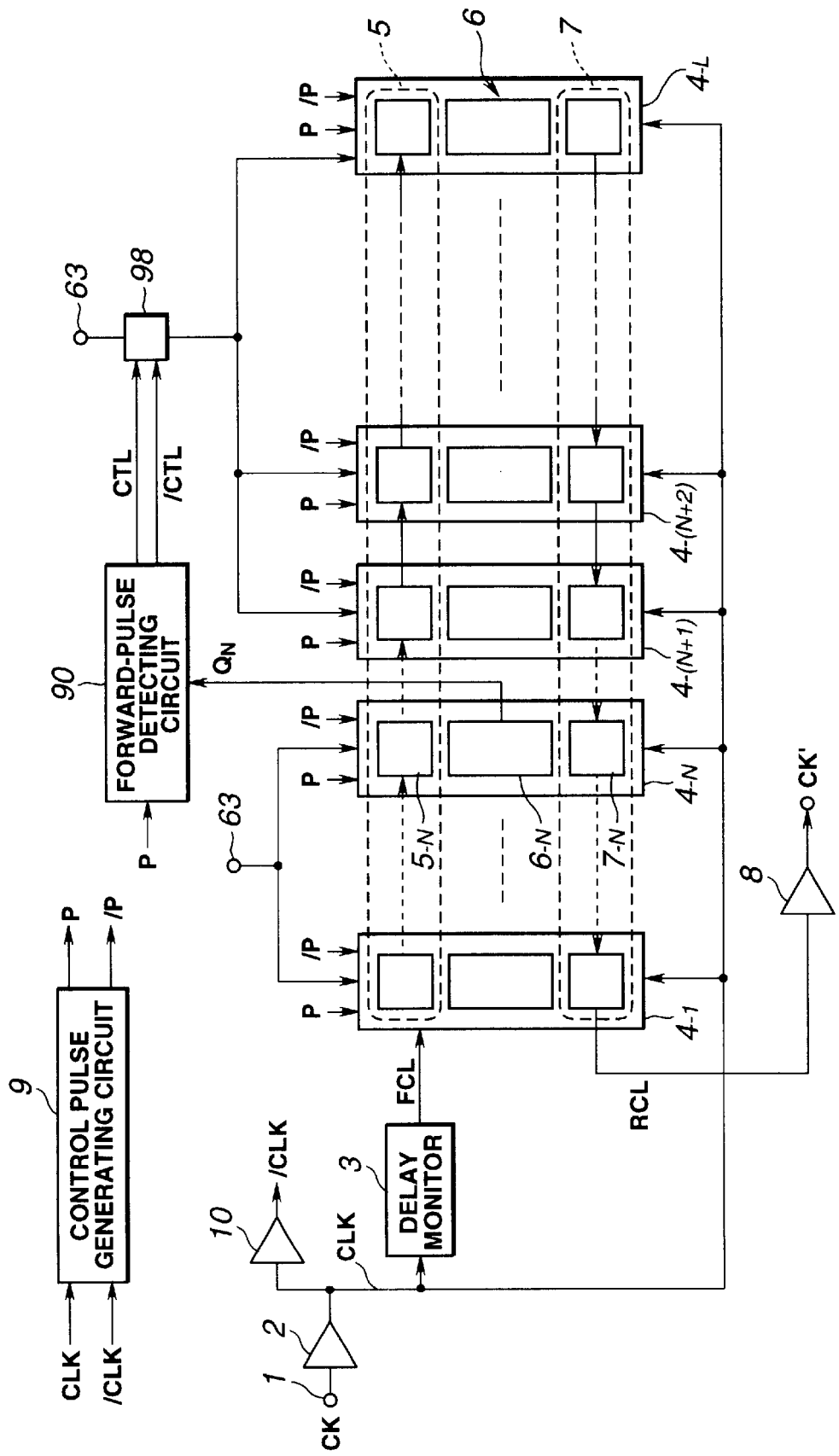
FIG. 25 is a block diagram showing another embodiment of the present invention.

FIG. 25 is a block diagram showing another embodiment of the present invention. In FIG. 25, the same elements as those in FIG. 18 are given the same reference numerals and description about them is omitted.

This embodiment differs from that in FIG. 18 in points that, instead of the forward-pulse detecting circuit 71 and the power supply control switch 65, a forward-pulse detecting circuit 90 and a power supply control switch 98 are provided respectively. The forward-pulse detecting circuit 90 is connected to the output $Q_N$ of the N-th state-holding circuit.

In the embodiment shown in FIG. 18, the forward-pulse detecting circuit 71 supplies power supply voltage to forward-pulse delay circuits and rearward-pulse delay circuits in and after the (N+1)th stage and state-holding circuits in and after the (N+2)th stage once forward pulse was propagated to the N-th forward-pulse delay circuit 5-N. In consequence, if the period τ of an external clock signal changes after forward pulse was propagated to the N-th stage and propagation of forward pulse in and after the N-th stage is stopped, the control signal CTL is kept at "H", and forward-pulse delay circuits and rearward-pulse delay circuits in and after the (N+1)th stage and state-holding circuits in and after the (N+2)th stage continue operating. This embodiment aims at preventing this. That is, the forward-pulse detecting circuit 90 is designed not only to have power supply voltage supplied when forward pulse was propagated to the N-th forward-pulse delay circuit 5-N but also to stop the supply of power supply voltage when forward pulse stops being propagated to the N-th stage.

Figure 26:
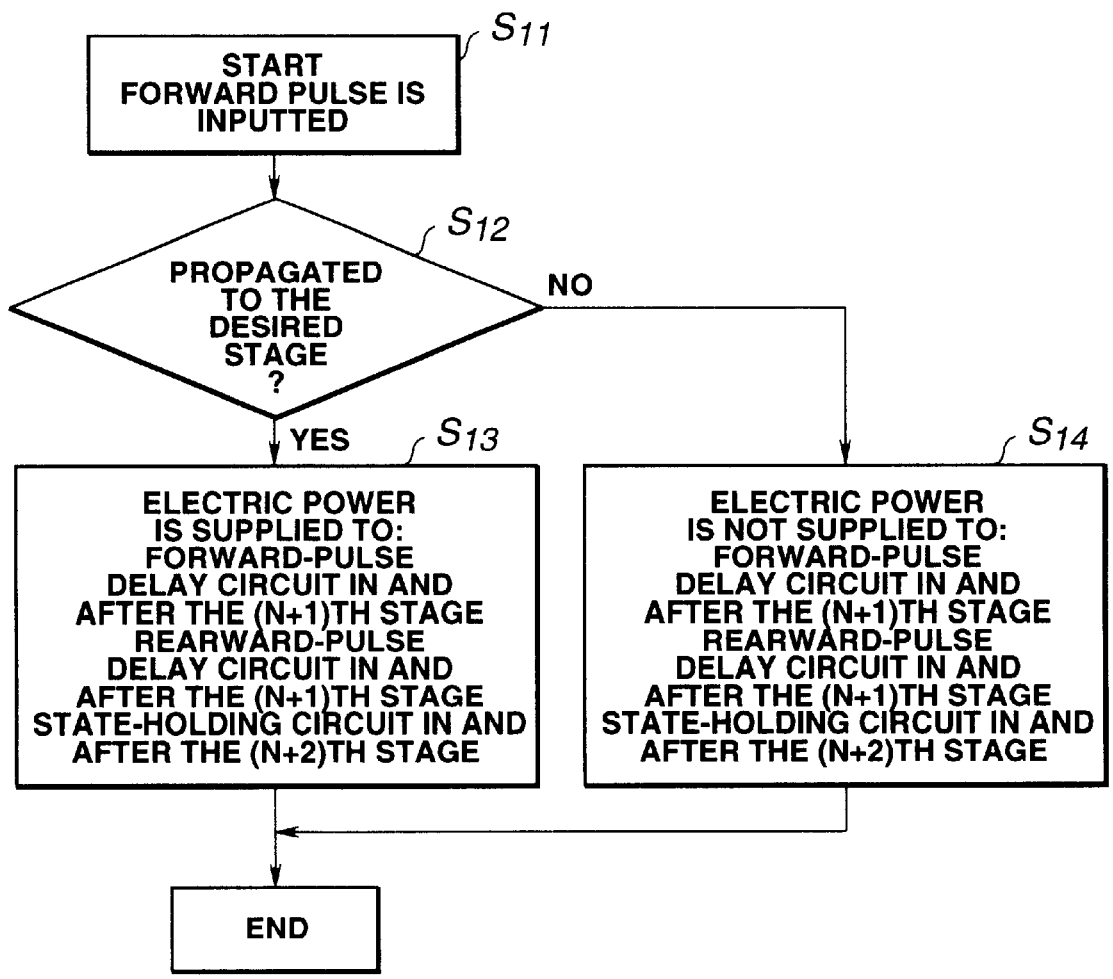
FIG. 26 is a flow illustrating the operation of the embodiment in FIG. 25.

An outline of the operation of the embodiment configured in such a manner will be described with reference to FIGS. 26 and 27. FIG. 26 is a flow chart illustrating the operation, and FIG. 27 is a waveform diagram illustrating the same.

Figure 27:
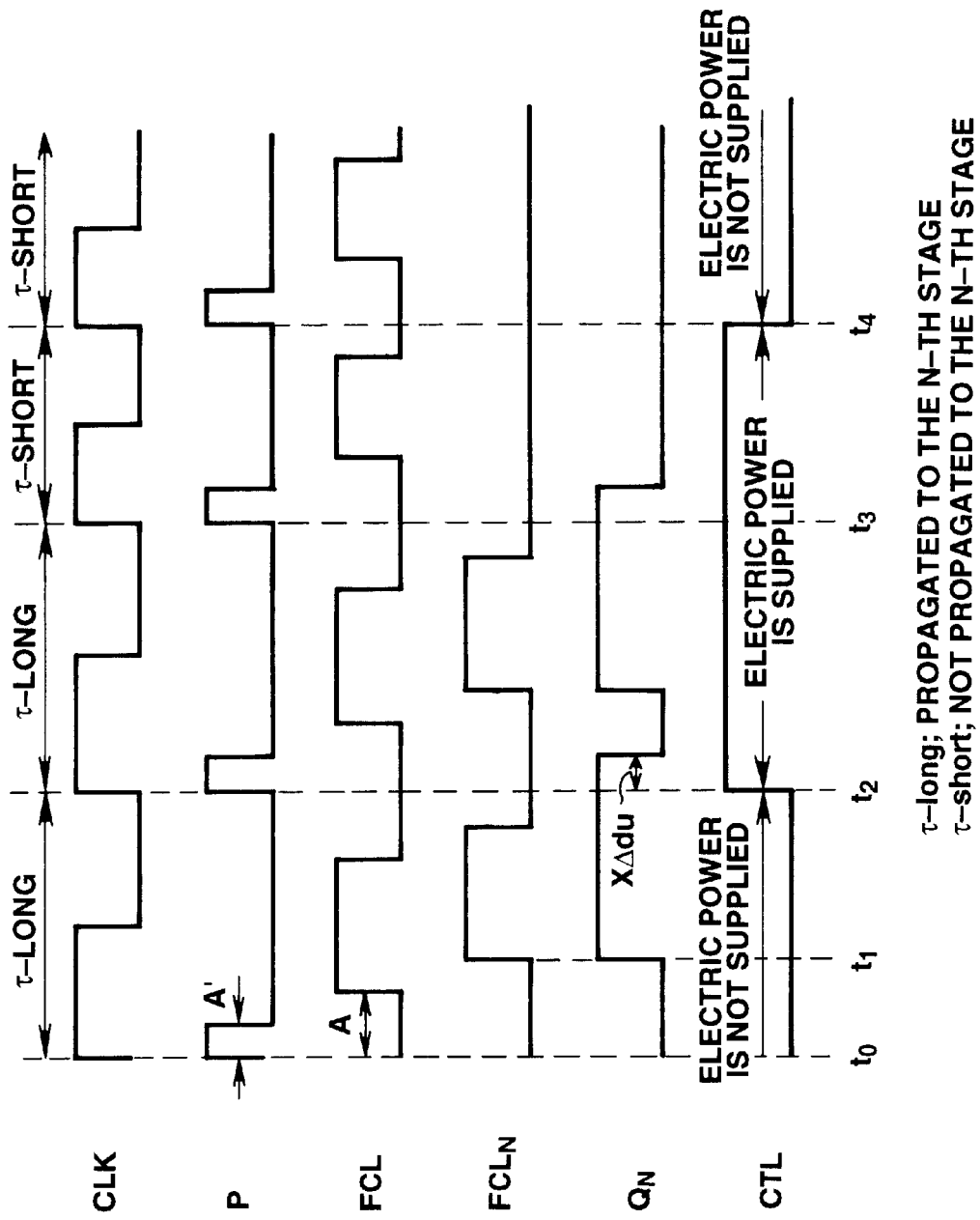
FIG. 27 is a waveform diagram illustrating the operation of the embodiment in FIG. 25.

FIG. 27 shows the clock CLK from the receiver 2, the control pulse P, the forward pulse FCL, the output of the N-th forward-pulse delay circuit 5-N, the state signal Q-N in the N-th stage and the control signal CTL from the forward-pulse detecting circuit 90.

The forward-pulse detecting circuit 90 detects whether forward pulse was propagated up to the N-th stage by examining the value of the output signal Q-N of the N-th state-holding circuit 6-N, synchronizing to the output signal P of the control pulse generating circuit 9 (step S12 shown in FIG. 26). The state-holding circuit 6-N is supposed to have been initialized to /Q's "H" and Q's "L", namely, to the reset state.

The period of the external clock signal CK changes from the long periods long, with which forward pulse is propagated to and after the N-th stage, to the short periodsτ short, with which forward pulse is not propagated to the N-th stage.

When an external clock signal CK is inputted to the receiver 2, as shown in FIG. 27, a clock signal CLK is generated from the receiver 2 and inputted to the control pulse generating circuit 9 and the delay monitor 3 as shown in FIG. 25. From the control pulse generating circuit 9, a signal P, which rises synchronizing to the rising of the clock signal CLK, is generated (see FIG. 27). From the delay monitor 3, as shown in FIG. 25, an input signal FCL for the forward-pulse delay line 5 is generated.

As shown by the time from t0 to t1 in FIG. 27, since the output signal Q-N of the N-th state-holding circuit 6-N, as shown in FIG. 27, is at "L" unless forward pulse is propagated up to the N-th stage, the value "L" of Q-N at the time when the control pulse P rose at timing t0 is taken in to the forward-pulse detecting circuit 90. With this operation, the forward-pulse detecting circuit 90 continues outputting "L" as the control signal CTL. The power supply control switch 98 is turned off when the control signal CTL is "L", and electric power is not supplied to the forward-pulse delay circuits 5-(N+1) to 5-L and the rearward-pulse delay circuits 7-(N+1) to 7-L in and after the (N+1)th stage and the state-holding circuits 6-(N+2) to 6-L in and after the (N+2)th stage (step S14 in FIG. 26). Consequently, electric power is not consumed in these circuits.

As shown by timing t1 in FIG. 27, when forward pulse is propagated (FCL-N="H") to the N-th stage, the output signal Q-N of the N-th state-holding circuit 6-N turns to "H" as shown in FIG. 27. At timing t2, the control pulse P rises and rearward pulse is generated at the rearward-pulse delay line 7. When the delay time per stage of forward-pulse delay circuits and rearward-pulse delay circuits is Δdu, Q-N turns to "H" at least during the time (XΔdu), which is a time between a time when rearward pulse is propagated to the (N-X)th stage and a time when the N-th state-holding circuit 6-N is reset by the output of the (N-X)th rearward-pulse delay circuit, namely, /RCL-(N-X)'s turning to "H".

When the forward-pulse detecting circuit 90 is controlled by the control pulse P, the output Q-N of the state-holding circuit 6-N is taken into the forward-pulse detecting circuit 90 at the rising of the control pulse P if the output of rearward-pulse delay circuits is supplied to a state-holding circuit in X stages after so as to be XΔdu>A', or, if a signal, which is synchronized to the control pulse P and has a pulse width shorter than XΔdu, is generated and controls the forward-pulse detecting circuit 90. When the control pulse P rose at timing t2, the control signal CTL of the forward-pulse detecting circuit 90 turns to "H" as shown in FIG. 27.

After that, CTL turns to "H" at timings between t2 and t3 when forward pulse is propagated to the N-th stage.

When the control signal CTL turns to "H", the power supply control switch 65 is turned on, electric power is supplied to forward-pulse delay circuits and rearward-pulse delay circuits in and after the (N+1)th stage and state-holding circuits in and after the (N+2)th stage (step S13 in FIG. 26), and they operate as a clock control circuit having L stages of delay lines.

Now, a description is given on the operation in a case where forward pulse was propagated to the N-th forward-pulse delay circuit once, then, stops being propagated to the N-th stage. When the period of CLK is shortened and the forward pulse is not propagated to the N-th stage as shown by timing between t3 and t4 of the waveform diagram in FIG. 27 (FCLN="L"), as Q-N, namely, the output of the N-th state-holding circuit 6-N resumes outputting "L", "L" is taken in to the forward-pulse detecting circuit 90 at the rising of the control pulse P at timing t4. With this operation, the control signal CTL from the forward-pulse detecting circuit 90 is maintained at "L". When the control signal CTL is maintained at "L", the power supply control switch 98 is turned off and the supply of electric power to forward-pulse delay circuits and rearward-pulse delay circuits in and after the (N+1)th stage and state-holding circuits in and after the (N+2)th stage is stopped again.

Thus, in this embodiment, as electric power is not supplied to forward-pulse delay circuits and rearward-pulse delay circuits in and after the (N+1)th stage and state-holding circuits in and after the (N+2)th stage unless forward pulse is propagated to the N-th forward-pulse delay circuit 5-N, they operate as a clock control circuit having N stages of delay lines. When a clock control circuit is operated in high frequency, as the period τ of an external clock signal is short, it is possible to make N small compared to the number L of the whole stages. As a result, electric power consumed for the operation in high frequency can be more reduced compared to the circuit according to a related art.

When forward pulse is propagated in and after the N-th stage, forward-pulse delay circuits and rearward-pulse delay circuits in and after the (N+1)th stage and state-holding circuits in and after the (N+2)th stage are connected to the power supply so as to operate as a clock control circuit having L stages of delay lines.

Further, when the period τ of an external clock signal changes to stop propagation of the pulse to the N-th stage after it was propagated in and after the N-th stage, the supply of electric power to forward-pulse delay circuits, rearward-pulse delay circuits and state-holding circuits in the (N+1)th stage can be cut off again so as to reduce electric power consumption still more than in the embodiment in FIG. 18.

Figure 28:
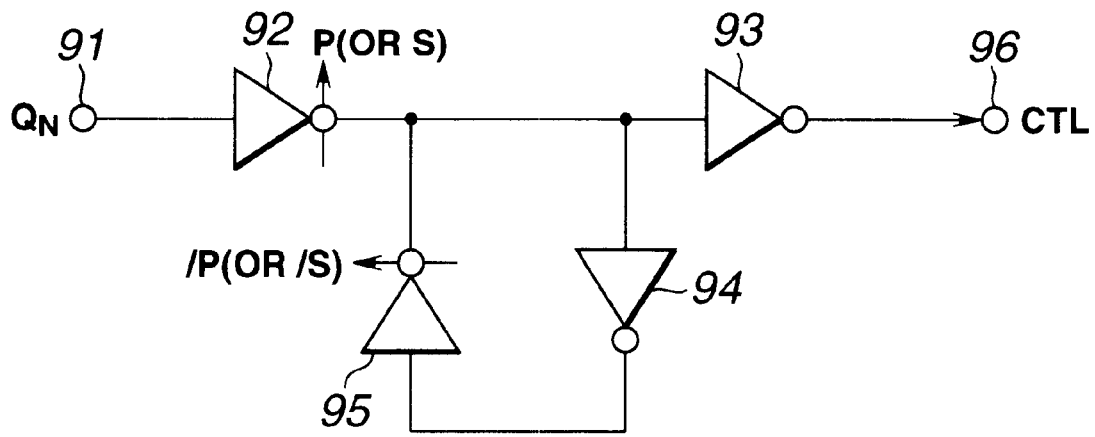
FIG. 28 is a circuit diagram showing concrete configuration of the forward-pulse detecting circuit 90 as shown in FIG. 25.

Now, a description will be given on configuration of the forward-pulse detecting circuit 90 and the power supply control switch 98. In FIG. 28, an example of configuration of the forward-pulse detecting circuit 90 is shown.

In FIG. 28, the forward-pulse detecting circuit 90 consists of clocked inverters 92, 95 and inverters 93 and 94. To an input terminal 91, a state signal Q-N of the N-th state-holding circuit 6-N is inputted. This state signal Q-N is supplied to the clocked inverter 92. An output terminal of the clocked inverter 92 is connected to input terminals of the inverters 93, 94, and an output terminal of the inverter 95. An output terminal of the inverter 93 is connected to an output terminal 96, and an output terminal of the inverter 94 is connected to an input terminal of the clocked inverter 95. An output terminal of the clocked inverter 95 is connected to an output terminal of the clocked inverter 92 and input terminals of the inverters 93 and 94. For the forward-pulse detecting circuit 90, a circuit other than the one as shown in FIG. 28 may be used so long as it can configure a D-type flip flop.

Next, connecting of the forward-pulse detecting circuit 90 and the power supply control switch 98 to an STBD will be described with reference to FIG. 4. Now, suppose that, for a state-holding circuit, the state-holding circuit 6-N as shown in FIG. 4 is adopted. In this case, the input terminal 91 of the forward-pulse detecting circuit 90 is connected to the output terminal 34 of the N-th state-holding circuit 6-N, and a state signal Q-N is inputted to the forward-pulse detecting circuit 90.

The output terminal 96 of the forward-pulse detecting circuit 90 is connected to an input terminal of the power supply control switch 98. When the power supply control switch 98 is controlled only by the control signal CTL of the forward-pulse detecting circuit 90, for a power supply control switch 98, a circuit as shown in FIGS. 22 and 23 can be adopted as well as the power supply control switch 65. In this case, connecting of the forward-pulse detecting circuit 90 and the power supply control switch 98 to an STBD is the same as in the case where the forward-pulse detecting circuit 71 is used as shown in FIG. 18.

In this embodiment, the forward-pulse detecting circuit 90 is designed to be able to supply not only the control signal CTL from the inverter 93 but also its inverted signal /CTL to the power supply control switch 98. When the power supply control switch 98 controls power supply using the control signal CTL and its inverted signal /CTL, a circuit as shown in FIG. 29 is adopted.

Figure 29:
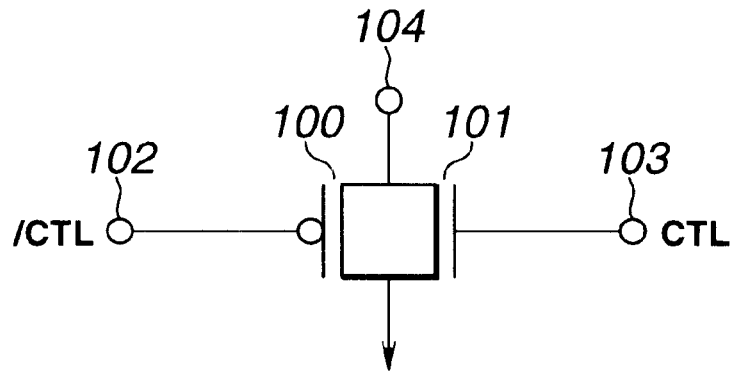
FIG. 29 is a circuit diagram showing concrete configuration of the power supply switch 98 in FIG. 25.

FIG. 29 is a circuit diagram showing an example of concrete configuration of the power supply control switch 98 as shown in FIG. 25.

The power supply control switch 98 is composed of an nMOS transistor 100 and a pMOS transistor 101. The inverted signal /CTL of the control signal CTL is supplied to the gate of the transistor 100 via an input terminal 102, and the control signal CTL is supplied to the gate of the transistor 101 via an input terminal 103. Power supply voltage from a terminal 104 is supplied to the source of the transistors 100 and 101.

Figure 30:
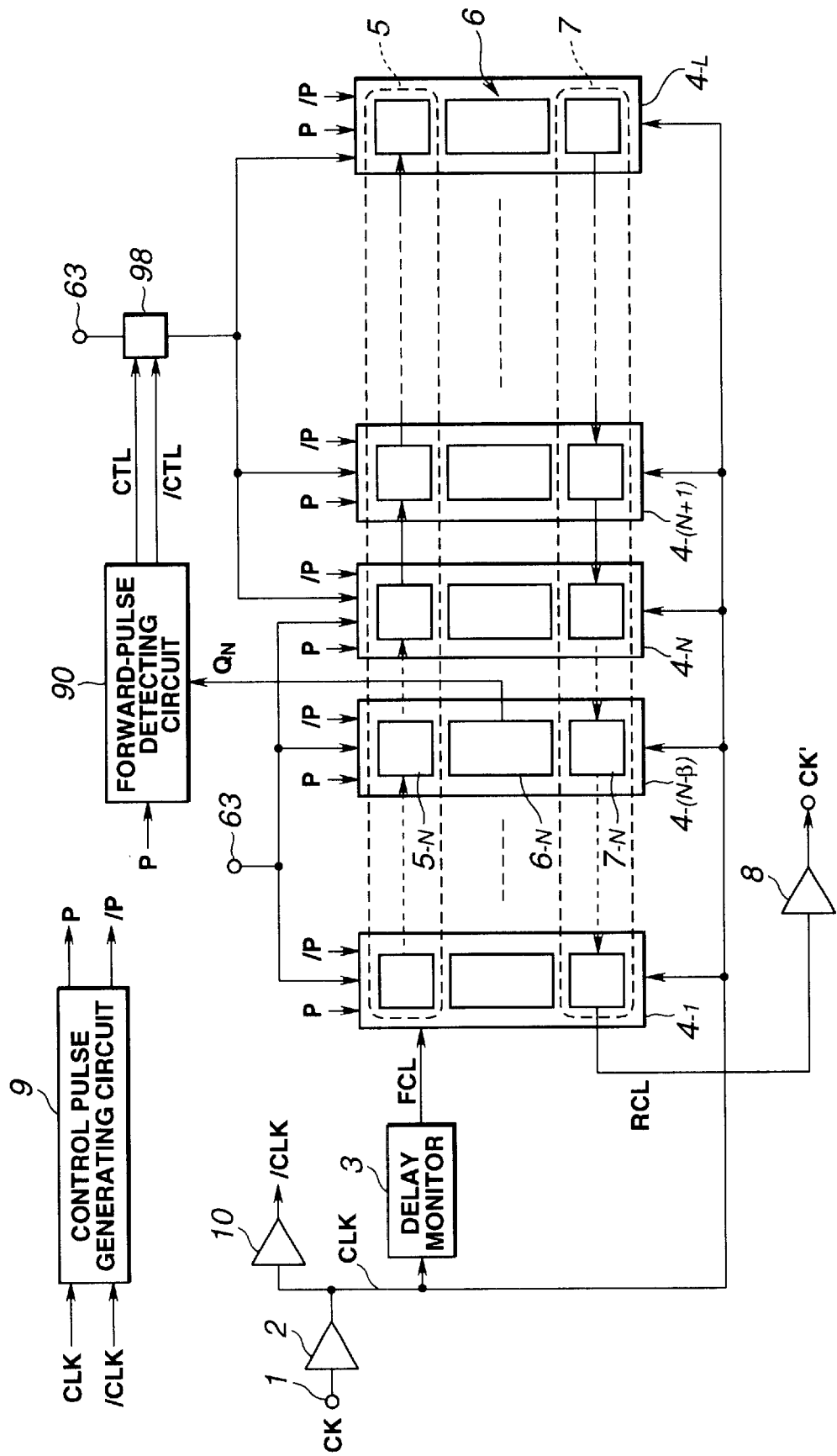
FIG. 30 is a block diagram showing another embodiment of the present invention.

FIG. 30 is a block diagram showing another embodiment of the present invention. In FIG. 30, the same elements as those in FIG. 25 are given the same reference numerals and description about them is omitted.

In this embodiment, too, forward-pulse delay circuits and rearward-pulse delay circuits in stages from the 1st to the N-th and state-holding circuits in stages from the 1st to the (N+1)th are designed to be supplied with power supply voltage unconditionally via the terminal 63. In this embodiment, inverted signal of the forward pulse generated in the stage (N-β), which is a stage β stages before the N-th, is supplied to the forward-pulse detecting circuit 90.

When forward pulse was propagated to the N-th forward-pulse delay circuit 5-N, and when the power supply control switch 98, which is connected to a circuit containing the forward-pulse delay circuit 5-(N+1) in and after the (N+1)th stage, has been turned on, the state sometimes fails to be one where a circuit, which is connected to the power supply control switch 98, can operate stably. In this case, a clock control circuit does not operate steadily.

To cope with this, it is designed so that a circuit, which has been connected to the power supply control switch 98, operates stably when a pulse is being inputted from the N-th stage to the (N+1)th stage by controlling the power supply control switch 98 with the output of the (N-β)th forward-pulse delay circuit 5-(N-β) in a stage before the N-th. With this, the operation of a clock control circuit is more stabilized.

When a stress test in high frequency is given on such circuits as shown in FIG. 25 and FIG. 30, there are sometimes some circuits which have no electric power supplied and do not operate. Circuits with no electric power supply nor operation, may lead a stress test to a failure. To cope with this, it is possible to bring a state where electric power is supplied to all delay units by providing a new signal to control the forward-pulse detecting circuit 91 and using this signal even when forward pulse is not propagated to a desired stage.

Figure 31:
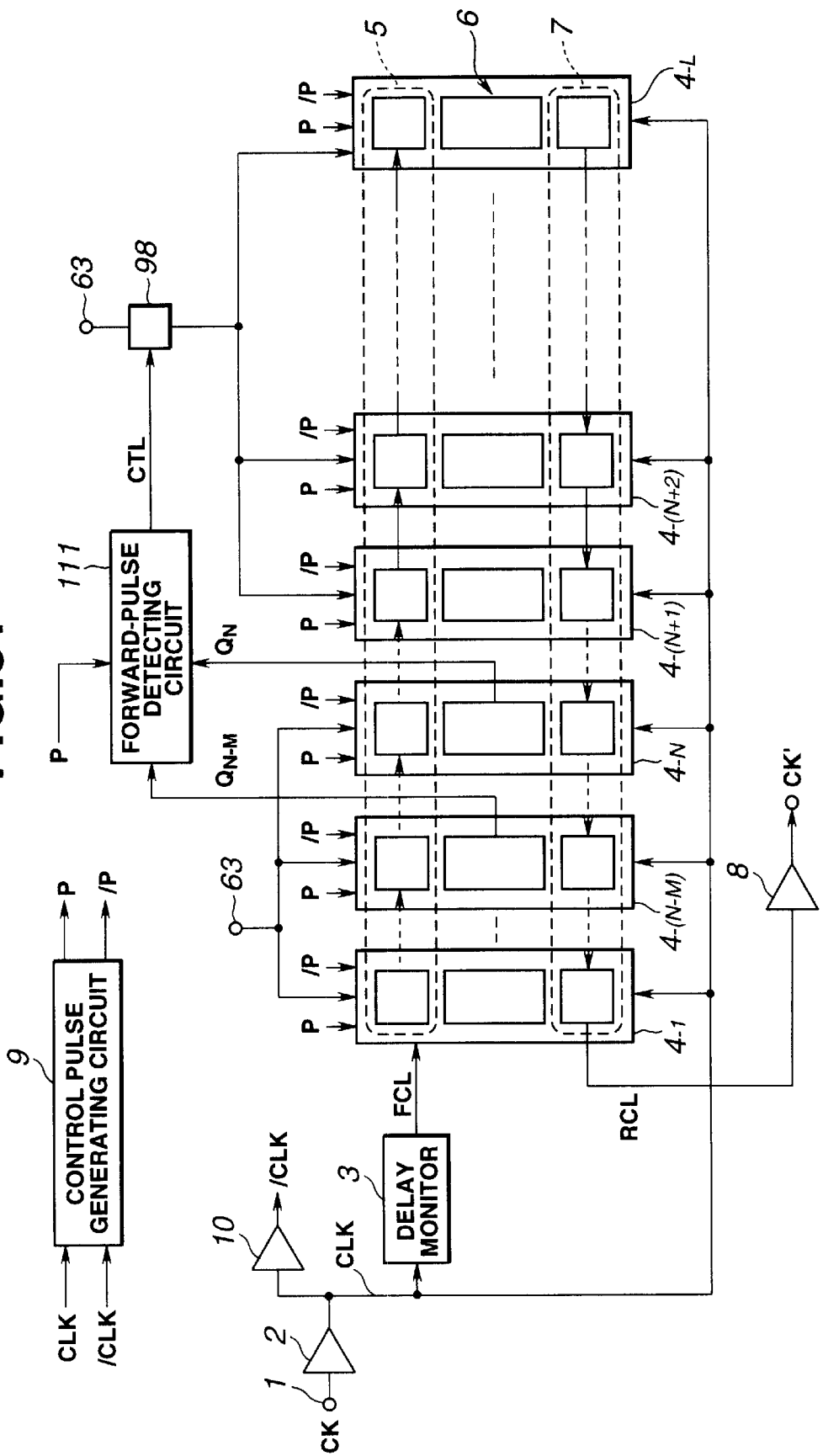
FIG. 31 is a block diagram showing another embodiment of the present invention.

FIG. 31 is a block diagram showing another embodiment of the present invention. In FIG. 31, the same elements as those in FIG. 25 are given the same reference numerals and description about them is omitted.

This embodiment differs from that in FIG. 25 in points that the forward-pulse detecting circuit 111 is adopted instead of the forward-pulse detecting circuit 90.

In FIG. 25, when a state where the forward pulse FCL is propagated to the N-th stage or the (N-β)th stage and a state where the pulse is not propagated there are frequently replaced due to jitter or others, as the supply and stoppage of power supply voltage to forward-pulse delay circuits and rearward-pulse delay circuits in the (N+1)th stage and state-holding circuits in and after the (N+2)th stage are repeated quite often, the operation is not stabilized nor reduced electric power consumption is.

In this embodiment, the operation of a clock control circuit is stabilized by using the forward-pulse detecting circuit 111 which enables the power supply control switch 98 to maintain a stable state at ON or OFF even when jitter exists.

That is, as the forward-pulse detecting circuit 111 has the storage function:

When $Q_{N-M}$=L and $Q_N$=L, $CTL=L$

And when $Q_{N-M}$=H and $Q_N$=L, as CTL outputs the same logical value as that of CTL immediately before taking in the values of $Q_{N-M}$ and $Q_N$ at the rising of P (with this function it is able to cope with jitter):

When $Q_{N-M}$=H and $Q_N$=H, $CTL=H$

The power supply control switch supplies the power supply when CTL=H.

Consideration is unnecessary for a case where $Q_{N-M}$=L and $Q_N$=H because this shows a state where the pulse is propagated to the N-th stage skipping over the (N-M)th stage.

Figure 32:
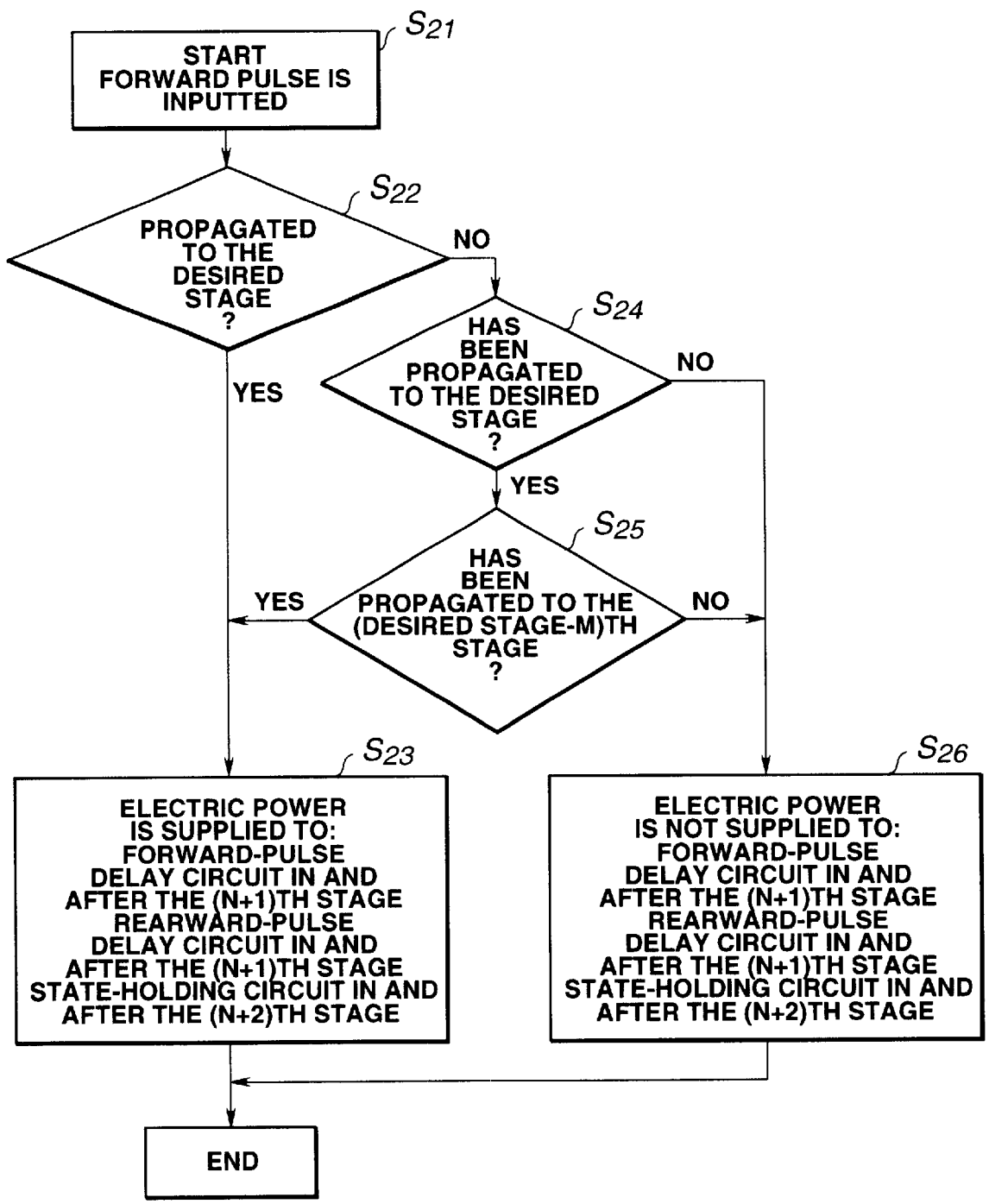
FIG. 32 is a flow chart illustrating the operation of the embodiment in FIG. 31.
Figure 33:
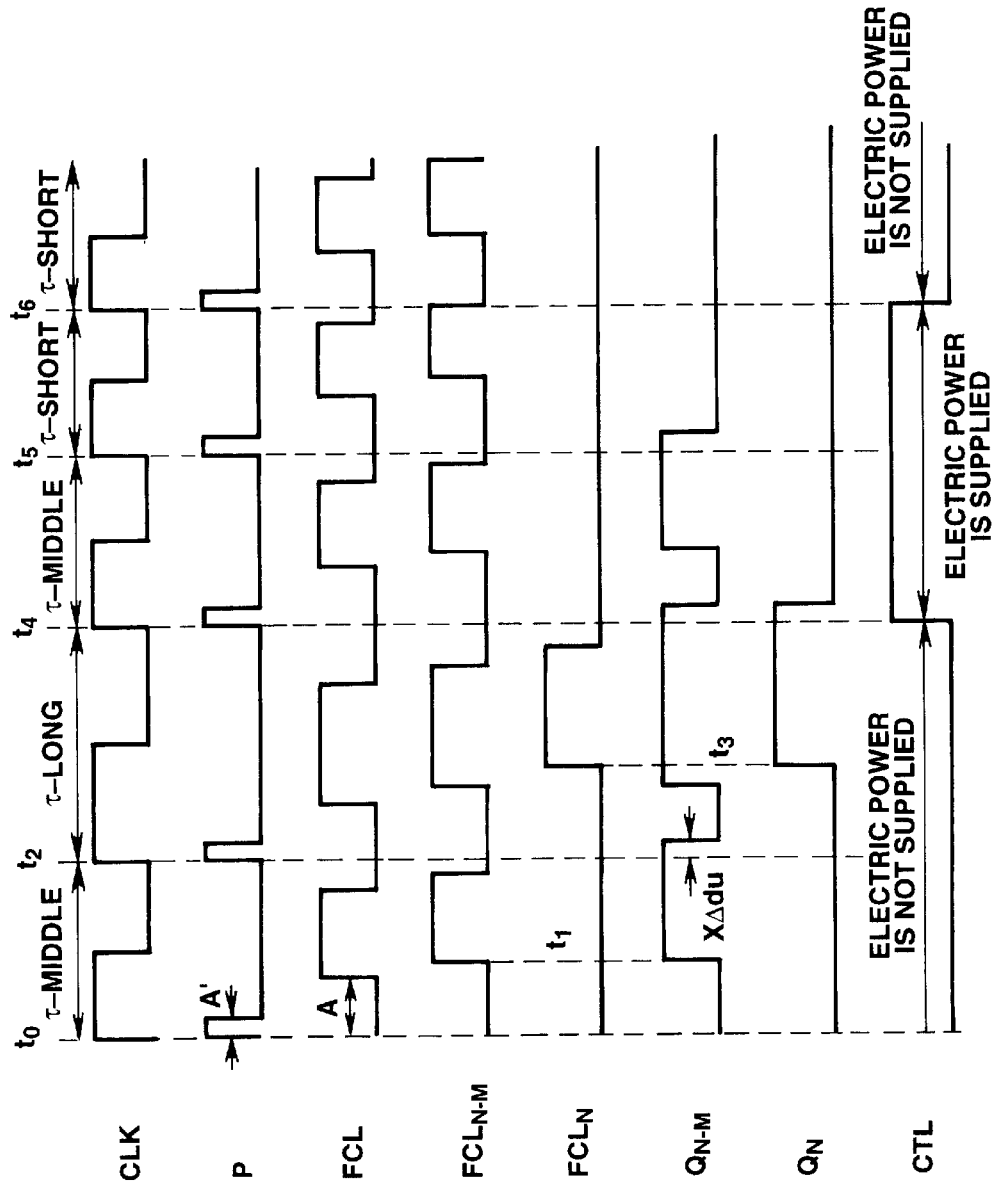
FIG. 33 is a waveform diagram illustrating the operation of the embodiment in FIG. 31.

Now, an outline of the operation of the embodiment as shown in FIG. 31 is described with reference to FIGS. 32 and 33. FIG. 32 is a flow chart illustrating the operation, and FIG. 33 is a waveform diagram illustrating the same. FIG. 33 shows the clock signal CLK from the receiver 2, the control pulse P, the forward pulse FCL, the output of the (N-M)th forward-pulse delay circuit, the output of the N-th forward-pulse delay circuit, the output of the (N-M)th state-holding circuit, the output of the N-th state-holding circuit, and the control signal CTL from the forward-pulse detecting circuit 111.

The period of the external clock signal changes as; from τ middle to τ long, τ middle and to τ short. Corresponding to this, the period of CLK similarly When an external clock signal CK is inputted to the receiver 2, the clock signal CLK as shown in FIG. 33 is generated. This clock signal CLK is supplied to the control pulse generating circuit 9, and the control pulse P as shown in FIG. 33 is generated. The clock signal CLK is given also to the delay monitor 3, and forward pulse as shown in FIG. 33 is generated and supplied to the forward-pulse delay line 5 (step S21 in FIG. 32).

Now, suppose that forward pulse is not propagated to the N-th stage. The time from t0 to t1 shows this state. Consequently, when the control pulse P rose at timing t0, as shown in FIG. 33, as both the state signals Q-(N-M) and Q-N are at "L", "L" is taken in to the forward-pulse detecting circuit 111. As shown in FIG. 33, the control signal CTL turns to "L" at t0 to t1. In consequence, the power supply control switch 98 is turned off, and electric power is not supplied to the forward-pulse delay circuits 5-(N+1) to 5-L and rearward-pulse delay circuits 7-(N+1) to 7-L in and after the (N+1)th stage and to the state-holding circuits 6-(N+2) to 6-L in and after the (N+2)th stage.

Now, suppose that forward pulse is propagated to the (N-M)-th stage. Timing t1 in FIG. 33 shows this state. Since forward pulse has been propagated to the (N-M)th stage at timing t1, as shown in FIG. 33, the output Q-(N-M) of the (N-M)th state-holding circuit 6-(N-M) is at "H". As forward pulse has not been propagated to the N-th stage before timing t2, the output Q-N of the N-th state-holding circuit 6-N is kept at "L", as shown in FIG. 33.

When the control pulse P rises and the clock signal CLK is inputted from a rearward-pulse delay circuit, it is advanced by X stages and resets a state-holding circuit in a stage X stages after. In consequence, the state signal Q-(N-M) is kept at "H" for at least XΔdu since the control pulse P turned to "H". Accordingly, when the control pulse P rose at timing t2, the output $Q_{N-M}$ of the (N-M)th state-holding circuit 6-(N-M) turns to "H", and as the output $Q_N$ of the N-th state-holding circuit 6-N turns to "L", these values are taken in to the forward-pulse detecting circuit 111. When $Q_{N-M}$="H" and $Q_N$=L at the rising of P, the value of CTL immediately before is outputted as it is. Consequently, the control signal CTL is maintained at "L". Thus, when no pulse has been propagated in and after the N-th stage, that is, in a case where the process is shifted to S26 via S22 and S24 shown in FIG. 32, as the control signal CTL is kept at "L", the power supply control switch 98 does not supply electric power to forward-pulse delay circuits and rearward-pulse delay circuits in and after the (N+1)th stage and state-holding circuits in and after the (N+2)th stage. In this case, they operate as a clock control circuit having N stages of delay lines.

Similarly, as the value of the state signal Q is taken in at the rising of the control pulse P, unless X is set so as to make the pulse width of the control pulse P shorter than XΔdu or the pulse width of the control pulse P is shortened, a forward-pulse detecting circuit is supposed to be controlled by a pulse signal which has a pulse width shorter than XΔdu and rises synchronizing to the clock signal CLK.

Next, the operation when the control pulse P rises at timing t4 is described. At timing t3, forward pulse has been propagated up to the N-th forward-pulse delay line 5-N. Consequently, as shown in FIG. 33, since both forward pulses FCL-(N-M) and FCL-N turn to "H", the output signals Q-(N-M) and Q-N of state-holding circuits are also, as shown in FIG. 33, at "H".

Accordingly, when the control pulse P rises at timing t4, as $Q_{N-M}$="H" and $Q_N$="H" are inputted to the forward-pulse detecting circuit 111, the control signal CTL becomes "H" (see FIG. 33).

When the control signal CTL turns to "H", as the power supply control switch 98 is turned on, electric power is supplied to forward-pulse delay circuits and rearward-pulse delay circuits in and after the (N+1)th stage and state-holding circuits in and after the (N+2)th stage. With this operation, when forward pulse is propagated to the N-th stage, all delay units are supplied with electric power and they act as a clock control circuit having L stages of delay lines. In such a manner, when the pulse is propagated in and after the N-th stage, namely, when the process goes by way of steps S22 and S23 in FIG. 32, electric power is supplied to all delay units.

Now, a description will be given on a case where the number of stages, where forward pulse is propagated after it was propagated to the N-th stage, changes between the (N-M)th stage and the N-th stage due to the effect of jitter or others.

When forward pulse is propagated more than N stages, as forward pulse is always propagated to the forward-pulse delay circuits in the (N-M)th stage and in the N-th stage, power supply voltage is supplied to all delay units.

As shown by t4 to t5, after forward pulse was propagated to the N-th forward-pulse delay circuit 5-N once, when it is propagated to the (N-M)th forward-pulse delay circuit 5-(N-M) but not propagated to the N-th forward-pulse delay circuit 5-N, similarly to the case at timing t2 to t4, the output of the state holding circuit Q-(N-M) becomes "H" and Q-N becomes "L" when forward pulse is propagated and the control pulse P rises. In consequence, these values are taken in to the forward-pulse detecting circuit 111. When $Q_{N-M}=$ "H" and $Q_N=$L at the rising of P, the value of CTL immediately before is outputted as it is. Consequently, the control signal CTL maintains "H".

Thus, after forward pulse was propagated in and after the N-th stage, even when it is propagated only to a stage between the (N-M)th and the N-th, the control signal CTL is kept at "H". That is, when the process to step S23 via S24 and S25 in FIG. 32 continues, CTL is maintained at "H". With this operation, circuits can continue acting as a clock control circuit having L stages of delay lines. As electric power is supplied on even when forward pulse starts being propagated again in and after the N-th stage due to jitter, the stable operation is possible.

Further, suppose that pulse is not propagated to the (N-M)th stage, too, as seen at timings t5 and t6. In this case, similarly to the operation at timings t0 to t2, when the control pulse P rose at timing t6, too, both the output signal Q-(N-M) of the (N-M)th state-holding circuit 6-(N-M) and the output signal Q-N of the N-th state-holding circuit 6-N, as shown in FIG. 33, become "L". Accordingly, when the control pulse P turned to "H", "L" is taken in to the forward-pulse detecting circuit 111. With this operation, CTL becomes "L". That is, in this case, the operation is the same as that at timings from t0 to t2.

In this manner, using of the forward-pulse detecting circuit 111 enables stable operation by not supplying electric power to forward-pulse delay circuits and rearward-pulse delay circuits in and after the (N+1)th stage and state-holding circuits in and after the (N+2)th stage when the pulse is not propagated to the N-th stage, and by supplying electric power to all the stages when the pulse is propagated in and after th N-th stage, and also by continuing the supply of electric power when a stage, where the pulse is propagated, changes between the (N-M)th and the N-th influenced by jitter.

Thus, in this embodiment, in addition to the similar effect to that in each of said embodiments, the stable operation becomes possible because repetition of turning on and off of power supply can be prevented even when a stage, where forward pulse is propagated, changes between the (N-M)th and the N-th due to jitter after forward pulse was propagated to the N-th stage.

Figure 34:
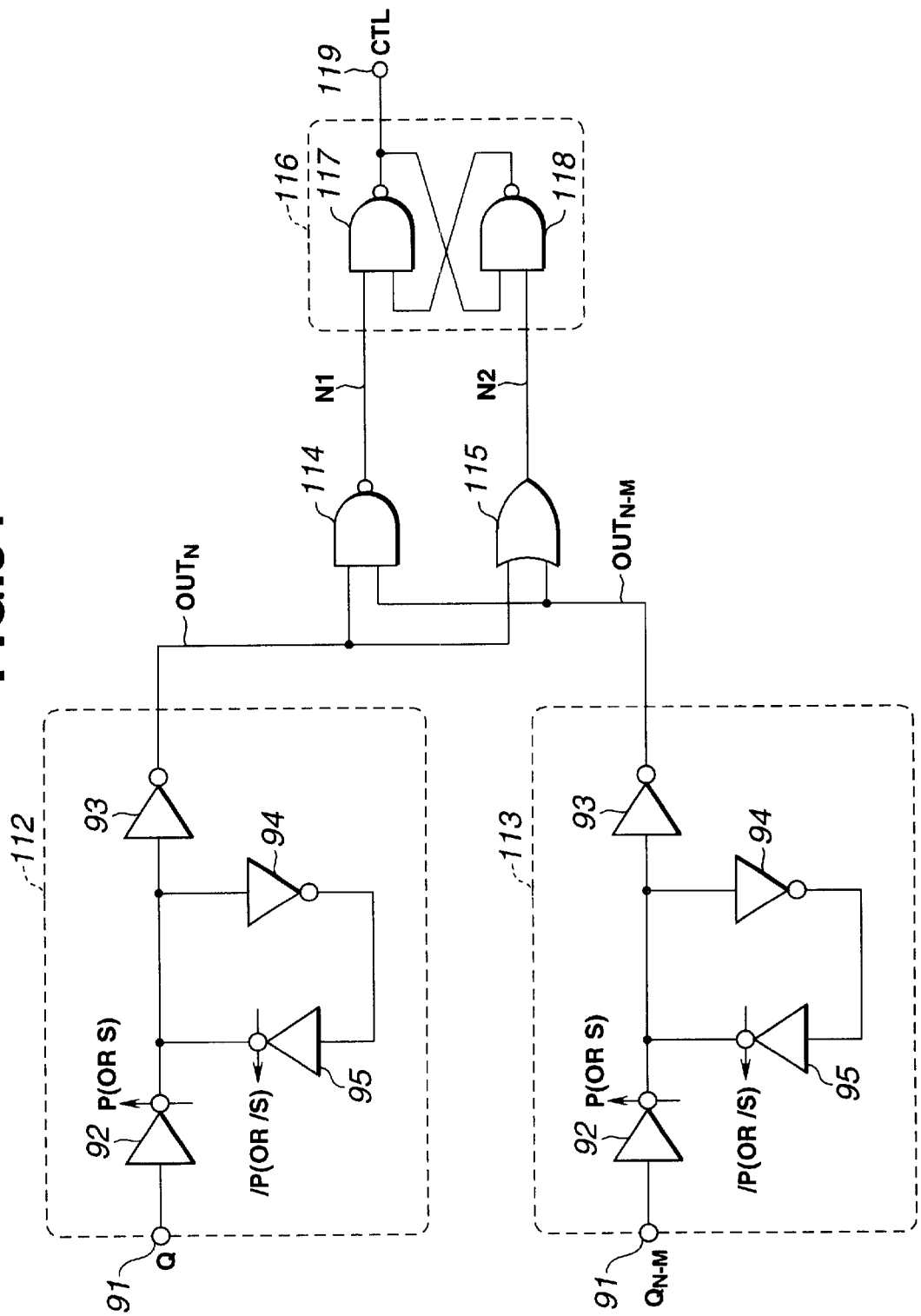
FIG. 34 is a circuit diagram showing concrete configuration of the forward-pulse detecting circuit 111 as shown in FIG. 31.

Now, a description will be given on configuration of the forward-pulse detecting circuit 111. In FIG. 34, an example of configuration of the forward-pulse detecting circuit 111 is shown.

The forward-pulse detecting circuit 111 consists of two D-type flip flops 112, 113 having the same configuration as that of the forward-pulse detecting circuit 90, a NAND circuit 114, an OR circuit 115 and a flip flop 116. The flip flop 116 is composed of NAND circuits 117 and 118.

To the input terminal 91 of the two D-type flip flops 112 and 113, Q-N and Q-(N-M), the output of the state-holding circuits in the N-th stage and the (N-M)th stage, are supplied respectively. Output terminals of the D-type flip flops 112 and 113 are connected to input terminals of the NAND circuit 114 and the OR circuit 115. An output terminal of the NAND circuit 114 is connected to an input terminal of the NAND circuit 117, and an output terminal of the OR circuit 115 is connected to an input terminal of the NAND circuit 118. An output terminal of the NAND circuit 117 is connected to an output terminal of the NAND circuit 118, and an output terminal of the NAND circuit 118 is connected to an input terminal of the NAND circuit 117. For the flip flop 116, other circuits may be used so long as they function as an RS flip flop.

An output terminal of the NAND circuit 117 is connected to an output terminal 119. For the power supply control switch 98, the circuits as shown in FIGS. 22, 23, 29 may be used.

Next, connecting of an STBD to the forward-pulse detecting circuit 111 and the power supply control switch 98 will be described. The output Q-(N-M) of the (N-M)th state-holding circuit 6-(N-M) is supplied to the input terminal 91 of the D-type flip flop 112 of the forward-pulse detecting circuit 111, and the output Q-N of the N-th state-holding circuit 6-N is supplied to the input terminal 91 of the D-type flip flop 113. For the power supply control switch 98, one having the same configuration as that of the power supply control switch 65 as shown in FIG. 18 is used. The connection of the forward-pulse detecting circuit 111 and the output terminal 119 to the power supply control switch 98 is supposed to be similar to that in FIG. 25.

Figure 35:
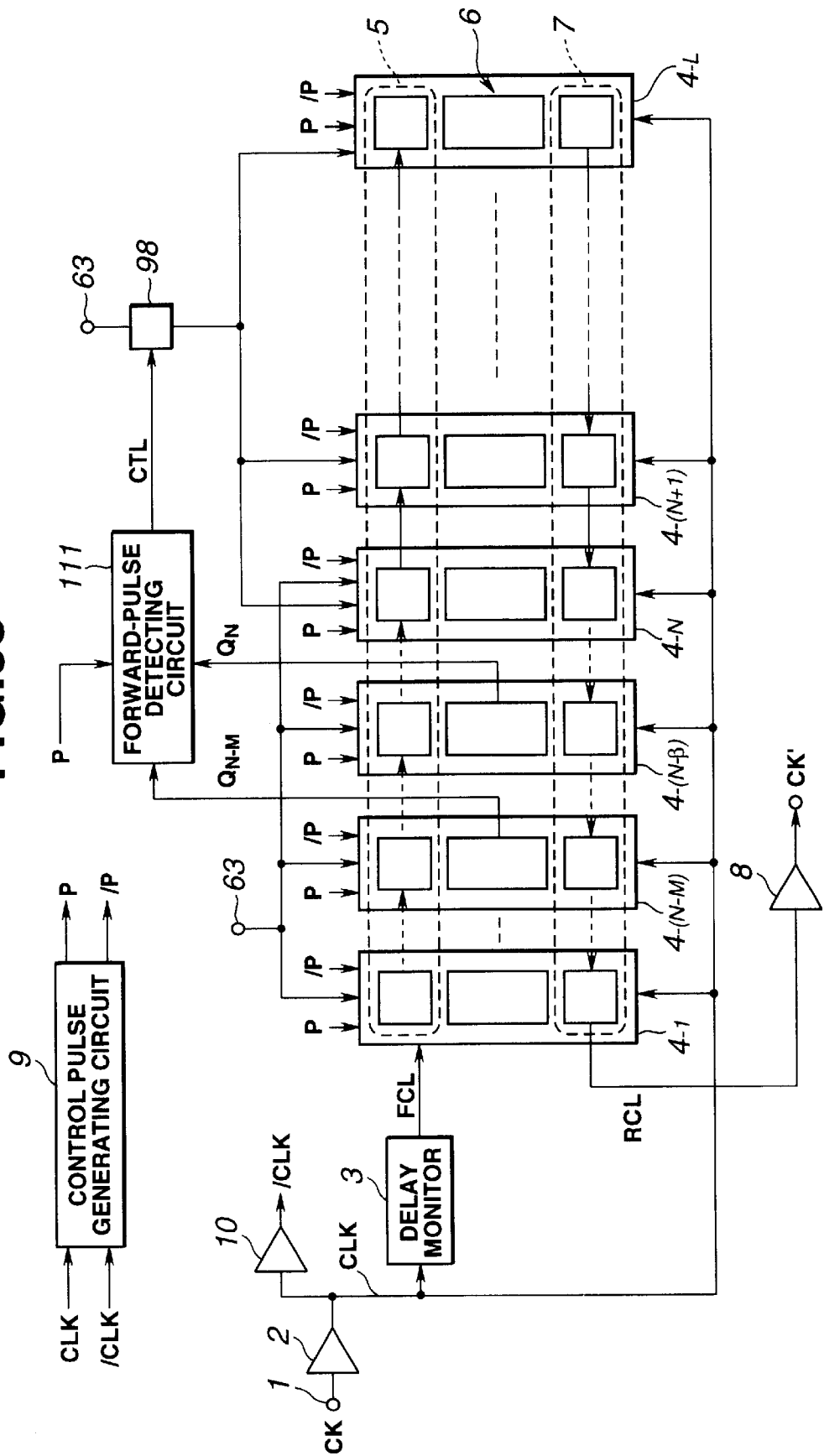
FIG. 35 is a block diagram showing another embodiment of the present invention.

FIG. 35 is a block diagram showing another embodiment of the present invention. In FIG. 35, the same elements as those in FIG. 31 are given the same reference numerals and description about them is omitted.

In this embodiment, too, power supply voltage is unconditionally supplied via the terminal 63 to forward-pulse delay circuits and rearward-pulse delay circuits in the stages from the 1st to the N-th and state-holding circuits in the stages from the 1st to the (N+1)th. In this embodiment, it is designed so that the state signal Q-(N-β), which is generated in the (N-β)th stage, namely, in a stage β stages before the N-th, is supplied to the forward-pulse detecting circuit 111, and also the state signal Q-(N-M), which is generated in the (N-M)th stage, namely, in a stage before the (N-β), is supplied to the forward-pulse detecting circuit 111.

In a case where the power supply control switch 98, which is connected to a circuit containing the forward-pulse delay circuits 5-(N+1) in and after the (N+1)th stage, is designed to be turned on by the state signal Q-N's becoming "H" in the N-th stage due to forward pulse's being propagated to the N-th forward-pulse delay circuit 5-N, it sometimes occurs that the circuit connected to the power supply control switch 98 is not in a state where it stably operates at the moment when the pulse is being propagated from the N-th stage to the (N+1)th stage. In this case, the clock control circuit does not operate reliably.

To cope with this, by controlling the power supply control switch 98 with the output of the state signal Q-(N-β) in the stage (N-β) before the N-th, the circuit, which has been connected to the power supply control switch 98, is designed to be able to operate reliably when the pulse is inputted from the N-th stage to the (N+1)th stage. In consequence, the operation of the clock control circuit is more stabilized.

When a stress test is given on such circuits as shown in FIG. 31 and FIG. 35 in high frequency, it results in a state where a circuit, which is not supplied with electric power and does not operate, exists. The existence of circuits with no power supply nor operation sometimes leads a stress test to an unsuccessful result. To cope with this, it is possible to bring a state where electric power is supplied to all delay units even when forward pulse is not propagated to a desired stage by providing a new signal to control the forward-pulse detecting circuit 111 and using it.

Figure 36:
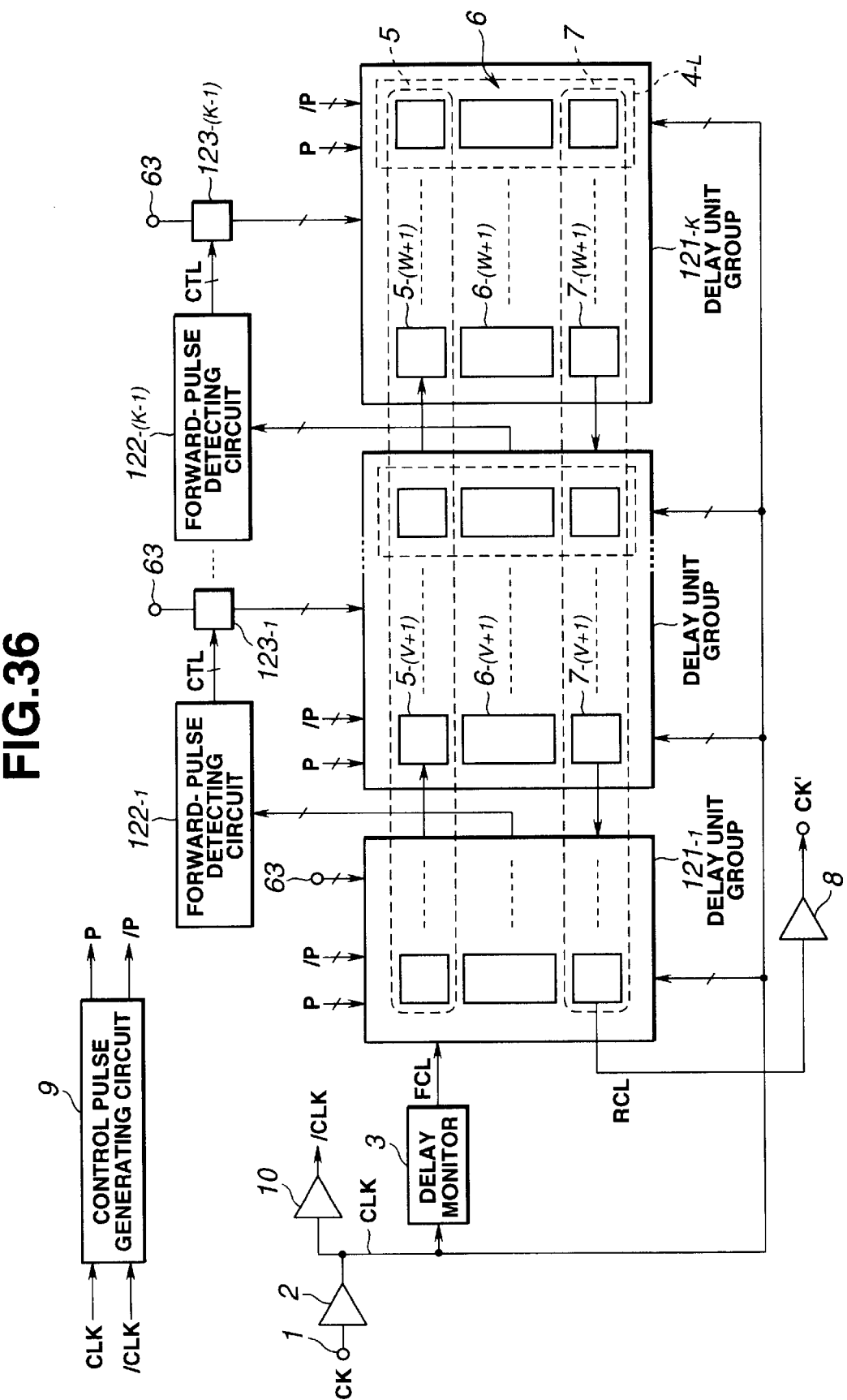
FIG. 36 is a block diagram showing another embodiment of the present invention.

FIG. 36 is a block diagram showing another embodiment of the present invention. In FIG. 36, the same elements as those in FIG. 14 are given the same reference numerals and description about them is omitted.

In this embodiment, a delay unit is divided into K groups of delay unit groups 121-1, 121-2, . . . , 121-K. K is an integer being K>2. The delay unit group 121-1 has stages from the 1st to the V-th of delay units, and the delay unit group 121-K has stages from the (W+1)th to the L-th of delay units.

To each delay unit of the delay unit group 121-1, power supply voltage is supplied via the power supply terminal 63, and to each delay unit of the delay unit groups 121-2 to 121-K, power supply voltage is supplied from the power supply terminal 63 via the power supply control switches 123-1 to 123-(K−1) respectively. The supply of power supply voltage to the delay unit groups 121-2 to 121-K is controlled by forward-pulse detecting circuits 122-1 to 122-(K−1).

For the forward-pulse detecting circuits 122-1 to 122-(K−1) and the power supply control switches 123-1 to 123-(K−1), any forward-pulse detecting circuit and power supply control switch in each of said embodiments may be used.

The forward-pulse detecting circuits 122-1 to 122-(K−1) are connected to a delay unit in a predetermined stage of the delay unit groups 121-1 to 121-(K−1) respectively, for example, connected to a forward-pulse delay circuit or a state-holding circuit contained in a delay unit in any stage between the last stage and the one several stages before the last of each delay unit group. The forward-pulse detecting circuits 122-1 to 122-(K−1) are designed to detect whether forward pulse was propagated up to the stage where it is connected, and to supply the control signal CTL to the power supply control switches 123-1 to 123-(K−1) respectively.

The power supply control switches 123-1 to 123-(K−1) are designed to supply power supply voltage from the power supply terminal 63 when the inputted control signal CTL indicates that forward pulse has been propagated to a predetermined stage, to each delay unit of corresponding delay unit groups 121-2 to 122-K respectively, and not to supply power supply voltage to the delay unit groups 121-2 to 122-K in other cases.

In the embodiment configured in such a manner, in the initial state, power supply voltage is supplied only to each delay unit of the delay unit group 121-1. When forward pulse is not propagated to the forward-pulse delay circuit 5-V up to the V-th stage, power supply voltage is not supplied to each delay unit of the succeeding delay unit groups 121-2 to 121-K, reducing electric power consumption.

When forward pulse is propagated up to a delay unit in the (V+1)th stage, the power supply control switch 123-1 is turned on by the control signal CTL from the forward-pulse detecting circuit 122-1, and power supply voltage is supplied also to each delay unit of the delay unit group 121-2. In this manner, the stable operation is possible even when forward pulse is propagated to the (V+1)th stage.

Besides, in this embodiment, it is possible to design so as not to supply power supply voltage to each delay unit of the delay unit groups 121-3 to 121-K even in this case.

Thus, this embodiment has, in addition to the effect similar to that in each of said embodiments, an advantage that exact electric power control is possible because power control is carried out on every group of K of delay unit groups.

For the forward-pulse detecting circuit 122, the forward-pulse detecting circuit 71, the forward-pulse detecting circuit 90 and the forward-pulse detecting circuit 111 can be used. For the power supply control switch 123, the power supply control switches 65 and 98 are usable.

Figure 37:
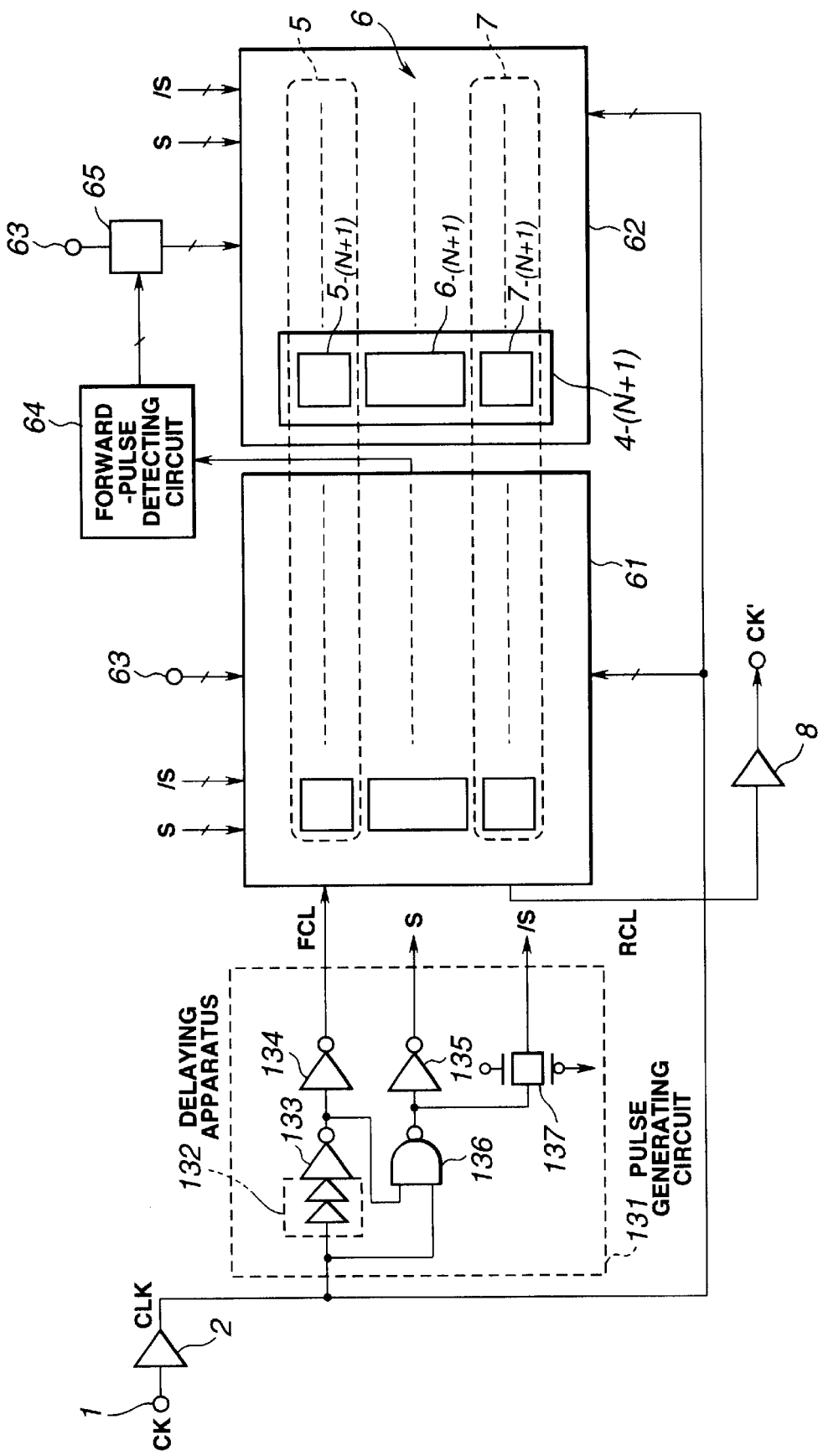
FIG. 37 is a block diagram showing another embodiment of the present invention.

FIG. 37 is a block diagram showing another embodiment of the present invention. In FIG. 37, the same elements as those in FIG. 14 are given the same reference numerals and description about them is omitted.

This embodiment differs from that in FIG. 14 in points that a pulse generating circuit 131 is used instead of the delay monitor 3.

The pulse generating circuit 131 consists of a delaying apparatus 132, inverters 133 to 135, a NAND circuit 136 and a path gate 137. The delaying apparatus 132 delays the inputted clock signal CLK by the time A and outputs it to the inverter 133. The inverter 133 inverts the clock signal CLK and gives it to an inverter 134 and an input terminal of the NAND circuit 136. The inverter 134 is designed to supply the forward pulse FCL to the forward-pulse delay line 5 by re-inverting the output of the inverter 133.

To the other input terminal of the NAND circuit 136, the clock signal CLK has also been given. The NAND circuit 136 performs two-input NAND operation and outputs to the inverter 135 and the transmission gate 137. The inverter 135 inverts the output of the NAND circuit 136 and outputs. The transmission gate 137 outputs the output of the NAND circuit 136 as it is. As the transmission gate 137 is added so as to adjust delays, when a delay time is equal to the delay time of the inverter 135, other circuits will do.

The output of the delaying apparatus 132 is a pulse which rises delayed by A from the rising of the clock signal CLK. When a clock signal CLK having a pulse width longer than A is inputted to the pulse generating circuit 131, a pulse, which becomes "H" for the time A from the rising of the clock signal CLK, is outputted from the inverter 133. Accordingly, the output of the NAND circuit 136 becomes a pulse which turns to "L" for the time A from the rising of the clock signal CLK, and the output of the inverter 135 becomes a pulse s which turns to "H" for the time A from the rising of the clock signal CLK. The transmission gate 137 outputs a pulse /s which is an inverted signal of the pulse s.

Once the delay time A of the delaying apparatus 132 is determined, other circuits may be used as the pulse generating circuit 131 so long as they can generate signals which have pulse width of A and rise synchronizing to an input signal. Each of the delay units 4-1 to 4-L is designed to operate by being given the pulse s, which is generated by the pulse generating circuit 131, and the pulse /s, which is the inverted signal of pulse s, instead of the control pulse P.

In the embodiment configured in such a manner, the pulse generating circuit 131 generates the pulse s having a pulse width of A and the forward pulse FCL delayed by A to s. By this forward pulse FCL's being propagated by the forward-pulse delay line 5 by the time ($\tau$–A) and by rearward pulse's being propagated by the rearward-pulse delay line 7 by the same time ($\tau$–A), an internal clock signal CK', which is delayed by $2\tau$ to an external clock signal CK, is obtained.

In this embodiment, too, in the initial state, electric power is supplied only to each delay unit of the delay unit group 61, and, by forward pulse's being propagated to a predetermined stage, electric power is supplied to each delay unit of the delay unit group 62.

Thus, in this embodiment, too, the similar effect to that in the embodiment in FIG. 14 is available.

For the forward-pulse detecting circuit and the power supply control switch, circuits and switches similar to those used in each of said embodiments can be adopted. It is also possible to configure so that the electric power supply is controlled in every delay unit group by dividing delay units into three or more delay unit groups.

Figure 38:
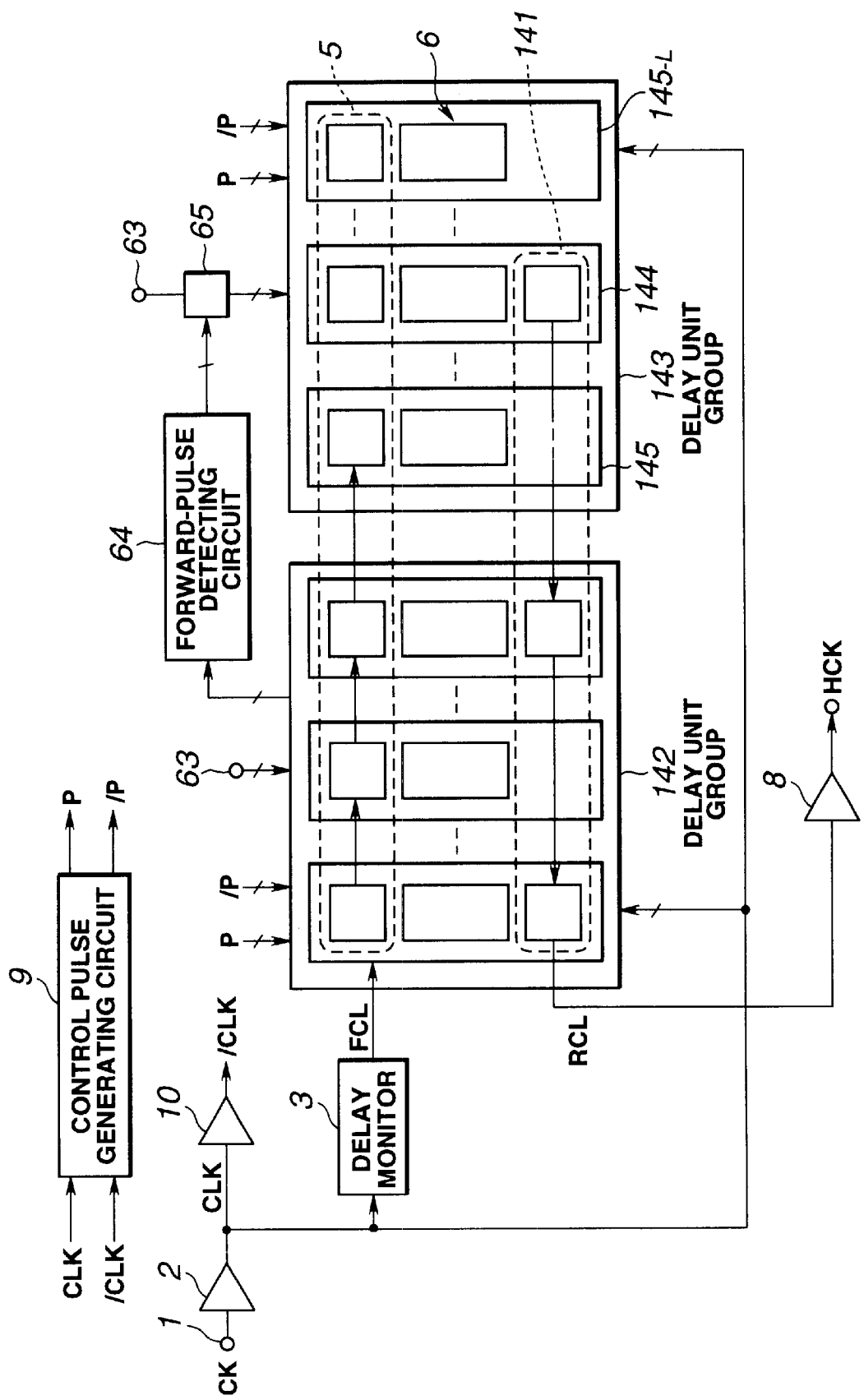
FIG. 38 is a block diagram showing another embodiment of the present invention.

FIG. 38 is a block diagram showing another embodiment of the present invention. In FIG. 38, the same elements as those in FIG. 14 are given the same reference numerals and description about them is omitted. This embodiment is an example where the present invention is applied to a circuit to generate a signal delayed by $\tau/2$ to an external clock signal CK having a period of $\tau$.

The forward-pulse delay line 5, the state-holding circuit 6 and a rearward-pulse delay line 141 are composed of delay units 144 and 145. The delay unit 144 has the same configuration as that of the circuits shown in FIGS. 3 to 5. The delay unit 145 differs from the delay unit 144 in points that it does not have rearward-pulse delay circuits.

The rearward-pulse delay line 141 is configured by directly connecting the delay unit 144-(2K+1) and rearward-pulse delay circuits contained in the delay unit 144-[(2K+1)+1]. The rearward pulse generated on the rearward-pulse delay line 141 is propagated by the rearward-pulse delay line 141 by the time to be propagated half the number of stages of the number of stages of the forward-pulse delay line 5 where the forward pulse FCL was propagated, and outputted from the 1st rearward-pulse delay unit 141-1.

In addition, in this embodiment, a delay unit group 142 is composed of the delay units 144 and 145 up to the N-th stage, and a delay unit group 143 is composed of the delay units 144 and 145 in the (N+1)th stage to the L-th stage. To each delay unit of the delay unit group 142, power supply voltage is supplied via the power supply terminal 63, and to each delay unit of the delay unit group 143, power supply voltage is supplied from the power supply terminal 63 via the power supply control switch 65.

Now, the operation of the embodiment configured in such a manner will be described.

An external clock signal CK having a period of $\tau$ is supplied to the receiver 2 via the input terminal 1, and a clock signal CLK from the receiver 2 is supplied to the delay monitor 3. The clock signal CLK is delayed by the time D1 to the external clock signal CK. This clock signal CLK is delayed by the time A by the delay monitor 3 and supplied to the forward-pulse delay line 5 as the forward pulse FCL.

The forward pulse FCL is propagated by the forward-pulse delay line 5 by $\tau$–A, and rearward pulse is generated. This rearward pulse is propagated by the rearward-pulse delay line 141 and outputted from the 1st rearward-pulse delay circuit 141-1. As the number of circuits of rearward-pulse delay circuits is ½ of the number of circuits of forward-pulse delay circuits, the number of circuits of rearward-pulse delay circuits for rearward pulse to be propagated is ½ of the number of circuits where forward pulse was propagated. Accordingly, the rising edge of rearward pulse is propagated by the rearward-pulse delay line 141 by half the time of the forward pulse's propagation time, that is, by ($\tau$–A)/2 before being outputted.

A rearward pulse RCL from the rearward-pulse delay line 141 is delayed by the output buffer 8 by D2 and outputted as an output clock signal HCK.

As the delay time of the output clock signal HCK to the external clock signal CK is A=2(D1+D2), $$D1 + A + (\tau - A) + (\tau - A)/2 + D2$$
$$= D1 + \tau + \tau/2 - A/2 + D2$$
$$= (D1 + D2) + 3\tau/2 - A/2$$
$$= (D1 + D2) + 3\tau/2 - (D1 + D2)$$
$$= 3\tau/2$$

Thus, in this embodiment, the rising of the output clock signal HCK is delayed by $\tau/2$ to the external clock signal CK. Namely, a clock signal, which is delayed by half period to the external clock signal CK, is generated.

In this embodiment, in the initial state, electric power is supplied only to each delay unit of the delay unit group 142. Accordingly, wasteful consumption of electric power is prevented when forward pulse is not propagated to the N-th stage.

Thus, the effect similar to that in the embodiment in FIG. 14 is available also in this embodiment.

For the forward-pulse detecting circuit and the power supply control switch, it is obvious that any of the forward-pulse detecting circuits and the power supply control switches in each of said embodiments may be used. It is also possible to configure so that electric power is controlled in every delay unit group by dividing delay units into three or more delay unit groups.

Figure 39:
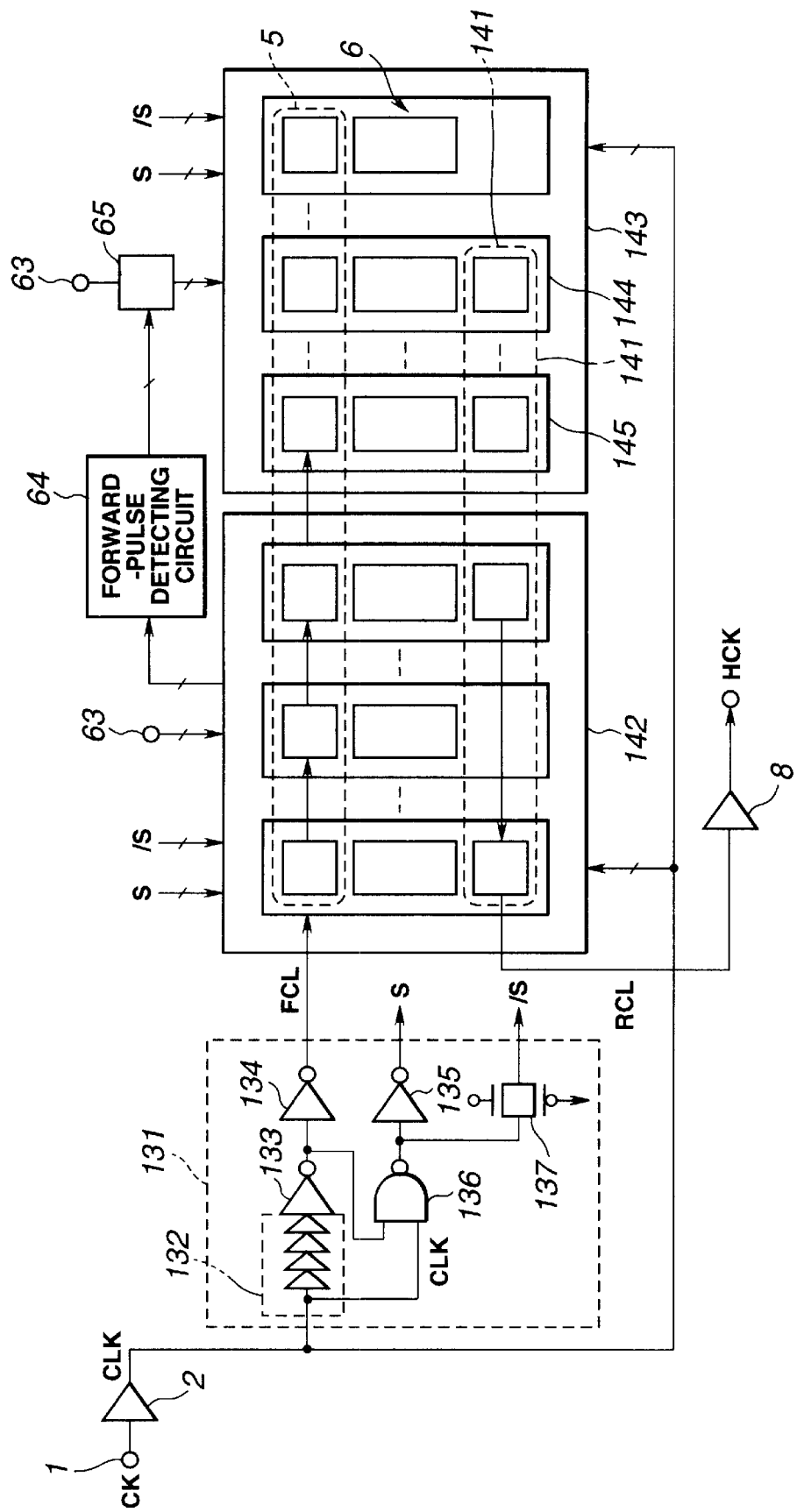
FIG. 39 is a block diagram showing another embodiment of the present invention.

FIG. 39 is a block. diagram showing another embodiment of the present invention. In FIG. 39, the same elements as those in FIGS. 37 and 38 are given the same reference numerals and description about them is omitted.

This embodiment differs from that in FIG. 38 in points that control pulse generating circuit 9 is omitted and the pulse generating circuit 131 shown in FIG. 37 is adopted instead of the delay monitor 3 in FIG. 38.

In the embodiment configured in such a manner, too, it is obvious that an internal clock signal CK', which is delayed by half period to an external clock signal CK, is available.

Also similarly to the embodiment in FIG. 38, electric power is not supplied to the delay unit group 143 when the forward pulse FCL is not propagated to the N-th stage.

In this manner, the effect similar to that in said embodiments is available also in this embodiment.

For the forward-pulse detecting circuit and the power supply control switch, circuits and switches similar to those used in each of said embodiments can be adopted. It is also possible to configure so that the electric power supply is controlled in every delay unit group by dividing delay units into three or more delay unit groups.

Figure 40:
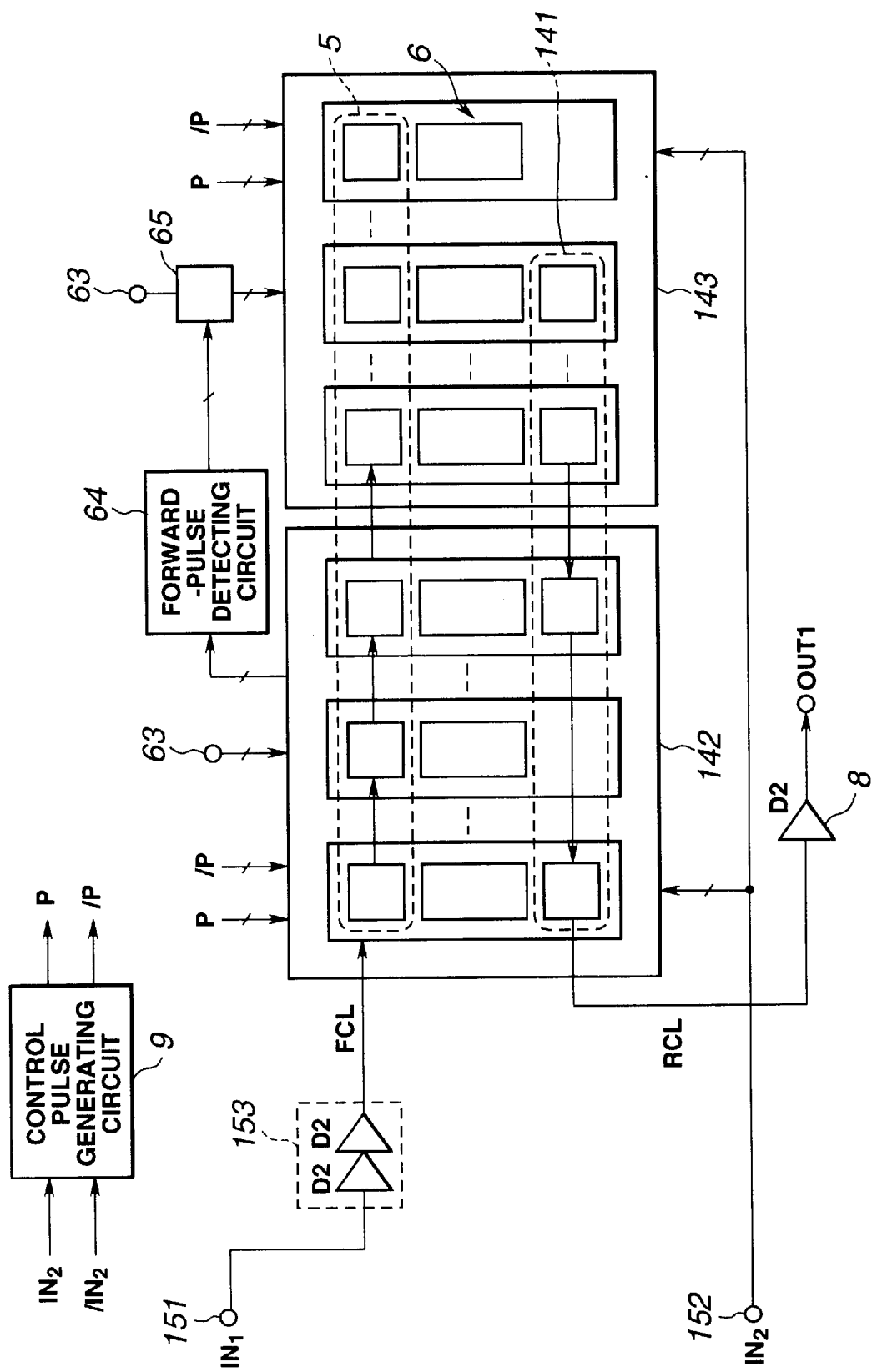
FIG. 40 is a block diagram showing another embodiment of the present invention.

FIG. 40 is a block diagram showing another embodiment of the present invention. In FIG. 40, the same elements as those in FIG. 38 are given the same reference numerals and description about them is omitted.

In this embodiment, the present invention is applied to a circuit to generate a clock signal OUT1 which is delayed by τ/4 or 3τ/4 to an external clock signal CK.

To input terminals 151 and 152, as IN1 and IN2, the internal clock signal CK', which is delayed by 2τ to the external clock signal CK, and the clock signal HCK, which is shifted by half period to the external dock signal CK, are supplied respectively. Or, as IN1 and IN2, the clock signal HCK and the internal clock signal CK' are supplied respectively. The signal inputted via the input terminal 151 is inputted to the forward-pulse delay line 5 via the delaying apparatus 153 as the forward pulse FCL. The delay time of the delaying apparatus 153 is 2D2. Meanwhile, the signal inputted via the input terminal 152 is inputted to the input terminal 45 (see FIG. 5) of rearward-pulse delay circuits.

In the embodiment configured in such a manner, it is possible to generate a signal which is shifted by τ/4 or 3τ/4 to the external clock signal CK. Further, by using the internal clock signal CK' and the clock signal HCK, which is shifted by half period to the external clock signal CK, it is possible to generate a signal which is delayed by τ/2N utilizing a delay between the input signal and the control signal.

In the embodiment configured in such a manner, too, the effect similar to that in each of said embodiments is obviously available.

For the forward-pulse detecting circuit and the power supply control switch, circuits and switches similar to those used in each of said embodiments may be adopted. It is also possible to divide delay units into three or more delay unit groups so as to make configuration wherein electric power supply is controlled in each delay unit group.

Figure 41:
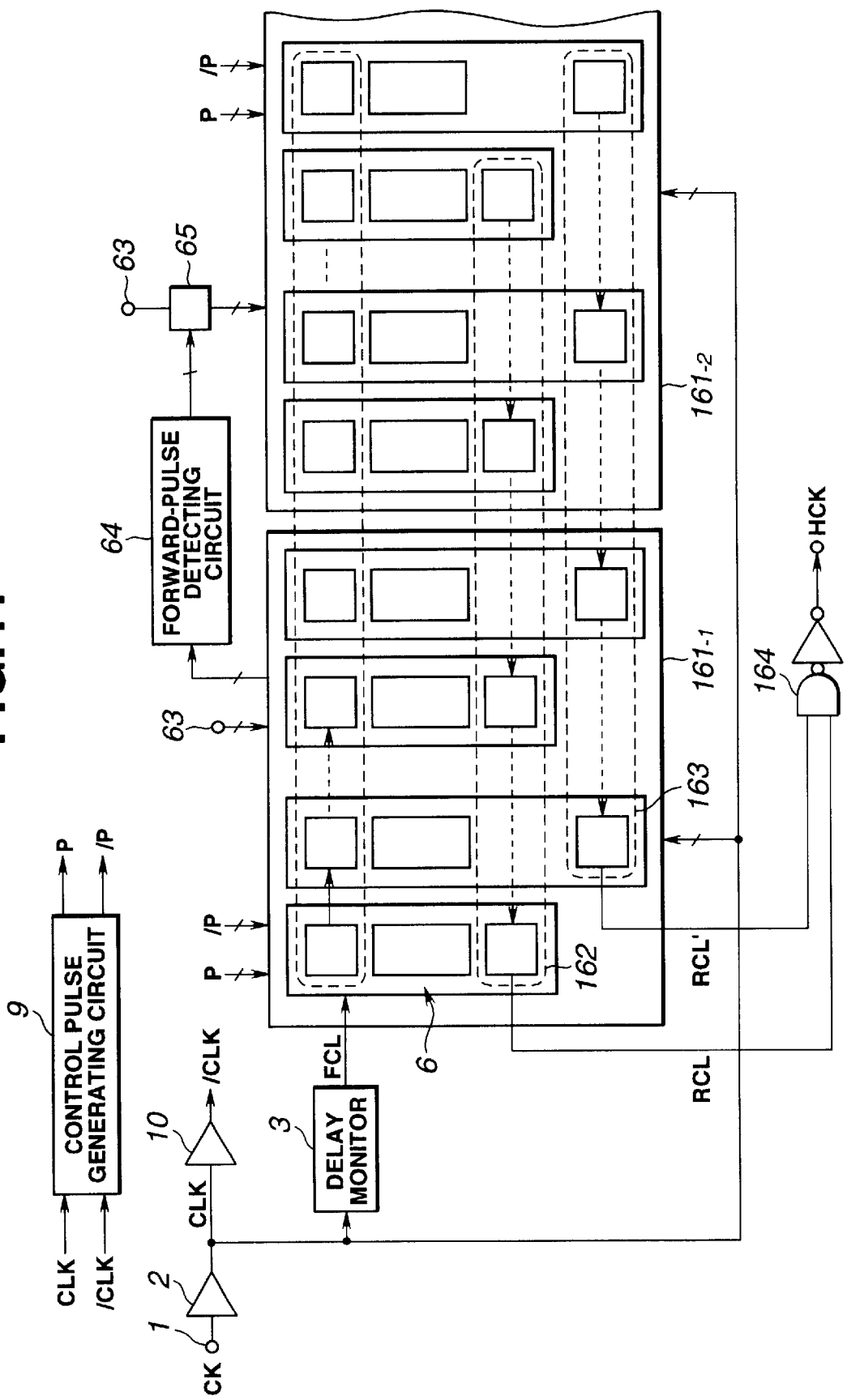
FIG. 41 is a block diagram showing another embodiment of the present invention.

FIG. 41 is a block diagram showing another embodiment of the present invention. In FIG. 41, the same elements as those in FIG. 14 are given the same reference numerals and description about them is omitted.

Although a unit similar to that in the embodiment in FIG. 14 is used as the delay unit 4, this embodiment differs from that in FIG. 14 in points that two rearward-pulse delay lines 162 and 163 are configured with rearward-pulse delay circuits of the delay unit 4. That is, the rearward-pulse delay line 162 is configured with the rearward-pulse delay circuits 162-1, 162-3, . . . in odd stages, and the rearward-pulse delay line 163 is configured with the rearward-pulse delay circuits 163-2, 163-4, . . . in even stages. In this embodiment, delay units are divided into a plurality of delay unit groups 161-1, 161-2, . . .

The rearward-pulse delay circuits 162-1, 162-3, . . . in odd stages are designed to output the output of rearward-pulse delay circuits in succeeding odd stages to rearward-pulse delay circuits in preceding odd stages. The rearward-pulse delay circuits 163-2, 163-4, . . . in even stages are designed to output the output of rearward-pulse delay circuits in succeeding even stages to rearward-pulse delay circuits in preceding even stages. The output of the 1st and 2nd rearward-pulse delay circuits 162-1, 163-2 is supplied to an AND circuit 164 as rearward pulses RCL and RCL'.

Figure 42:
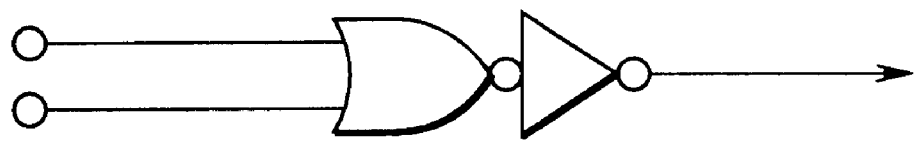
FIG. 42 is a circuit diagram illustrating the embodiment as shown in FIG. 41.
Figure 43:
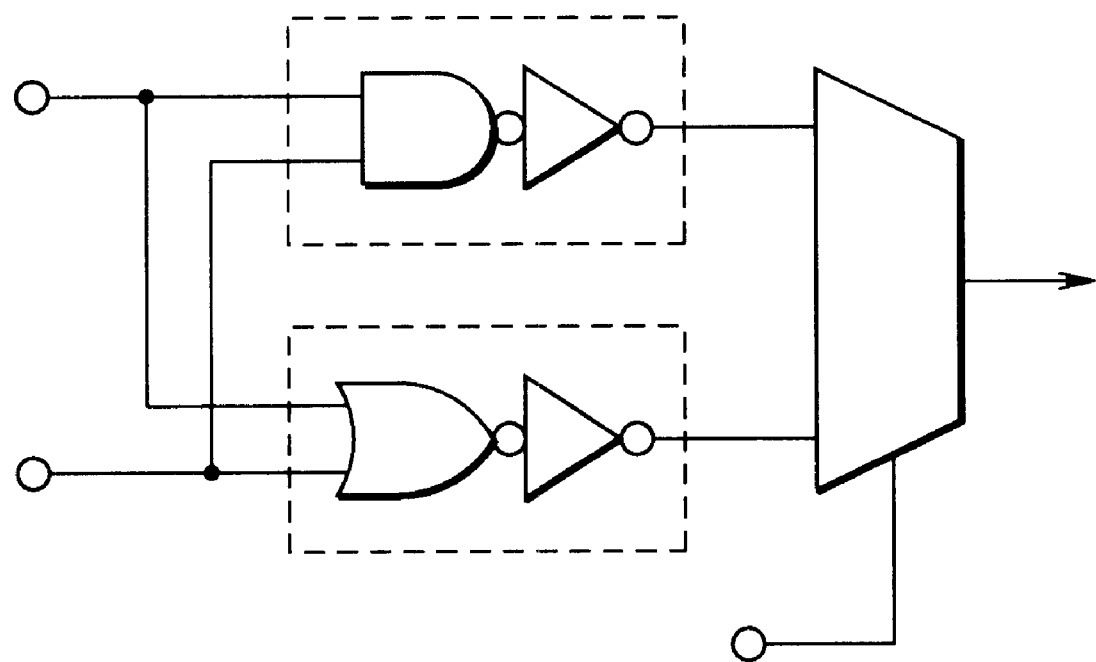
FIG. 43 is a circuit diagram illustrating the embodiment shown in FIG. 41.

The OR circuit as shown in FIG. 42 may be used instead of the AND circuit 102, or a circuit using the AND circuit, the OR circuit and the multiplexer as shown in FIG. 43 may be used. Further, the output buffer 8 is also usable.

In this embodiment, to each delay unit of the delay unit group 161-1, power supply voltage is supplied via the power supply terminal 63, and to each delay unit of the delay unit group 161-2, 161-3, . . . , power supply voltage is supplied from the power supply terminal 63 via the power supply control switch 65. A forward-pulse detecting circuit and a power supply control switch are provided in every delay unit group.

In the embodiment configured in such a manner, each of the rearward-pulse delay lines 162 and 163 propagates rearward pulse, which was generated for half of the delay time of the forward pulse FCL by the forward-pulse delay line 5, and outputs it from the 1st or 2nd rearward-pulse delay circuit 162-1, 163-2. That is, while the forward pulse FCL is delayed by the time (τ−A) by the forward-pulse delay line 5. rearward pulse is propagated being delayed by the time (τ−A)/2.

The rearward pulses RCL and RCL' from the rearward-pulse delay lines 162 and 163 are given AND operation by the AND circuit 164 and outputted as the clock signal HCK.

Other functions are similar to those in the embodiment in FIG. 14.

In this manner, the effect similar to that in each of said embodiments is available also in this embodiment.

For the forward-pulse detecting circuit and the power supply control switch, circuits and switches similar to those used in each of said embodiments can be adopted. It is also possible to configure so that the electric power supply is controlled in every delay unit group by dividing delay units into three or more delay unit groups.

Figure 44:
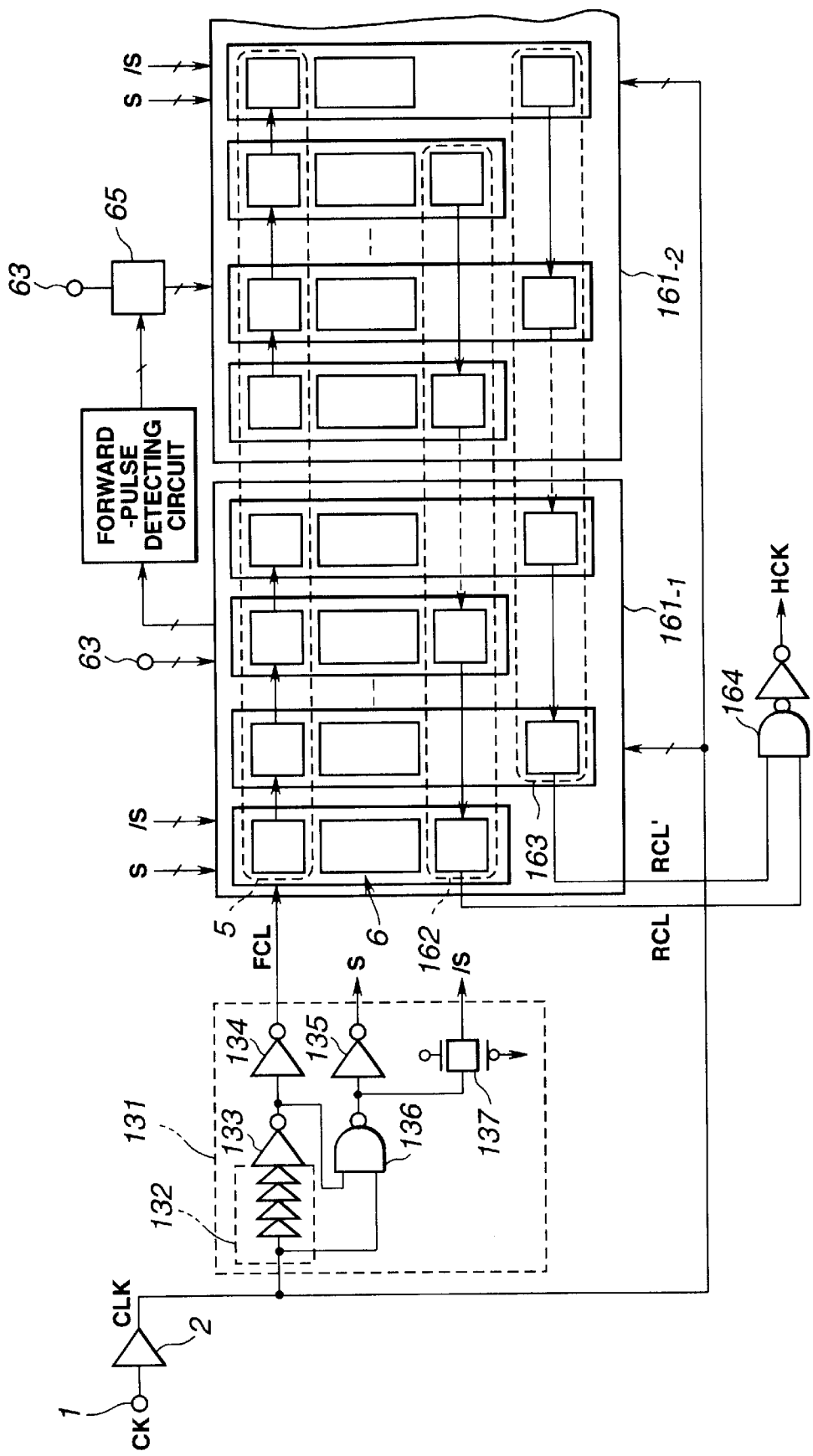
FIG. 44 is a block diagram showing another embodiment of the present invention.

FIG. 44 is a block diagram showing another embodiment of the present invention. In FIG. 44, the same elements as those in FIGS. 37 and 41 are given the same reference numerals and description about them is omitted.

This embodiment differs from that in FIG. 41 in points that the pulse generating circuit 131 is provided instead of the delay monitor 3.

In the embodiment configured in such a manner, too, when forward pulse is not propagated to a predetermined stage, electric power is not supplied to each delay unit in and after the delay unit group 161-2.

Thus, the effect similar to that in each of said embodiments is available also in this embodiment.

For the forward-pulse detecting circuit and the power supply control switch, circuits and switches similar to those used in each of said embodiments may be adopted. Similarly, it is obvious that, instead of the AND circuit 164, circuits as shown in FIGS. 42 and 43 can be adopted.

For the forward-pulse detecting circuit and the power supply control switch, circuits and switches similar to those used in each of said embodiments can be adopted. It is also possible to configure so that the electric power supply is controlled in every delay unit group by dividing delay units into three or more delay unit groups.

Figure 45:
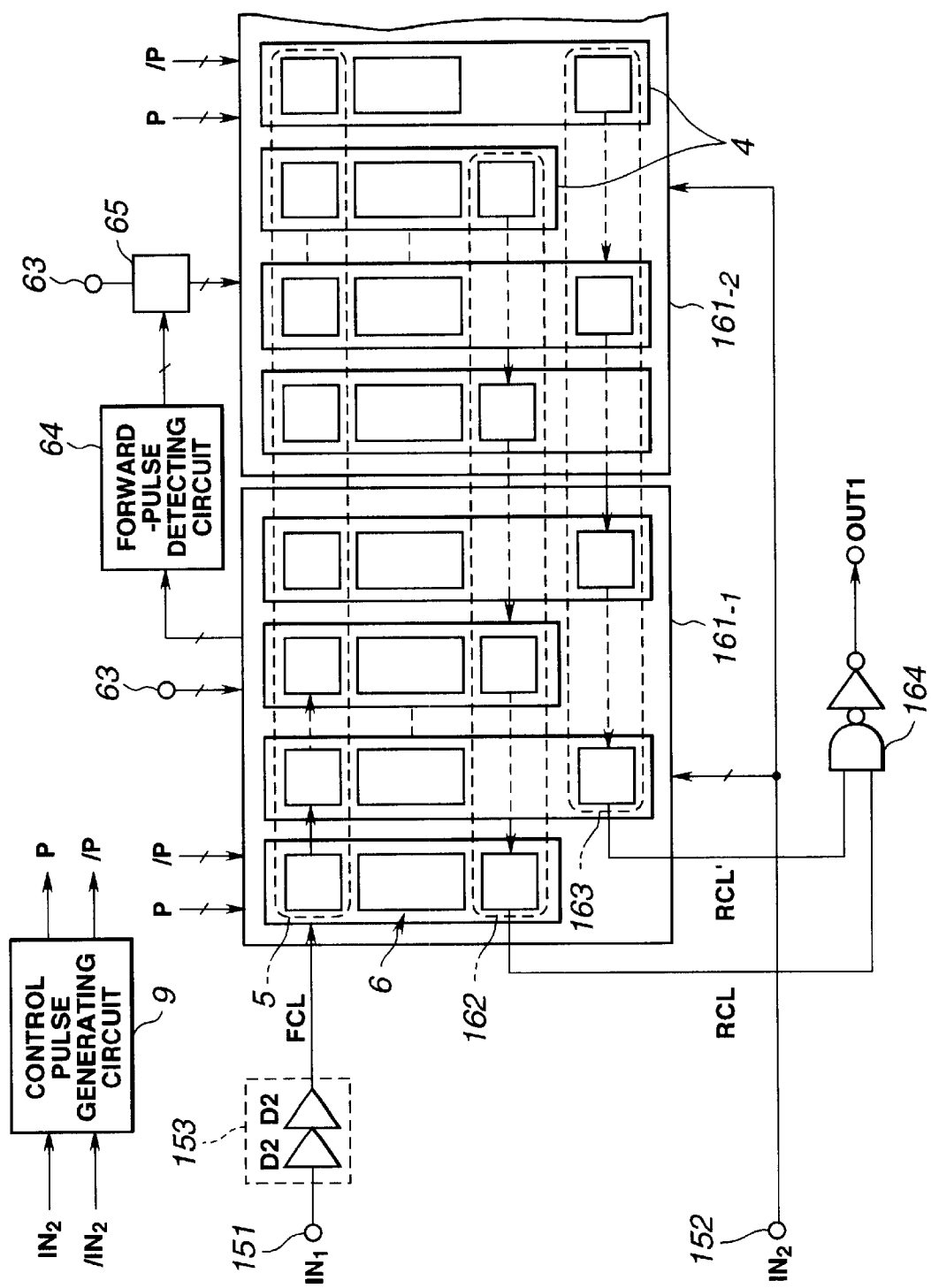
FIG. 45 is a block diagram showing another embodiment of the present invention.

FIG. 45 is a block diagram showing another embodiment of the present invention. In FIG. 45, the same elements as those in FIGS. 40 and 44 are given the same reference numerals and description about them is omitted.

In this embodiment, as IN1 and IN2, the internal clock signal CK' or the clock signal HCK, which is shifted by half period to the external clock signal CK, is used. The IN1 inputted via the input terminal 151 is delayed by the delaying apparatus 153 and supplied to the forward-pulse delay line 5 as the forward pulse F CL. Meanwhile, the IN2 is supplied to each input terminal 45 of the delay unit 4.

In the embodiment configured in such a manner, a signal OUT1, which is shifted by τ/4 or 3 τ/4 from the external clock signal, is obtained. It is also possible to generate a signal, which is delayed by τ/(2 raised to the N-th power), using the delay of the input signal and the control signal.

The method of supplying power supply voltage is similar to that in each of said embodiments.

Thus, the effect similar to that in each of said embodiments is available also in this embodiment.

For the forward-pulse detecting circuit and the power supply control switch, circuits and switches similar to those used in each of said embodiments can be adopted. It is also possible to configure so that the electric power supply is controlled in every delay unit group by dividing delay units into three or more delay unit groups. It is obvious that, instead of the AND circuit 164, the circuits as shown in FIGS. 42 and 43 can be adopted.

Figure 46:
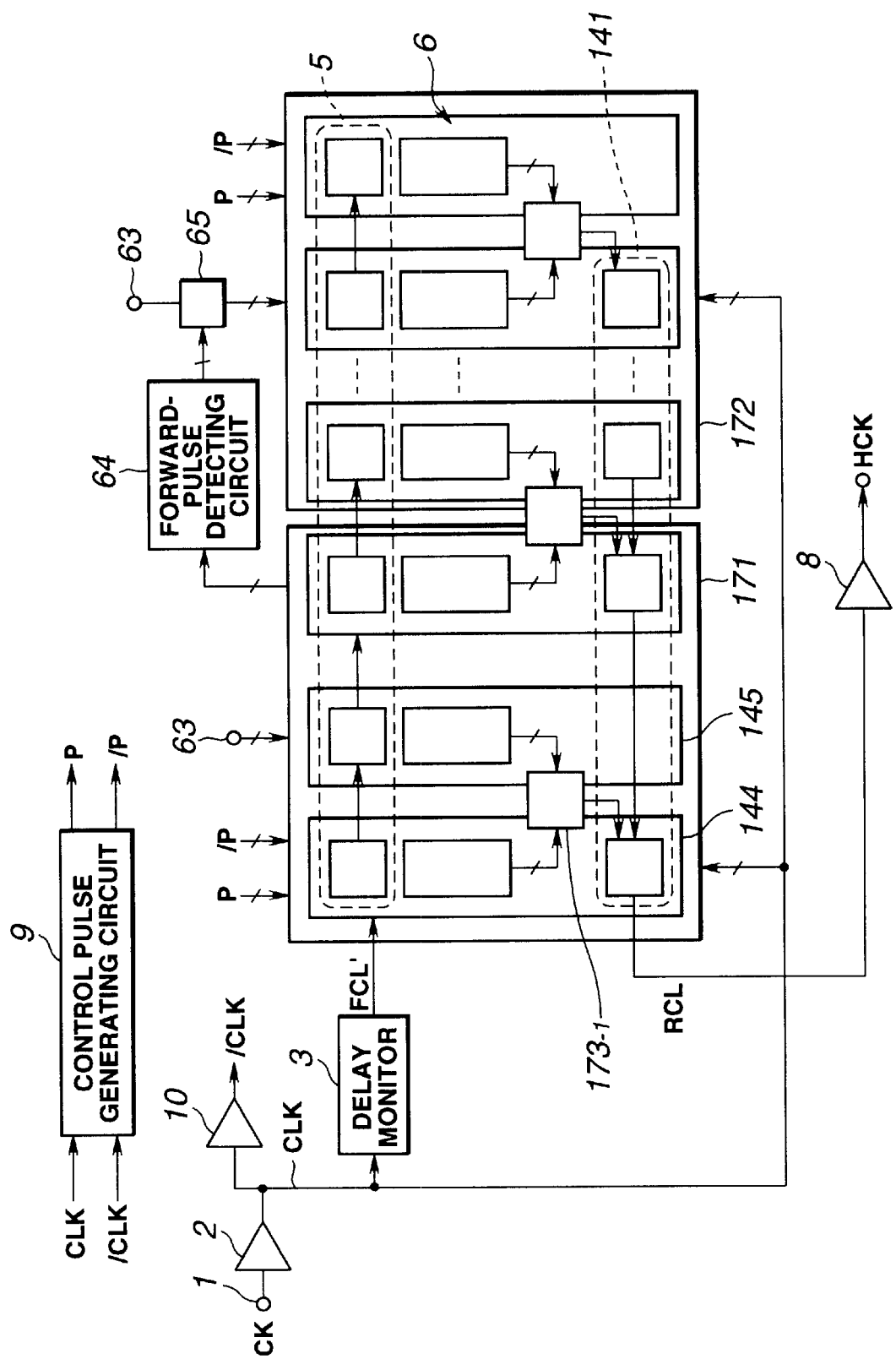
FIG. 46 is a block diagram showing another embodiment of the present invention.

FIG. 46 is a circuit diagram showing another embodiment of the present invention. In FIG. 46, the same elements as those in FIG. 38 are given the same reference numerals and description about them is omitted.

In this embodiment, the forward-pulse delay line 5 and the rearward-pulse delay line 141 are configured by alternately cascading delay units 144 and 145. Additionally, in this embodiment, logic circuits 173-1, 173-3, . . . are provided so as to compound the output of each state-holding circuit of the delay units 144 and 145. The logic circuits 173-1, 173-3, . . . are composed of AND circuits or OR circuits and designed to compound the output of state-holding circuits in two consecutive stages and to generate the state signals Q and /Q. The generated state signals Q and /Q are supplied to the rearward-pulse delay circuits 144-1, 144-3, . . .

In the embodiment configured in such a manner, the clock signal HCK, which is shifted by half period to the external clock signal CK, is obtained. Other functions are similar to those in FIG. 38.

Thus, the effect similar to that in each of said embodiments is available also in this embodiment.

For the forward-pulse detecting circuit and the power supply control switch, circuits and switches similar to those used in each of said embodiments may be adopted. It is also possible to divide delay units into three or more delay unit groups so as to make configuration wherein electric power supply is controlled in every delay unit group.

Figure 47:
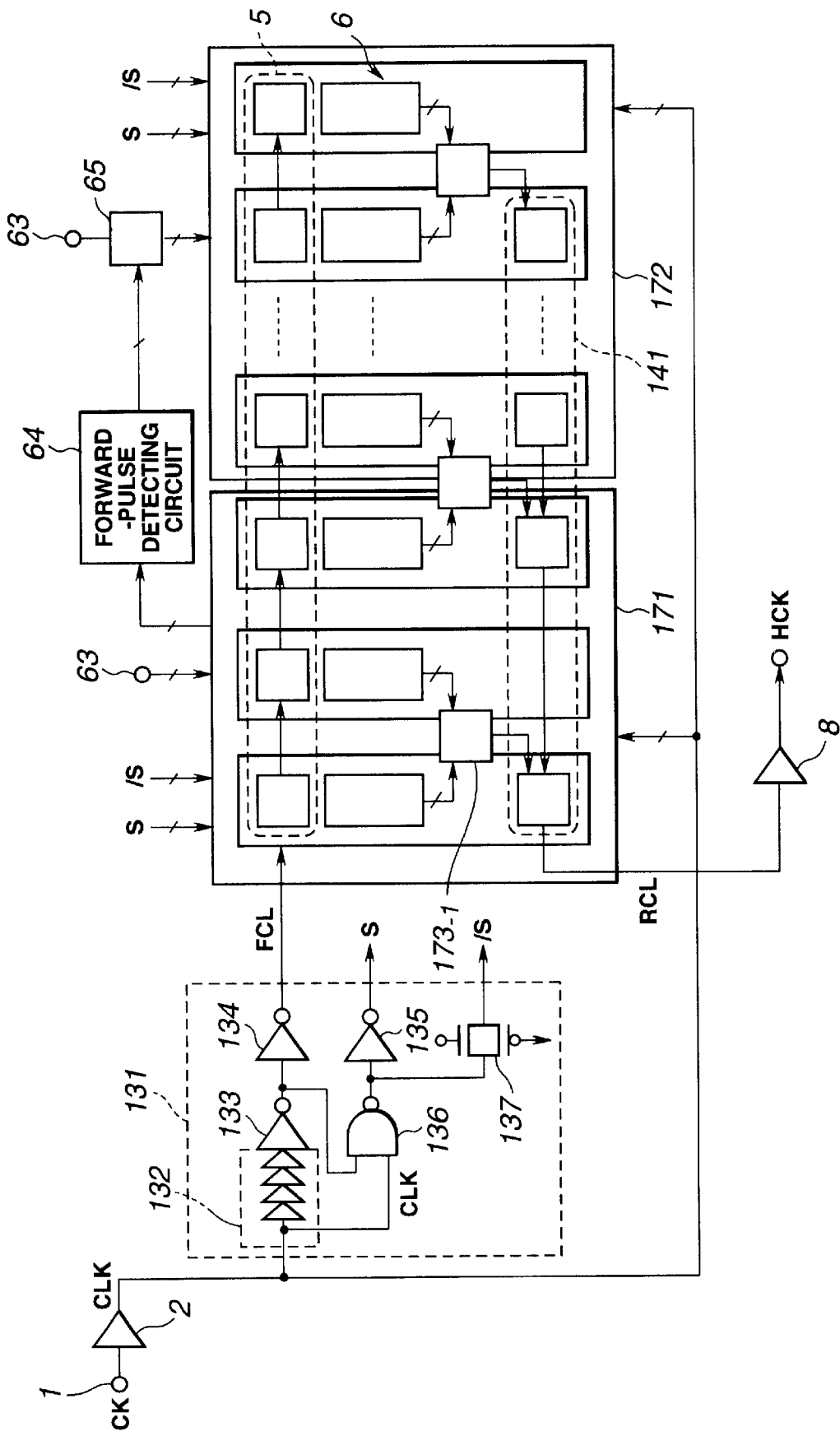
FIG. 47 is a block diagram showing another embodiment of the present invention.

FIG. 47 is a block diagram showing another embodiment of the present invention. In FIG. 47, the same elements as those in FIGS. 37 and 46 are given the same reference numerals and description about them is omitted.

This embodiment differs from that in FIG. 46 in points that the pulse generating circuit 131 is provided instead of the delay monitor 3.

In the embodiment configured in such a manner, too, when forward pulse is not propagated to a predetermined stage, electric power is not supplied to each delay unit in and after the delay unit group 171-2.

Thus, the effect similar to that in each of said embodiments is available also in this embodiment.

For the forward-pulse detecting circuit and the power supply control switch, circuits and switches similar to those used in each of said embodiments may be adopted. It is also possible to divide delay units. into three or more delay unit groups so as to make configuration wherein electric power supply is controlled in every delay unit group.

Figure 48:
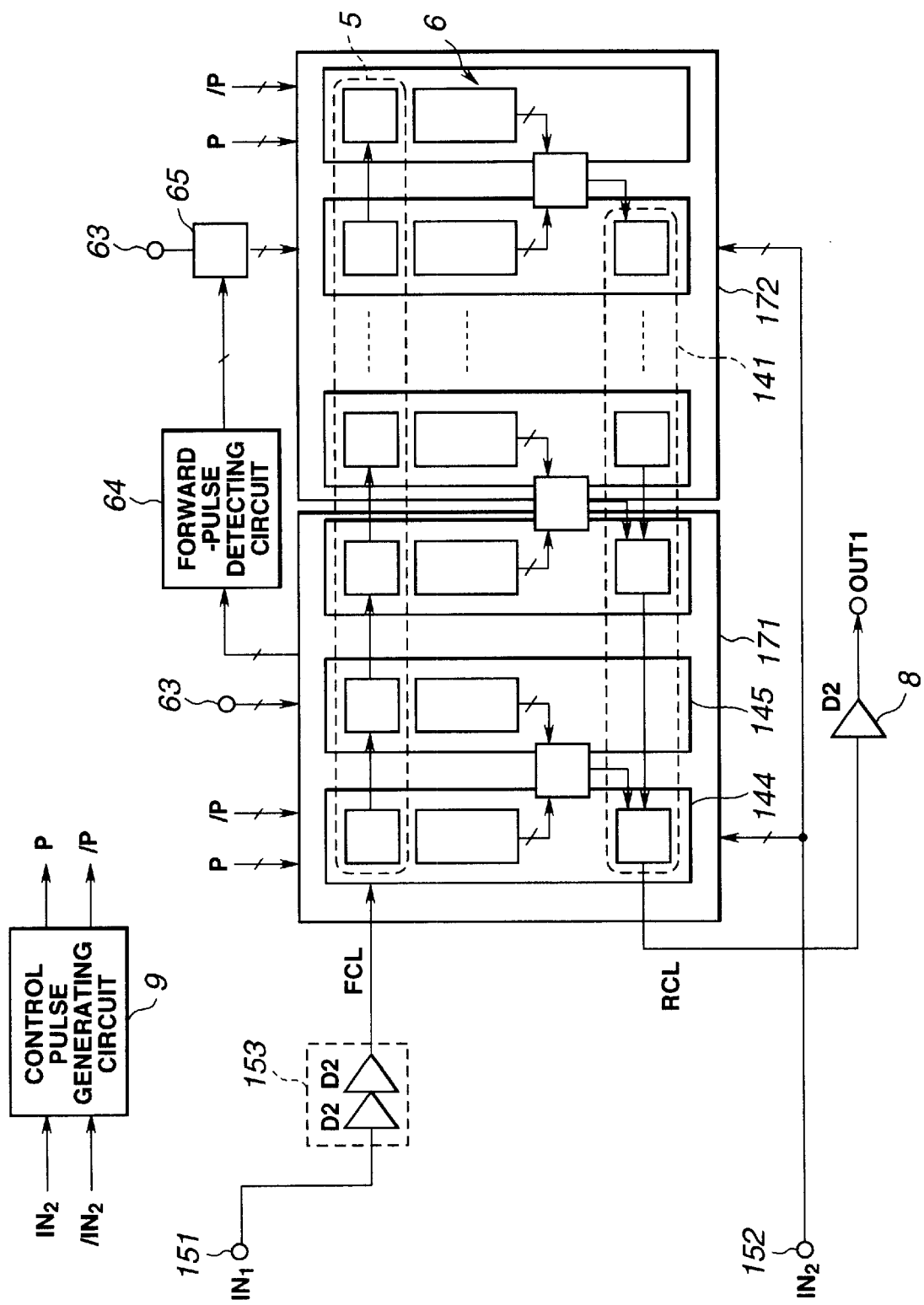
FIG. 48 is a block diagram showing another embodiment of the present invention.

FIG. 48 is a block diagram showing another embodiment of the present invention. In FIG. 48, the same elements as those in FIGS. 40 and 46 are given the same reference numerals and description about them is omitted.

In this embodiment, as IN1 and IN2, the internal clock signal CK' or the clock signal HCK, which is shifted by half period to the external clock signal CK, is used. The IN1 inputted via the input terminal 151 is delayed by the delaying apparatus 153 and supplied to the forward-pulse delay line 5 as the forward pulse F CL. Meanwhile, the IN2 is supplied to each input terminal 45 of the delay units 144 and 145.

In the embodiment configured in such a manner, a signal OUT1, which is shifted by $\tau/4$ or $3\tau/4$ from an external clock signal, is available. It is also possible to generate a signal which is delayed by $\tau/(2$ raised to the N-th power) using a delay of the input signal and the control signal.

Thus, the effect similar to that in each of said embodiments is available also in this embodiment.

For the forward-pulse detecting circuit and the power supply control switch, circuits and switches similar to those used in each of said embodiments may be adopted. It is also possible to divide delay units into three or more delay unit groups so as to make configuration wherein electric power supply is controlled in every delay unit group.

Figure 49:
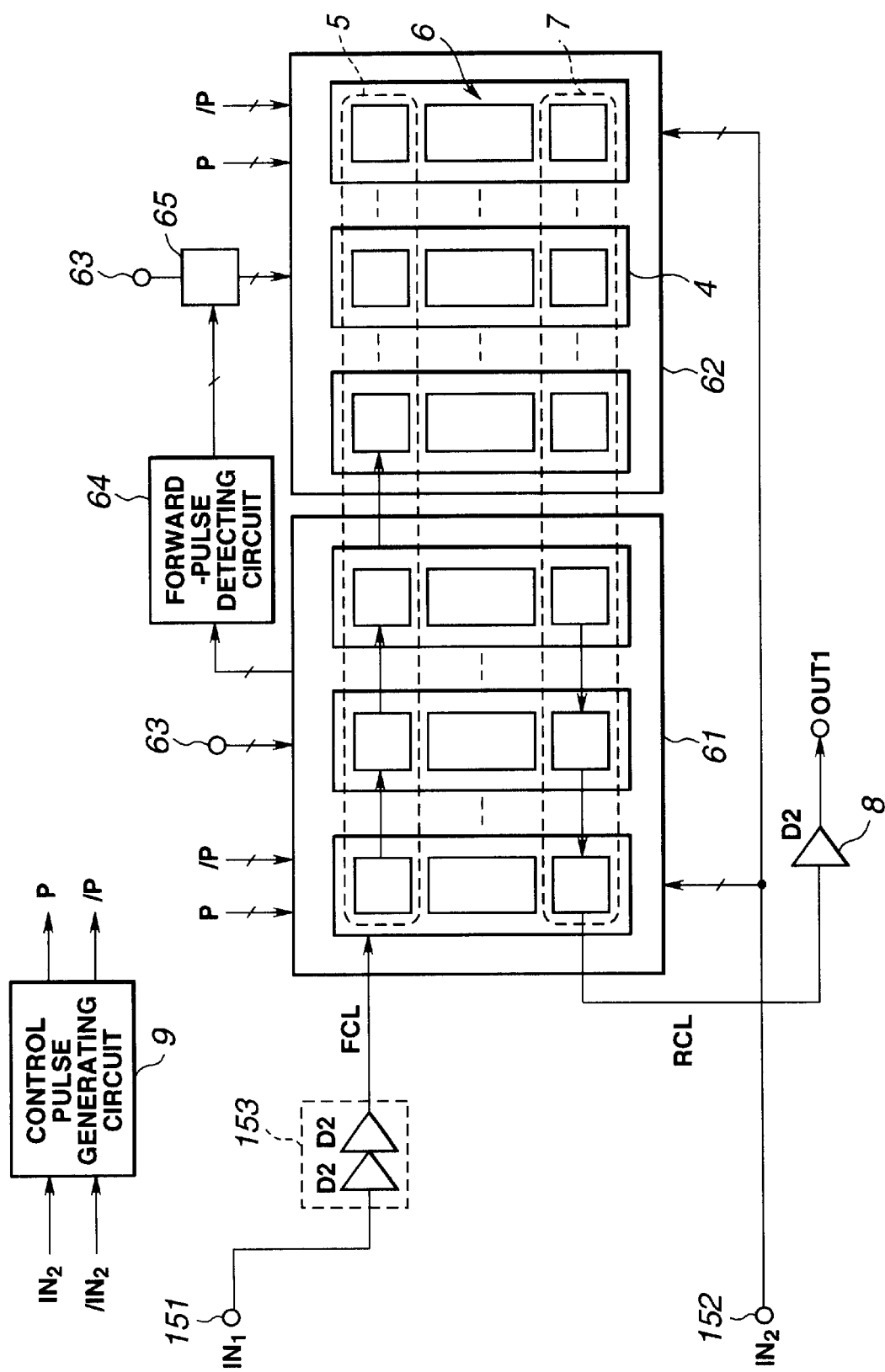
FIG. 49 is a block diagram showing another embodiment of the present invention.

FIG. 49 is a block diagram showing another embodiment of the present invention. In FIG. 49, the same elements as those in FIGS. 14 and 40 are given the same reference numerals and description about them is omitted.

This embodiment differs from that in FIG. 40 in points that the rearward-pulse delay line 7, which is composed of the same number of rearward-pulse delay circuits as the number of forward-pulse delay circuits forming the forward-pulse delay line 5, is used.

As IN1 and IN2, signals, whose phases are mutually different by $\alpha$, are inputted.

In the embodiment configured in such a manner, a signal, which is further delayed by $\alpha$ to a control signal when the control signal is delayed by $\alpha$ to the input signal, can be generated.

Other functions are similar to those in the embodiment in FIG. 40.

Thus, the effect similar to that in each of said embodiments is available also in this embodiment.

For the forward-pulse detecting circuit and the power supply control switch, circuits and switches similar to those used in each of said embodiments may be adopted. It is also possible to divide delay units into three or more delay unit groups so as to make configuration wherein electric power supply is controlled in every delay unit group.

Figure 50:
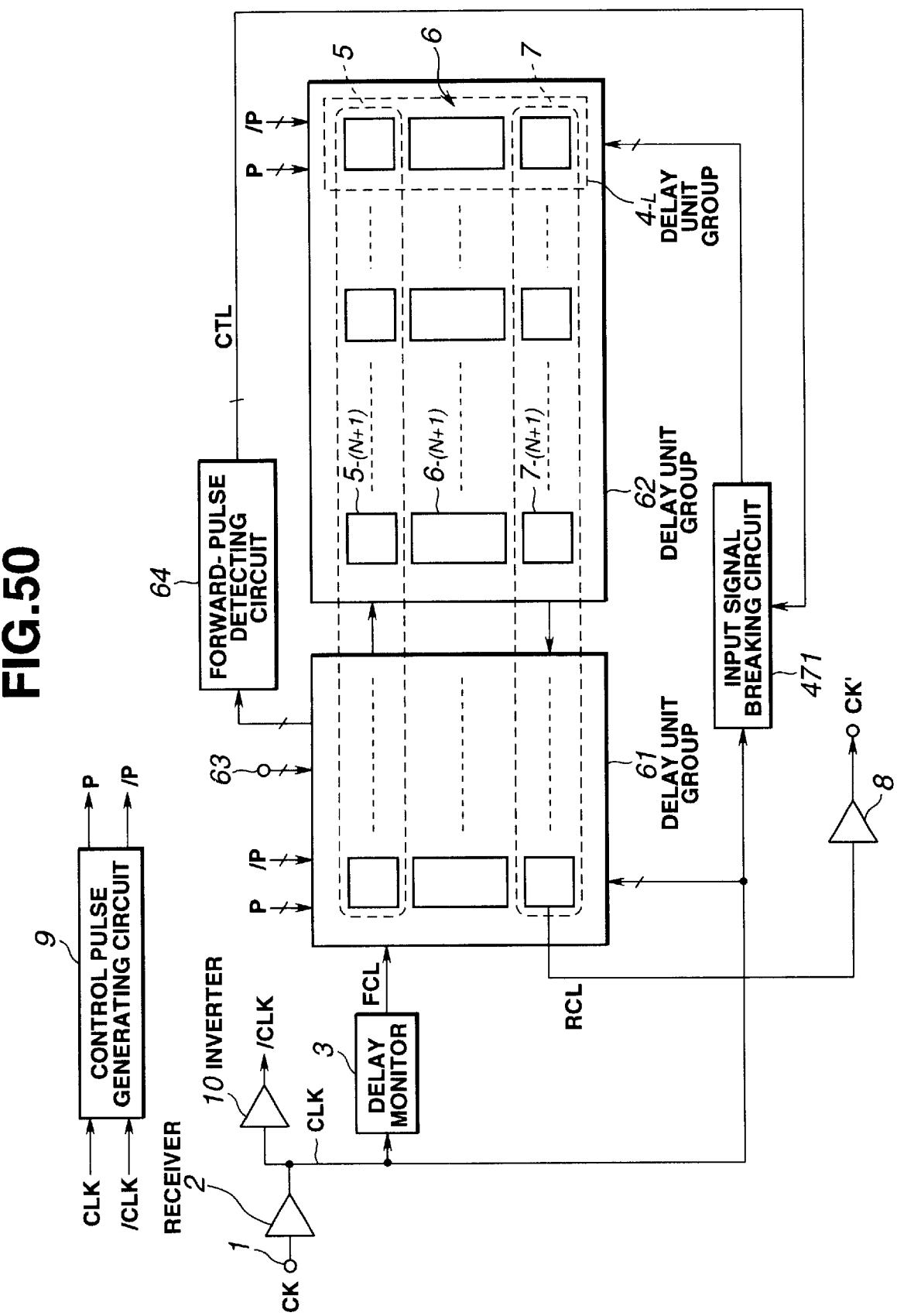
FIG. 50 is a block diagram showing another embodiment of the present invention.
Figure 51:
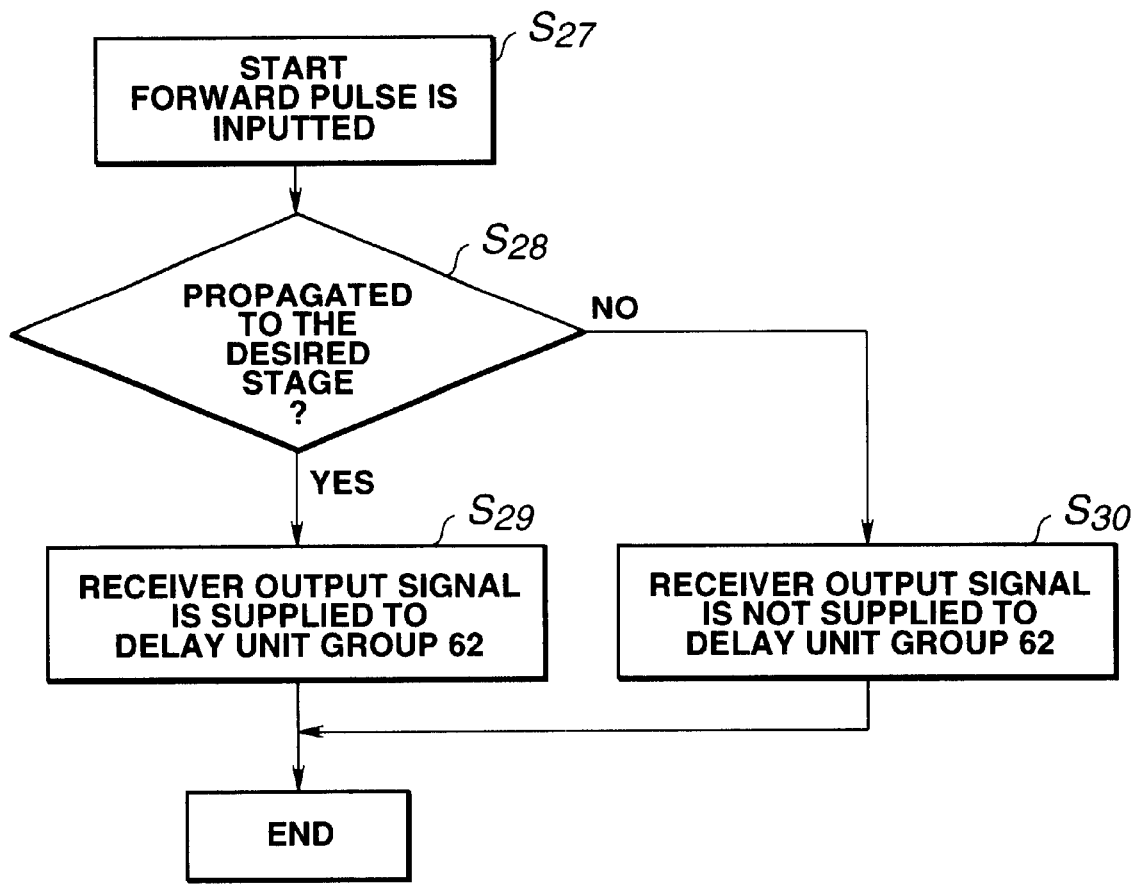
FIG. 51 is a flow chart illustrating the operation of the embodiment as shown in FIG. 50.

FIG. 50 is a block diagram showing another embodiment of the present invention. FIG. 51 is a flow chart showing the operation of the circuit shown in FIG. 50. In FIG. 50, the same elements as those in FIG. 14 are given the same reference numerals and description about them is omitted.

In each of said embodiments, electric power consumption is reduced by controlling the supply of power supply voltage. In contrast to this, this embodiment reduces it by controlling the supply of the clock signal CLK to be given to rearward-pulse delay circuits of a delay unit.

This embodiment differs from that in FIG. 14 in points that the power supply control switch 65 is not used, the power supply terminal 63 is directly connected to the delay unit group 62, and an input signal breaking circuit 471 is added between the receiver 2 and the delay unit group 62.

The input signal breaking circuit 471, when the output signal CTL of the forward-pulse detecting circuit is "L", inputs "L" to rearward-pulse delay circuits of the delay unit group 62 regardless of the output of the receiver 2, and when the CTL is "H", inputs the output of the receiver 2 to rearward-pulse delay circuits of the delay unit group 62. With such operation, it examines whether the pulse was propagated or not to a predetermined stage using a forward-pulse detecting circuit according to step S28 in the flow chart in FIG. 51. When the frequency of the external clock signal CK is high and forward pulse is not propagated to a predetermined stage (namely, when CTL="L"), according to step S30 in FIG. 51, the input of rearward-pulse delay circuits of the delay unit group 62 is fixed at "L". Consequently, electric power is not consumed. When the frequency of the external clock signal CK is low and forward pulse is propagated to a predetermined stage (namely, when CTL="L"), according to step S29 in FIG. 51, the output of the receiver 2 is supplied to rearward-pulse delay circuits of the delay unit group 62, and they operate as a clock control circuit having L stages of delay circuits.

Figure 52:
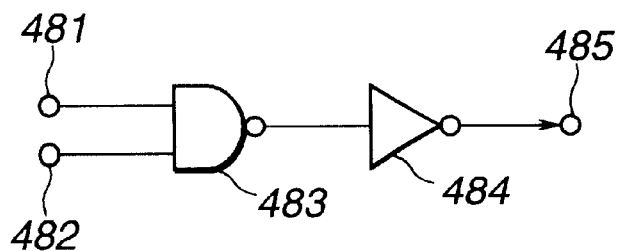
FIG. 52 is a circuit diagram showing concrete configuration of the input signal breaking circuit 471 in FIG. 50.

The concrete configuration of the input signal breaking circuit 471 is shown in FIG. 52. The input signal breaking circuit 471 consists of input terminals 481, 482, a NAND circuit 483, an inverter 484 and an output terminal 485. When CLK is inputted to the input terminals 481 and CTL is inputted to the input terminal 482, the input signal breaking circuit 471 outputs "L" when CTL="L", and when CTL="H", it transmits the output of the receiver 2 to the delay unit group 62. A circuit other than the one shown in FIG. 52 may be used so long as it is capable of such operation.

There is some anxiety for a decline in accuracy in establishing synchronization due to a delay between the clock signal CLK supplied to the delay units 61 and 62 caused by inserting the input signal breaking circuit 471 between the receiver 2 and the delay unit 62. This anxiety is solved by inserting a circuit having a delay equal to that of the input signal breaking circuit 471 between the receiver 2 and the delay unit group 61, between the receiver 2 and the delay monitor 3, between the receiver 2 and the control pulse generating circuit 9 and between the receiver 2 and the inverter 10.

For the forward-pulse detecting circuit, circuits similar to those used in each of said embodiments may be adopted. It is also possible to divide delay units into three or more delay unit groups so as to make configuration wherein the supply of output signals of the receiver 2 is controlled in each delay unit group.

All the circuits mentioned in the embodiments of the present invention can be replaced with a method of controlling the input of rearward-pulse delay circuits. That is, a method of breaking the input to rearward-pulse delay circuits, which is adopted in the embodiment in FIG. 50, is also adaptable to the embodiment in FIGS. 14, 18, 24, 25, 30, 31, 35, 36, 37, 38, 39, 40, 41, 44, 45, 46, 47, 48 and 49. For example, it is sufficient if an input signal breaking circuit is provided instead of a power supply control switch in each embodiment, and the supply of the clock signal CLK to rearward-pulse delay circuits is controlled by controlling each input signal breaking circuit corresponding to detected results of a forward-pulse detecting circuit in each embodiment.

The input signal breaking circuit is designed not only to break input signals but also to give a logical value with which rearward-pulse delay circuits do not operate.

Figure 53:
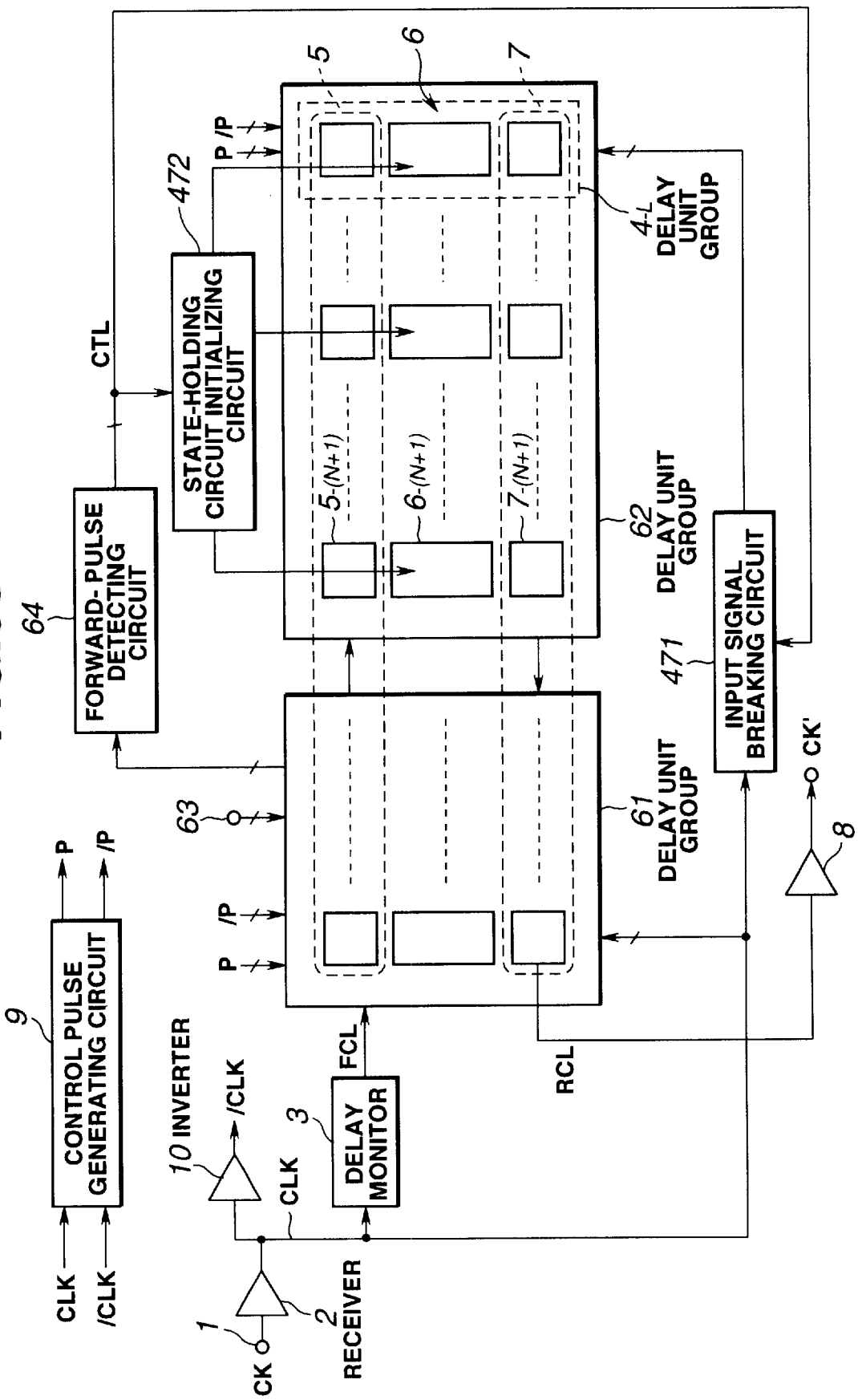
FIG. 53 is a block diagram showing another embodiment of the present invention.

FIG. 53 is a block diagram showing another embodiment of the present invention. In FIG. 53, the same elements as those in FIG. 50 are given the same reference numerals and description about them is omitted. This embodiment differs from that in FIG. 50 in points that a state-holding circuit initializing circuit 472 is added.

The state-holding circuit initializing circuit 472 is designed to fix the state-holding circuit 6 of a delay unit, after which the input of the clock signal CLK is broken by the input signal breaking circuit 471, to the reset state. The state-holding circuit initializing circuit 472 is also designed to release the fixation of the reset state when forward pulse is propagated to a delay unit from which the input is broken, and to be able to shift the state-holding circuit 6 corresponding to a stage, where forward pulse was propagated, to the set state.

In the embodiment configured in such a manner, the state-holding circuit 6 of a delay unit, after which the input of the clock signal CLK is broken by the input signal breaking circuit 471, is fixed to the reset state by the state-holding circuit initializing circuit 472. With this operation, in a stage where the clock signal CLK is not inputted, the state-holding circuit 6 is prevented from turning to the set state.

When forward pulse is propagated to a stage, after which inputting is cut off, the state-holding circuit initializing circuit 472 releases fixation of the reset state of the state-holding circuit 6.

Thus, in this embodiment, the state-holding circuit 6 can be prevented from turning to the set state in a stage where input of the clock signal CLK is cut off.

Figure 54:
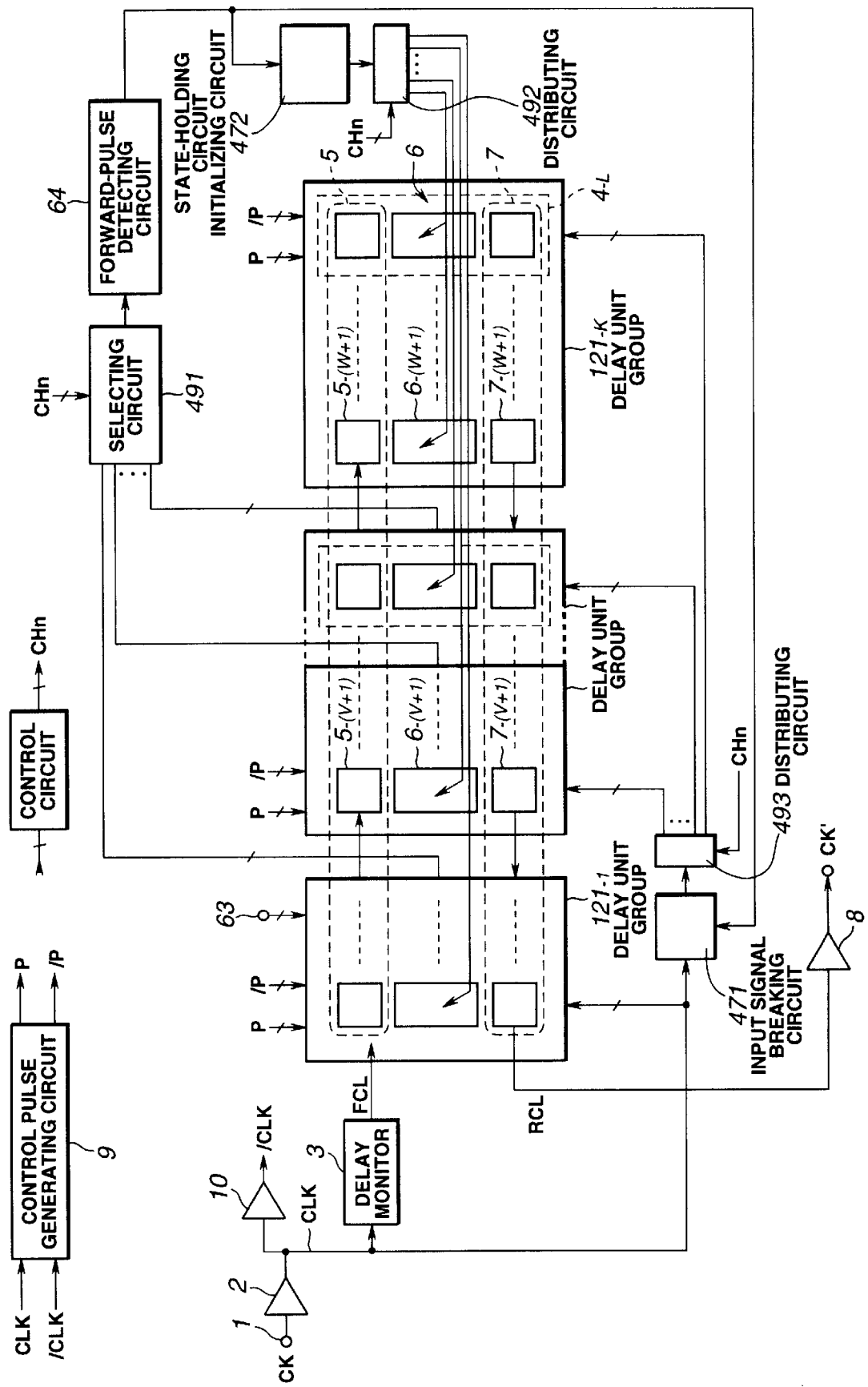
FIG. 54 is a block diagram showing another embodiment of the present invention.

FIG. 54 is a block diagram showing another embodiment of the present invention. In FIG. 54, the same elements as those in FIG. 53 are given the same reference numerals and description about them is omitted. This embodiment differs from that in FIG. 53 in points that a selecting circuit 491 and distributing circuits 492 and 493 are added.

The selecting circuit 491 is designed to be connected to a forward-pulse delay circuit or to a state-holding circuit, which is comprised in a delay unit in a predetermined stage of the delay unit groups 121-1 to 121-(K−1), and to output to the forward-pulse detecting circuit 64 a signal for detecting a stage, where forward pulse was propagated, corresponding to a selection signal CHn inputted from the exterior. With this operation, whether forward pulse was propagated or not to a stage corresponding to the selection signal CHn is detected.

The distributing circuit 492 is designed to distribute the output of the state-holding circuit initializing circuit 472 to the state-holding circuit 6 in each stage corresponding to the selection signal CHn. The distributing circuit 493 is designed to distribute the output of the input signal breaking circuit 471 to rearward-pulse delay circuits in each stage corresponding to the selection signal CHn.

In the embodiment configured in such a manner, providing the selecting circuit 491 enables to select a signal to inform propagation of forward pulse from a plurality of stages. A signal to inform propagation of forward pulse is inputted to the selecting circuit 491 from blocks except the last block. The selecting circuit 491 outputs one of input signals to the forward-pulse detecting circuit 64 corresponding to the selection signal CHn.

The output signal of the forward-pulse detecting circuit 64 is supplied to the state-holding circuit initializing circuit 472 and the input signal breaking circuit 471. The input signal breaking circuit 471 supplies the clock signal CLK to rearward-pulse delay circuits only when the detected result of the forward-pulse detecting circuit 64 indicates that forward pulse was propagated. In this embodiment, the clock signal CLK from the input signal breaking circuit 471 is supplied to each delay unit via the distributing circuit 493. The distributing circuit 493 distributes the clock signal CLK corresponding to the selection signal CHn. The output of state-holding circuit initializing circuit 472 is distributed to each state-holding circuit by the distributing circuit 492.

For example, when a detected result showing that forward pulse was propagated up to the N-th stage is inputted, the input signal breaking circuit 471 breaks the supply of the clock signal CLK to rearward-pulse delay circuits in and after the (N+1)th stage. The state-holding circuits in and after the (N+1)th stage are fixed to the reset state by the distributing circuit 492.

Other functions are similar to those in the embodiment in FIG. 53.

Thus, in this embodiment, propagation of forward pulse can be detected at any position, for example, being set by a user, and reduction in electric power consumption can be controlled exactly.

Figure 55:
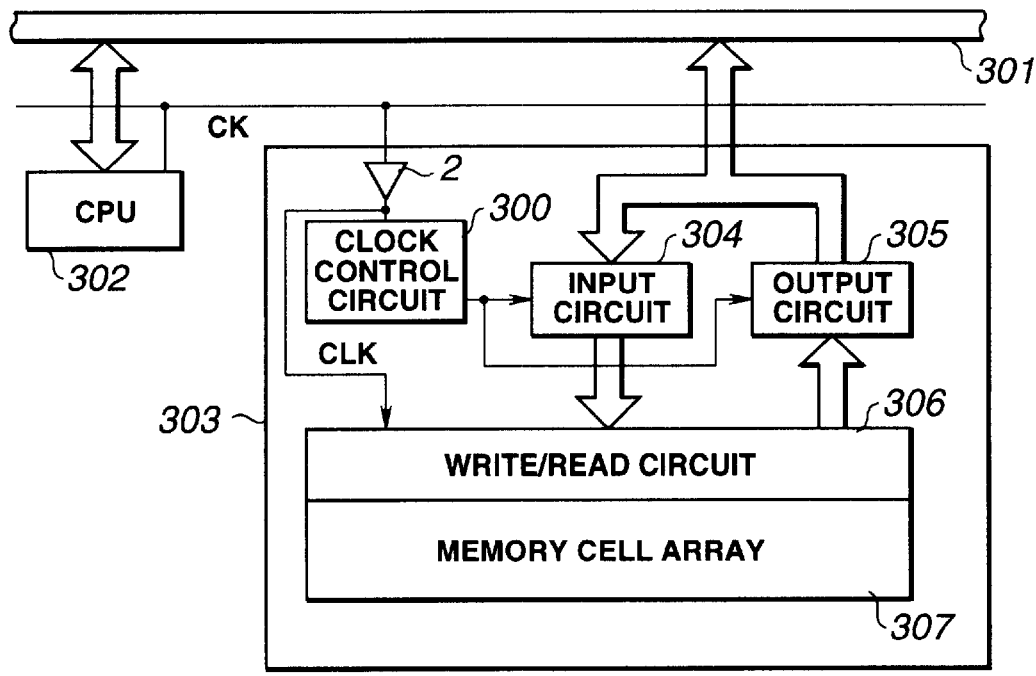
FIG. 55 is a block diagram showing another embodiment of the present invention.

FIG. 55 is a block diagram showing another embodiment of the present invention. In this embodiment, the present invention is applied to a system comprising a memory such as a synchronous DRAM. For a clock control circuit 300 used in this embodiment, any clock control circuit, which is adopted in any of the embodiments described above, may be used.

A CPU 302 connected onto a bus 301 executes predetermined instruction by being given an external clock signal CK. For example, the CPU 302 instructs writing and reading to a memory device 303.

The memory device 303 comprises the receiver 2, an input circuit 304, an output circuit 305, a write/read circuit 306, a memory cell array 307 and the clock control circuit 300. The input circuit 304 gives data transferred via the bus 301 to the write/read circuit 306 and writes them into the memory cell array 307. The output circuit 305 is designed to transfer data, which are read out from the memory cell array 307 using the write/read circuit 306, to the bus 301.

The clock control circuit 300 is designed to be given the clock signal CLK from the receiver 2, to generate an internal clock signal CK' synchronized to an external clock signal CK and to output it to the input circuit 304 and the output circuit 305.

In the embodiment configured in such a manner, to the memory device 303, the same external clock signal CK as that to be supplied to the CPU 302 is supplied. When the clock frequency is high, in order to obtain the stable system operation, the memory device 303 is required to output data which are synchronized to the external clock signal CK and held in the memory cell array 307, to the bus 301.

The external clock signal CK is taken in after being delayed by the time D1 by the receiver 2. The clock control circuit 300 is given the clock signal CLK from the receiver 2 and generates the internal clock signal CK' synchronized to the external clock signal CK. The input circuit 304 takes in the data from the bus 301 using the internal clock signal CK' and writes them into the memory cell array 307 via the write/read circuit 306. The write/read circuit 306 is operated with the clock signal CLK. Thus, at the time of writing of data, data are taken in from the bus 301 synchronizing to the external clock signal CK.

At the time of reading of data, the data in the memory cell array 307 are read out by the write/read circuit 306 and supplied to the output circuit 305. The output circuit 305 is driven by the internal clock signal CK', and transfers the read data to the bus 301 synchronizing to the external clock signal CK. In such a manner, at the time of reading of data, the transfer of data to the bus 301 is carried out synchronizing to the external clock signal CK.

Thus, in this embodiment, by using the clock control circuit according to each of said embodiments, writing and reading synchronized to the external clock signal is possible.

Figure 56:
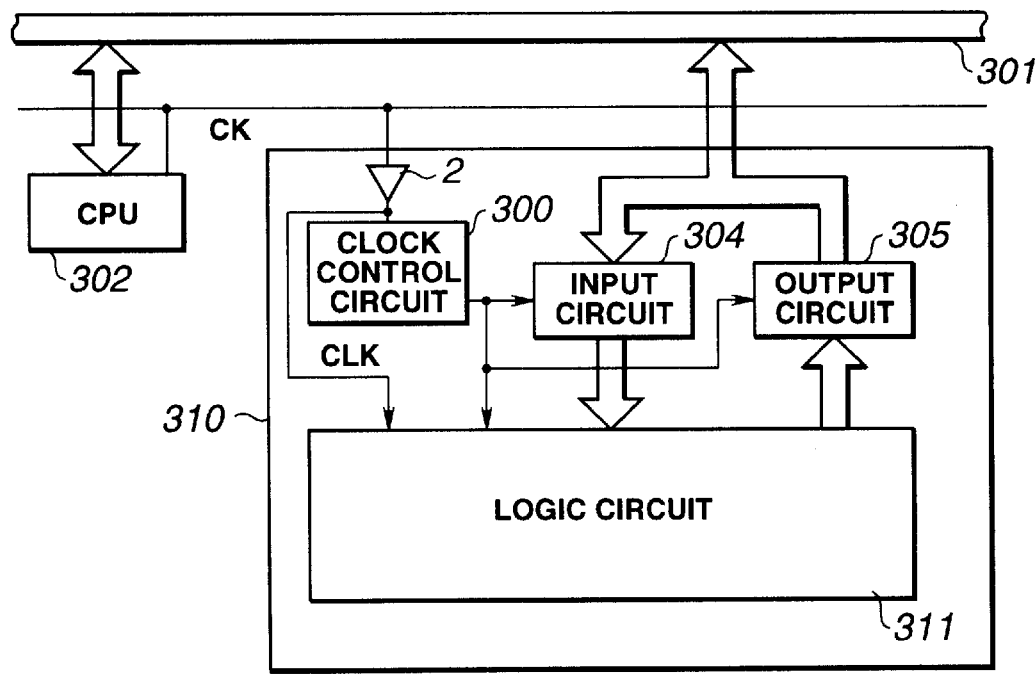
FIG. 56 is a block diagram showing another embodiment of the present invention.

FIG. 56 is a block diagram showing another embodiment of the present invention. In this embodiment, the present invention is applied to a system comprising a logic circuit. In FIG. 56, the same elements as those in FIG. 55 are given the same reference numerals and description about them is omitted.

In this embodiment, a logic device 310 is used instead of the memory device 303, and the logic device 310 differs from the memory device 303 in points that a logic circuit 311 is adopted in place of the write/read circuit 306 and the memory cell array 307.

The logic circuit 311 is designed to have data for operation supplied from the input circuit 304, to perform a predetermined operation, and to output the operated result to the bus 301 via the output circuit 305.

In the embodiment configured in such a manner, too, the input circuit 304 takes in data from the bus 301 using the internal clock signal CK' and supplies them to the logic circuit 311. The output circuit 305 is driven by the internal clock signal CK' and transfers the operated result of the logic circuit 311 to the bus 301 synchronizing to the external clock signal CK. Although the logic circuit 311 operates corresponding to the clock signal CLK, it is good enough if only the input and output of data to the bus 301 are synchronized to the external clock signal CK.

Thus, in this embodiment, using the clock control circuit according to each of said embodiments enables data to be taken in and transferred synchronizing to the external clock signal.

In the embodiments in FIGS. 55–56, write and readout of data to the memory cell array 307 or operation processing in the logic circuit 311 are performed according to the clock signal CLK. However, it is obvious that these processes may be designed so as to be performed according to the internal clock signal CK'.

In the embodiments in FIGS. 55–56, in order to simplify the description, the clock control circuit 300 is described as a device to output the internal clock signal CK' synchronized to the external clock signal CK. Actually, however, considering the delay at the input circuit 304 and the output circuit 305, the data transfer synchronized to the external clock signal CK at the time of input and output of data to the bus 301 is made possible by including these delay times to the delay time of the output buffer in the clock control circuit 300.

Figure 57:
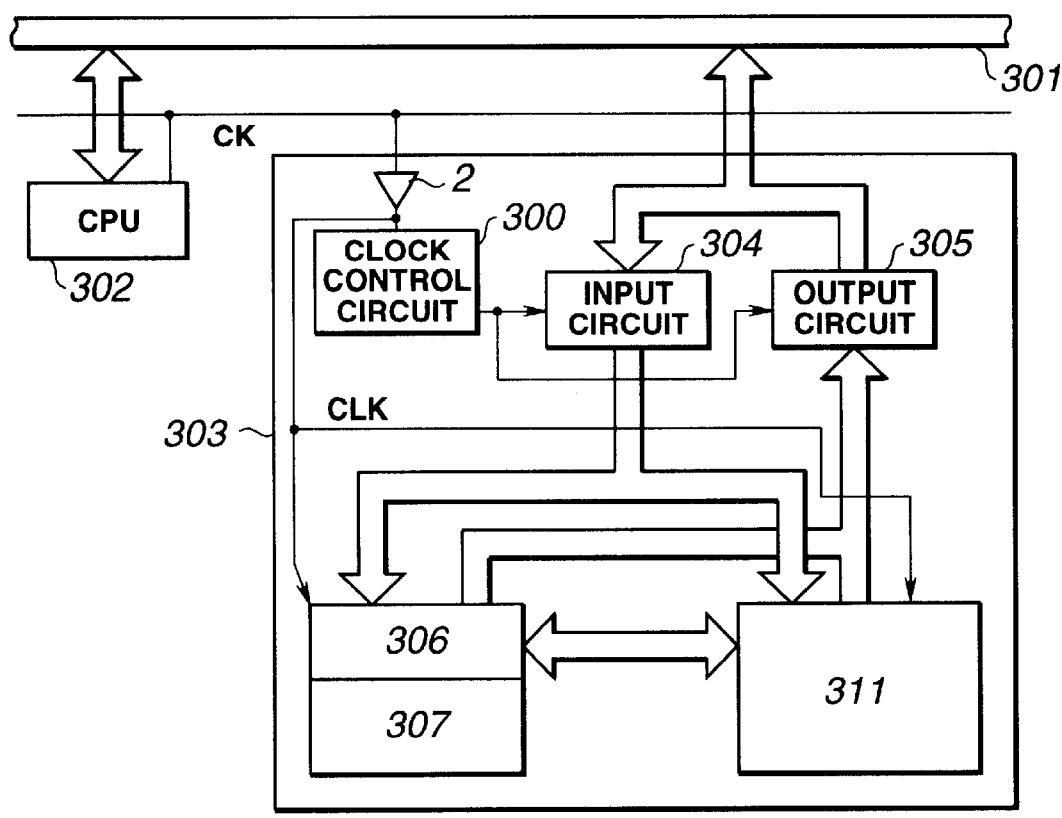
FIG. 57 is a block diagram showing another embodiment of the present invention.

FIG. 57 is a block diagram showing another embodiment of the present invention. In this embodiment, the present invention is applied to a system comprising a logic circuit. In FIG. 57, the same elements as those in FIGS. 55 and 56 are given the same reference numerals and description about them is omitted.

The points where this embodiment differs from that in FIG. 56 are that a logic circuit 311, a write/read circuit 306 and a memory cell circuit 304 are integrated on the same chip.

In the embodiment configured in such a manner, too, an input circuit 304 takes in data from a bus 301 using the internal clock signal CK' and supplies them to the logic circuit 304 or the write/read circuit 306. The output circuit 311 is driven by the internal clock signal CK', and sends and receives data to and from the memory cell array or transfers the operated result of the logic circuit 311 to the bus 301 synchronizing to the external clock signal CK.

Thus, in this embodiment, by using the clock control circuit according to said embodiment, it is possible to take in and to transfer data synchronized to the external clock signal.

It is obvious that the present invention is, without any departure from the spirit and scope of it, able to become the basis of configuration for different aspects of embodiments in a wide scope. The present invention should not be limited, except by the appended claims, only to these embodiments.

What is claimed is:

1. A clock control circuit, comprising:
    a forward-pulse delay line which is configured by cascading a plurality of stages of forward-pulse delay circuits to delay an inputted signal by propagating said inputted signal with a predetermined delay time, and delays a forward pulse by propagating said forward pulse, a rearward-pulse delay line which is configured by cascading a plurality of stages of rearward-pulse delay circuits to delay an inputted signal by propagating said inputted signal with a predetermined delay time, and delays a rearward pulse by propagating said rearward pulse, a control device to propagate said rearward pulse by said rearward-pulse delay line in a number of stages corresponding to the number of stages where said forward pulse was propagated by said forward-pulse delay line, a forward-pulse detecting device to detect whether said forward pulse was propagated or not in one or a plurality of predetermined stages, and an electric power consumption control device to control electric power consumption of said rearward-pulse delay circuits, corresponding to the detected result of said forward-pulse detecting device.

2. A clock control circuit according to claim 1, wherein said electric power consumption control device controls electric power consumption of said rearward-pulse delay circuits, and also controls electric power consumption of at least one of said forward-pulse delay circuits and said control device, corresponding to the detected result of said forward-pulse detecting device.

3. A clock control circuit, comprising:

a forward-pulse delay line which is configured by cascading a plurality of stages of forward-pulse delay circuits to delay an inputted signal by propagating said inputted signal with a predetermined delay time, and delays a forward pulse, which corresponds to a second clock signal obtained by delaying a first clock signal by a first delay time, by a second delay time corresponding to the difference between the period of said first clock signal and said first delay time, a rearward-pulse delay line which is configured by cascading a plurality of stages of rearward-pulse delay circuits to delay an inputted signal by propagating said inputted signal with a predetermined delay time, and, by being set to the reset state of a stage corresponding to the stage of said forward-pulse delay line where said forward pulse was propagated after said second delay time from the start of propagation of said forward pulse by said forward-pulse delay line, and also by being set to the set state of stages corresponding to the stages of said forward-pulse delay line from the 1st stage to the stage where said forward pulse was propagated, propagates the rearward pulse generated in said stage in the reset state by said stages in the set state and outputs said rearward pulse from the 1st stage, a state-holding device which is configured with a number of stages corresponding to the number of stages of said forward-pulse delay line and said rearward-pulse delay line, and has a plurality of state-holding circuits to control propagation of said rearward pulse by said rearward-pulse delay line by turning stages corresponding to the stages of said forward-pulse delay line where said forward pulse was propagated during a one polarity pulse duration of said first clock signal to the set state and also by turning stages corresponding to the stages where said rearward pulse was propagated during a predetermined time from the edge of said first clock signal to the reset state, a forward-pulse detecting device to detect whether said forward pulse was propagated or not in one or a plurality of predetermined stages of said forward-pulse delay line, and an electric power consumption control device to control electric power consumption of said rearward-pulse delay circuits, corresponding to the detected result of said forward-pulse detecting device.

4. A clock control circuit according to claim 3, wherein said electric power consumption control device controls electric power consumption of said rearward-pulse delay circuits, and also controls electric power consumption of at least one of said forward-pulse delay circuits and said state-holding circuits, corresponding to the detected result of said forward-pulse detecting device.

5. A clock control circuit, comprising:

a forward-pulse delay line which is configured by cascading a plurality of stages of forward-pulse delay circuits to delay an inputted signal by propagating said inputted signal with a predetermined delay time, and delays a forward pulse, which corresponds to a second clock signal obtained by delaying a first clock signal by a first delay time, by a second delay time corresponding to the difference between the period of said first clock signal and said first delay time, a rearward-pulse delay line which is configured by cascading a plurality of stages of rearward-pulse delay circuits to delay an inputted signal by propagating said inputted signal with a predetermined delay time, and, by being set to the reset state of a stage corresponding to the stage of said forward-pulse delay line where said forward pulse was propagated after said second delay time from the start of propagation of said forward pulse by said forward-pulse delay line and also by being set to the set state of stages corresponding to the stages of said forward-pulse delay line from the 1st stage to the stage where said forward pulse was propagated, propagates a rearward pulse which is generated in said stage in the reset state by taking in said first clock signal selectively by said stages in the set state and outputs said rearward pulse from the 1st stage, a state-holding device which is composed of a number of stages corresponding to the number of stages of said forward-pulse delay line and said rearward-pulse delay line, and has a plurality of state-holding circuits to control propagation of said rearward pulse by said rearward-pulse delay line by turning stages corresponding to the stage of said forward-pulse delay line where said forward pulse was propagated during a one polarity pulse duration of said first clock signal to the set state, and also by turning stages corresponding to the stages where said rearward pulse was propagated for only a predetermined time from the edge of said first clock signal to the reset state, a forward-pulse detecting device to detect whether said forward pulse was propagated or not in one or a plurality of predetermined stages, and an electric power consumption control device to control electric power consumption by controlling the supply of power supply voltage to said rearward-pulse delay circuits, corresponding to the detected result of said forward-pulse detecting device.

6. A clock control circuit according to claim 5, wherein said electric power consumption control device controls the supply of power supply voltage in every stage or in every plurality of stages.

7. A clock control circuit according to claim 5, wherein said electric power consumption control device controls electric power consumption by controlling the supply of the power supply voltage to said rearward-pulse delay circuits, and also controls electric power consumption by controlling the supply of the power supply voltage to at least one of said forward-pulse delay circuits and said state-holding circuits, corresponding to the detected result of said forward-pulse detecting device.

8. A clock control circuit according to claim 5, wherein said electric power consumption control device controls electric power consumption so that, when said forward pulse was propagated to a designated stage, power supply voltage continues being supplied to a specified circuit of said rearward-pulse delay circuits.

9. A clock control circuit according to claim 8, wherein said electric power consumption control device controls electric power consumption so that, when said forward pulse was propagated to a designated stage, the power supply voltage continues being supplied to a specified circuit of said rearward-pulse delay circuits, and also continues being supplied to a specified circuit of at least one of said forward-pulse delay circuits and said state-holding circuits.

10. A clock control circuit according to claim 5, wherein said electric power consumption control device, when said forward pulse was propagated to the 1st stage, supplies power supply voltage to a specified circuit of said rearward-pulse delay circuits, and, when said forward pulse stops being propagated to the 2nd stage, cuts off the supply of the power supply voltage to said specified circuit.

11. A clock control circuit according to claim 10, wherein said 1st stage and 2nd stage are stages mutually different.

12. A clock control circuit according to claim 10, wherein said electric power consumption control device, when said forward pulse was propagated to the 1st stage, supplies the power supply voltage to a specified circuit of said rearward-pulse delay circuits, and, when said forward pulse stops being propagated to the 2nd stage, cuts off the supply of the power supply voltage to the specified circuit of said rearward-pulse delay circuits, and also, when said forward pulse was propagated to the 1st stage, supplies the power supply voltage to a specified circuit of at least one of said forward-pulse delay circuits and said state-holding circuits, and, when said forward pulse stops being propagated to the 2nd stage, cuts off the supply of the power supply voltage to the specified circuit of at least one of said forward-pulse delay circuits and said state-holding circuits.

13. A clock control circuit, comprising:

a forward-pulse delay line which is configured by cascading a plurality of stages of forward-pulse delay circuits to delay an inputted signal by propagating said inputted signal with a predetermined delay time, and delays a forward pulse, which corresponds to a second clock signal obtained by delaying a first clock signal by a first delay time, by a second delay time corresponding to the difference between the period of said first clock signal and said first delay time, a rearward-pulse delay line which is configured by cascading a plurality of stages of rearward-pulse delay circuits to delay an inputted signal by propagating said inputted signal with a predetermined delay time, and, by being set to the reset state of a stage corresponding to the stage of said forward-pulse delay line where said forward pulse was propagated after said second delay time from the start of propagation of said forward pulse by said forward-pulse delay line, and also by being set to the set state of stages corresponding to the stages of said forward-pulse delay line from the 1st stage to the stage where said forward pulse was propagated, propagates a rearward pulse generated in said stage in the reset state by said stages in the set state and outputs it from the 1st stage, a state-holding device which is composed of a number of stages corresponding to the number of stages of said forward-pulse delay line and said rearward-pulse delay line, and has a plurality of state-holding circuits to control propagation of said rearward pulse by said rearward-pulse delay line by turning a stage corresponding to the stage of said forward-pulse delay line where said forward pulse was propagated during a one polarity pulse duration of said first clock signal to the set state, and also by turning stages corresponding to the stages where said rearward pulse was propagated for only a predetermined time from the edge of said first clock signal to the reset state, a forward-pulse detecting device to detect whether said forward pulse was propagated or not in one or a plurality of predetermined stages, and an electric power consumption control device to control electric power consumption by controlling the supply of input signals to said rearward-pulse delay circuits, corresponding to the detected result of said forward-pulse detecting device.

14. A clock control circuit according to claim 13, wherein said electric power consumption control device controls the supply of said input signals in every stage or in every plurality of stages.

15. A clock control circuit according to claim 13, wherein said electric power consumption control device controls electric power consumption so that, when said forward pulse was propagated to a designated stage, said input signal continues being supplied to a specified circuit of said rearward-pulse delay circuits.

16. A clock control circuit according to claim 13, wherein said electric power consumption control device controls electric power consumption by controlling the supply of the input signal to said rearward pulse delay circuits, and also controls electric power consumption by controlling the supply of the input signal to at least one of said forward-pulse delay circuits and said state-holding circuits corresponding to the detected result of said forward-pulse detecting device.

17. A clock control circuit according to claim 13, wherein said electric power consumption control device controls electric power consumption so that, when said forward pulse was propagated to a designated stage, the input signal continues being supplied to a specified circuit of said rearward-pulse delay circuits, and also said input signal continues being supplied to a specified circuit of at least one of said forward-pulse delay circuits and said state-holding circuits.

18. A clock control circuit according to claim 13, wherein said electric power consumption control device, when said forward pulse was propagated to the 1st stage, supplies said input signal to a specified circuit of said rearward-pulse delay circuits, and when said forward pulse stops being propagated to the 2nd stage, cuts off the supply of said input signal to the specified circuit of said rearward-pulse delay circuits, and also, when said forward pulse was propagated to the 1st stage, supplies said input signal to a specified circuit of at least one of said forward-pulse delay circuits and said state-holding circuits, and when said forward pulse stops being propagated to the 2nd stage, cuts off the supply of said input signal to the specified circuit of at least one of said forward-pulse delay circuits and said state-holding circuits.

19. A clock control circuit according to claim 13, wherein said electric power consumption control device, when said forward pulse was propagated to the 1st stage, supplies said input signal to a specified circuit of said rearward-pulse delay circuits, and when said forward pulse stops being propagated to the 2nd stage, breaks the supply of said input signal to said specified circuit.

20. A clock control circuit according to claim 19, wherein said 1st stage and 2nd stage are stages mutually different.

21. A clock control circuit according to claim 13, wherein said electric power consumption control device controls electric power consumption by controlling the supply of said first clock signal, which becomes the source of said rearward pulse, to said rearward-pulse delay circuits corresponding to the detected result of said forward-pulse detecting device.

22. A clock control circuit according to claim 21, wherein said electric power consumption control device controls the supply of said first clock signal to every stage or every plurality of stages.

23. A clock control circuit according to claim 21, wherein said electric power consumption control device controls electric power consumption so that, when said forward pulse was propagated to a designated stage, said first clock signal continues being supplied to a specified circuit of said rearward-pulse delay circuits.

24. A clock control circuit according to claim 21, wherein said electric power consumption control device, when said forward pulse was propagated to the 1st stage, supplies said first clock signal to a specified circuit of said rearward-pulse delay circuits, and, when said forward pulse stops being propagated to the 2nd stage, cuts off the supply of said first clock signal to said specified circuit.

25. A clock control circuit according to claim 24, wherein said 1st stage and 2nd stage are stages mutually different.

26. A clock control circuit, comprising:
a forward-pulse delay line, which is configured by cascading a plurality of forward-pulse delay circuits, controlled by a first control signal, to propagate a forward pulse generated in correspondence with a first clock signal,
a rearward-pulse delay line, which is configured by cascading a plurality of rearward-pulse delay circuits provided in correspondence with said plurality of forward-pulse delay circuits of said forward-pulse delay line, to propagate a rearward pulse in said rearward-pulse delay line by stages corresponding to stages by which said forward pulse has propagated in said forward-pulse delay line to be outputted,
a state-holding device connected to said forward-pulse delay line and said rearward-pulse delay line, controlled by said first control signal, to turn stages of said rearward-pulse delay line corresponding to stages by which said forward pulse has propagated to the set state, and also turn stages by which said rearward pulse has propagated to the reset state, and
a forward-pulse detecting device to detect whether said forward pulse was propagated or not in one or a plurality of predetermined stages, and
an electric power consumption control device to control electric power consumption by said rearward-pulse delay circuits corresponding to the result of said forward-pulse detecting device,
wherein a rearward-pulse delay circuit which is nearest the output side among said rearward-pulse delay circuits connected to said state-holding device which has been turned to the reset state generates said rearward pulse in correspondence with said first clock.

27. A clock control circuit, comprising:
a forward-pulse delay line, which is configured by cascading a plurality of forward-pulse delay circuits, controlled by a first control signal, to propagate a forward pulse generated in correspondence with a first clock signal,
a rearward-pulse delay line, which is configured by cascading a plurality of rearward-pulse delay circuits provided in correspondence with said plurality of forward-pulse delay circuits of said forward-pulse delay line, to propagate a rearward pulse in said rearward-pulse delay line by stages corresponding to stages by which said forward pulse has propagated in said forward-pulse delay line to be outputted,
a state-holding device connected to said forward-pulse delay line and said rearward-pulse delay line, controlled by said first control signal, to turn stages of said rearward-pulse delay line corresponding to stages by which said forward pulse has propagated to the set state, and also turn stages by which said rearward pulse has propagated to the reset state, and
a forward-pulse detecting device to detect whether said forward pulse was propagated or not in one or a plurality of predetermined stages, and
an electric power consumption control device to control electric power consumption by said rearward-pulse delay circuits, and also control electric power consumption by at least one of said forward-pulse delay circuits and said state-holding circuits corresponding to the result of said forward-pulse detecting device,
wherein a rearward-pulse delay circuit which is nearest the output side among said rearward-pulse delay circuits connected to said state-holding device which has been turned to the reset state generates said rearward pulse in correspondence with said first clock.

28. A clock control circuit, comprising:
a forward-pulse delay line, which is configured by cascading a plurality of forward-pulse delay circuits, controlled by a first control signal, to propagate a forward pulse generated in correspondence with a first clock signal,
a rearward-pulse delay line, which is configured by cascading a plurality of rearward-pulse delay circuits provided in correspondence with said plurality of forward-pulse delay circuits of said forward-pulse delay line, to propagate a rearward pulse in said rearward-pulse delay line by stages corresponding to stages by which said forward pulse has propagated in said forward-pulse delay line to be outputted,
a state-holding device connected to said forward-pulse delay line and said rearward-pulse delay line, controlled by said first control signal, to turn stages of said rearward-pulse delay line corresponding to stages by which said forward pulse has propagated to the set state, and also turn stages by which said rearward pulse has propagated to the reset state,
a forward-pulse detecting device to detect whether said forward pulse was propagated or not in one or a plurality of predetermined stages, and an electric power consumption control device to control electric power consumption by controlling the supply of power supply voltage to said rearward-pulse delay circuits corresponding to the result of said forward-pulse detecting device, wherein a rearward-pulse delay circuit which is nearest the output side among said rearward-pulse delay circuits connected to said state-holding device which has been turned to the reset state generates said rearward pulse in correspondence with said first clock.

29. A clock control circuit, comprising:

a forward-pulse delay line, which is configured by cascading a plurality of forward-pulse delay circuits, controlled by a first control signal, to propagate a forward pulse generated in correspondence with a first clock signal, a rearward-pulse delay line, which is configured by cascading a plurality of rearward-pulse delay circuits provided in correspondence with said plurality of forward-pulse delay circuits of said forward-pulse delay line, to propagate a rearward pulse in said rearward-pulse delay line by stages corresponding to stages by which said forward pulse has propagated in said forward-pulse delay line to be outputted, a state-holding device connected to said forward-pulse delay line and said rearward-pulse delay line, controlled by said first control signal, to turn stages of said rearward-pulse delay line corresponding to stages by which said forward pulse has propagated to the set state, and also turn stages by which said rearward pulse has propagated to the reset state, a forward-pulse detecting device to detect to detect whether said forward pulse was propagated or not in one or a plurality of predetermined stages, and an electric power consumption control device to control electric power consumption by controlling the supply of power supply voltage to said rearward-pulse delay circuits, and also control electric power consumption by controlling the supply of power supply voltage to at least one of said forward-pulse delay circuits and said state-holding circuits corresponding to the result of said forward-pulse detecting device, wherein a rearward-pulse delay circuit which is nearest the output side among said rearward-pulse delay circuits connected to said state-holding device which has been turned to the reset state generates said rearward pulse in correspondence with said first clock.

30. A clock control circuit, comprising:

a forward-pulse delay line, which is configured by cascading a plurality of forward-pulse delay circuits, controlled by a first control signal to propagate a forward pulse generated in correspondence with a first clock signal, a rearward-pulse delay line, which is configured by cascading a plurality of rearward-pulse delay circuits provided in correspondence with said plurality of forward-pulse delay circuits of said forward-pulse delay line, to propagate a rearward pulse in said rearward-pulse delay line by stages corresponding to stages by which said forward pulse has propagated in said forward-pulse delay line to be outputted, a state-holding device connected to said forward-pulse delay line and said rearward-pulse delay line, controlled by said first control signal to turn stages of said rearward-pulse delay line corresponding to stages by which said forward pulse has propagated to the set state, and also turn stages by which said rearward pulse has propagated to the reset state, and a forward-pulse detecting device to detect to detect whether said forward pulse was propagated or not in one or a plurality of predetermined stages, and an electric power consumption control device to control electric power consumption by controlling the supply of power supply input signals to said rearward-pulse delay circuits corresponding to the result of said forward-pulse detecting device, wherein a rearward-pulse delay circuit which is nearest the output side among said rearward-pulse delay circuits connected to said state-holding device which has been turned to the reset state generates said rearward pulse in correspondence with said first clock.

31. A clock control circuit, comprising:

a forward-pulse delay line, which is configured by cascading a plurality of forward-pulse delay circuits, controlled by a first control signal, to propagate a forward pulse generated in correspondence with a first clock signal, a rearward-pulse delay line, which is configured by cascading a plurality of rearward-pulse delay circuits provided in correspondence with said plurality of forward-pulse delay circuits of said forward-pulse delay line, to propagate a rearward pulse in said rearward-pulse delay line by stages corresponding to stages by which said forward pulse has propagated in said forward-pulse delay line to be outputted, a state-holding device connected to said forward-pulse delay line and said rearward-pulse delay line, controlled by said first control signal, to turn stages of said rearward-pulse delay line corresponding to stages by which said forward pulse has propagated to the set state, and also turn stages by which said rearward pulse has propagated to the reset state, and a forward-pulse detecting device to detect whether said forward pulse was propagated or not in one or a plurality of predetermined stages, and an electric power consumption control device to control electric power consumption by controlling the supply of power supply input signals to said rearward-pulse delay circuits, and also control electric power consumption by controlling the supply of the power supply input signals to at least one of said forward-pulse delay circuits and said state-holding circuits corresponding to the result of said forward-pulse detecting device, wherein a rearward-pulse delay circuit which is nearest the output side among said rearward-pulse delay circuits connected to said state-holding device which has been turned to the reset state generates said rearward pulse in correspondence with said first clock.

32. A clock control method, comprising:

obtaining clock signals synchronized with clock signals inputted to a forward-pulse delay line which is configured by cascading a plurality of stages of forward-pulse delay circuits to delay an inputted signal by propagating said inputted signal with a predetermined delay time, and delays a forward pulse by propagating said forward pulse, by said forward-pulse delay line, a rearward-pulse delay line which is configured by cascading a plurality of stages of rearward-pulse delay circuits to delay an inputted signal by propagating said inputted signal with a predetermined delay time, and delays a rearward pulse by propagating said rearward pulse, and a control device to propagate said rearward pulse by said rearward-pulse delay line in a number of stages corresponding to the number of stages where said forward pulse was propagated by said forward-pulse delay line;

detecting a number of stages where said forward pulse was propagated by said forward-pulse delay line; and controlling electric power consumption of said rearward-pulse delay circuits corresponding to the detected result.

33. A clock control method according to claim 32, wherein said step of controlling electric power consumption controls electric power consumption of said rearward-pulse delay circuits, and also controls electric power consumption of at least one of said forward-pulse delay circuits and said state-holding circuits corresponding to the detected result at said detecting step.

\* \* \* \* \*